United States Patent
Dogu et al.

(10) Patent No.: US 11,368,472 B2
(45) Date of Patent: Jun. 21, 2022

(54) INFORMATION PROCESSING DEVICE AND PROGRAM

(71) Applicant: DIGITAL ARTS INC., Tokyo (JP)

(72) Inventors: Toshio Dogu, Tokyo (JP); Noriyuki Takahashi, Tokyo (JP); Shigeki Kimura, Tokyo (JP); Takuya Matsumoto, Tokyo (JP)

(73) Assignee: DIGITAL ARTS INC., Tokyo (JP)

( * ) Notice: Subject to any disclaimer, the term of this patent is extended or adjusted under 35 U.S.C. 154(b) by 329 days.

(21) Appl. No.: 16/474,238

(22) PCT Filed: Dec. 28, 2016

(86) PCT No.: PCT/JP2016/089202
§ 371 (c)(1),
(2) Date: Jun. 27, 2019

(87) PCT Pub. No.: WO2018/123061
PCT Pub. Date: Jul. 5, 2018

(65) Prior Publication Data
US 2019/0356680 A1    Nov. 21, 2019

(51) Int. Cl.
*H04L 29/06*    (2006.01)
*G06F 21/56*    (2013.01)
*H04L 9/40*    (2022.01)

(52) U.S. Cl.
CPC ........ *H04L 63/1416* (2013.01); *G06F 21/565* (2013.01); *G06F 21/568* (2013.01); *H04L 63/1425* (2013.01); *H04L 63/1441* (2013.01)

(58) Field of Classification Search
CPC ............. H04L 63/1416; H04L 63/1425; H04L 63/1441; H04L 63/145; G06F 21/565; G06F 21/568; G06F 21/566; G06F 13/00
(Continued)

(56) References Cited

U.S. PATENT DOCUMENTS 7,925,888 B1 *   4/2011  Nachenberg .......... G06F 21/563
                                                        713/188
8,739,283 B1 *   5/2014  Zhang ................... G06F 21/566
                                                        726/24
(Continued)

FOREIGN PATENT DOCUMENTS

JP    2002328874 A    11/2002
JP    2002366487 A    12/2002
(Continued)

OTHER PUBLICATIONS

International Search Report for PCT/JP2016/089202 dated Mar. 14, 2017 and its English translation provided by WIPO.
(Continued)

*Primary Examiner* — Badri Narayanan Champakesan
(74) *Attorney, Agent, or Firm* — Ladas & Parry, LLP

(57) ABSTRACT

The present invention is provided with: a command acquisition unit that acquires a command related to operation of electronic data; a remote control unit that establishes a remotely controllable communication path with an execution environment in which the operation of the electronic data is to be executed, and transmits an execution instruction for executing the operation of the electronic data on the execution environment to the execution environment via the remotely controllable communication path; a data transmission unit that transmits the electronic data or the electronic data converted based on a predetermined algorithm to the execution environment; an execution history storage unit that stores the electronic data or the electronic data converted based on the predetermined algorithm for a predetermined period; and a malware detection unit that scans the electronic data stored or the electronic data converted based on the predetermined algorithm in the execution history storing unit to detect malware.

9 Claims, 27 Drawing Sheets

(58) Field of Classification Search
USPC .......................................................... 726/23
See application file for complete search history.

(56) References Cited

U.S. PATENT DOCUMENTS

| | | | | |
|---|---|---|---|---|
| 8,844,039 | B2* | 9/2014 | Niemela | G06K 9/00973 |
| | | | | 726/24 |
| 9,401,925 | B1* | 7/2016 | Guo | G06F 21/552 |
| 9,407,648 | B1* | 8/2016 | Pavlyushchik | G06F 9/544 |
| 10,162,966 | B1* | 12/2018 | Huang | G06F 21/566 |
| 10,530,802 | B2* | 1/2020 | Thomas | G06F 3/067 |
| 2003/0105975 | A1* | 6/2003 | Nagoya | G06F 21/567 |
| | | | | 726/24 |
| 2008/0077690 | A1 | 3/2008 | Miyajima | |
| 2010/0083381 | A1 | 4/2010 | Khosravi | |
| 2015/0007312 | A1* | 1/2015 | Pidathala | H04L 63/145 |
| | | | | 726/22 |
| 2015/0032793 | A1* | 1/2015 | Dogu | H04L 67/06 |
| | | | | 709/201 |
| 2016/0283261 | A1* | 9/2016 | Nakatsu | G06F 9/45558 |
| 2016/0378989 | A1* | 12/2016 | Park | G06F 21/568 |
| | | | | 726/23 |
| 2017/0289179 | A1* | 10/2017 | Dubuc | G06F 21/50 |
| 2018/0060569 | A1* | 3/2018 | Kim | G06F 21/566 |

FOREIGN PATENT DOCUMENTS

| | | |
|---|---|---|
| JP | 2003169096 A | 6/2003 |
| JP | 2003288227 A | 10/2003 |
| JP | 2004038273 A | 2/2004 |
| JP | 2004133503 A | 4/2004 |
| JP | 2005038361 A | 2/2005 |
| JP | 2005157598 A | 6/2005 |
| JP | 2005352823 A | 12/2005 |
| JP | 2007299110 A | 11/2007 |
| JP | 2008083897 A | 4/2008 |
| JP | 2010073011 A | 4/2010 |
| JP | 2010086538 A | 4/2010 |
| JP | 2015153298 A | 8/2015 |
| JP | 2016031754 A | 3/2016 |
| JP | 2016181185 A | 10/2016 |

OTHER PUBLICATIONS

Written Opinion of the International Searching Authority for PCT/JP2016/089202 dated Mar. 14, 2017 and its English translation provided by Google Translate.

* cited by examiner

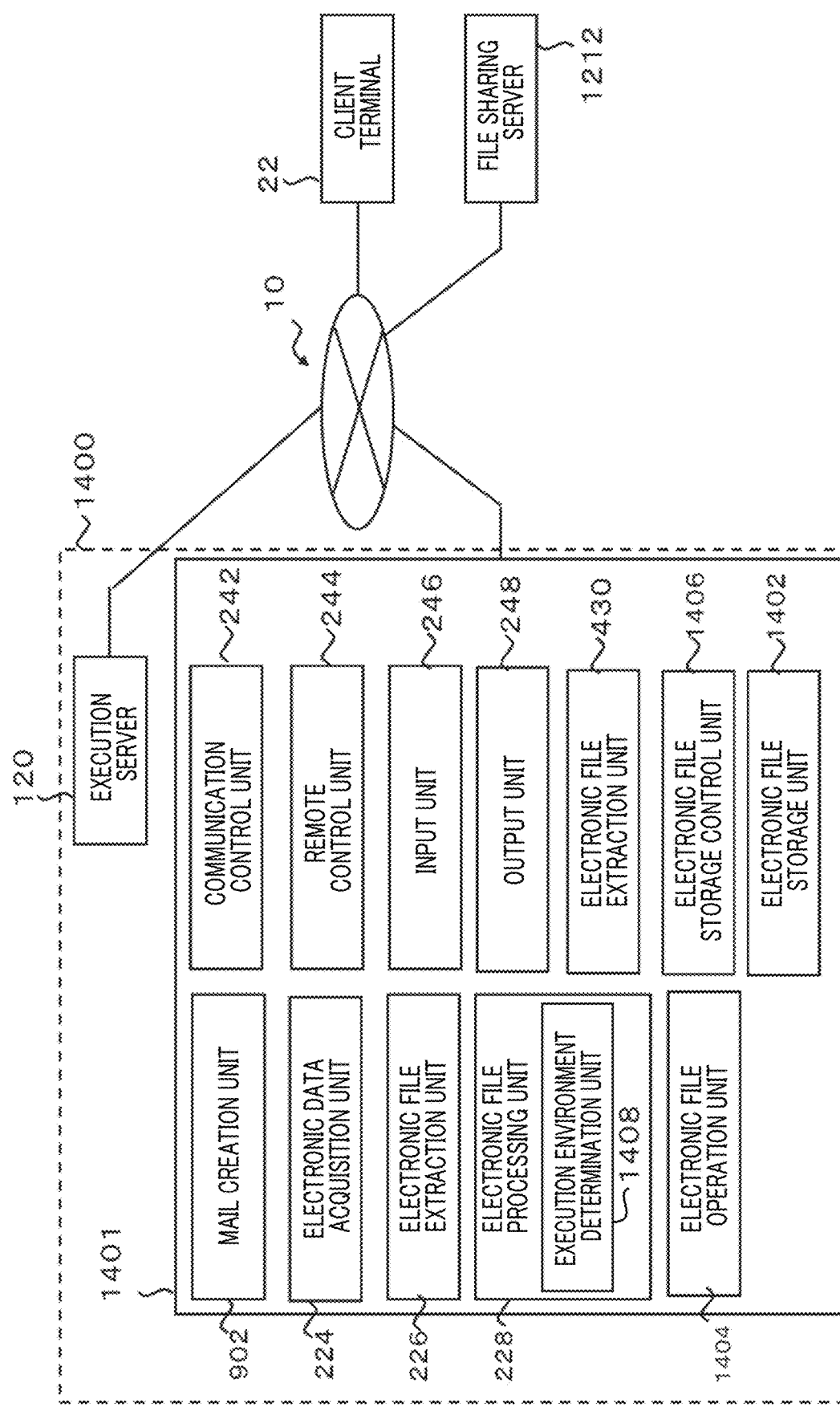

INFORMATION PROCESSING DEVICE AND PROGRAM

CROSS-REFERENCE TO RELATED APPLICATION

This application is the U.S. national phase of PCT Application No. PCT/JP2016/089202 filed on Dec. 28, 2016, the disclosure of which is incorporated in its entirety by reference herein.

TECHNICAL FIELD

The present invention relates to an information processing device and a program.

BACKGROUND ART

There is known a virus testing system that, when an e-mail including a suspicious attached file is received, transfers the e-mail to a computer for virus testing (see, for example, Patent Literatures 1 to 10).

CITATION LIST

Patent Literature

Patent Literature 1: JP 2002-328874 A
Patent Literature 2: JP 2002-366487 A
Patent Literature 3: JP 2003-169096 A
Patent Literature 4: JP 2004-038273 A
Patent Literature 5: JP 2004-133503 A
Patent Literature 6: JP 2005-038361 A
Patent Literature 7: JP 2005-157598 A
Patent Literature 8: JP 2005-352823 A
Patent Literature 9: JP 2007-299110 A
Patent Literature 10: JP 2016-181185 A

SUMMARY OF INVENTION

Technical Problem

Even though virus testing software is installed on a computer, it is difficult to detect unknown viruses that are newly generated daily.

Solution to Problem

General Disclosure

In a first aspect of the present invention, an information processing device is provided. The above-described information processing device includes, for example, a command acquisition unit that acquires a command related to operation of electronic data. The above-described information processing device may include a remote control unit that establishes a remotely controllable communication path with the execution environment in which operation of the electronic data is to be executed and transmits, to an execution environment via the remotely controllable communication path, an execution instruction for causing the operation of the electronic data to be executed on the execution environment, when the command acquisition unit acquires a command. The above-described information processing device may include a data transmission unit that transmits electronic data or electronic data converted based on a predetermined algorithm to the execution environment when the command acquisition unit acquires the command.

The above-described information processing device may include an execution history storage unit that stores electronic data or electronic data converted based on a predetermined algorithm for a predetermined period. The above-described information processing device may include a malware detection unit that scans electronic data stored in the execution history storage unit or electronic data converted based on a predetermined algorithm to detect malware.

In the above-described information processing device, the malware detection unit may perform processing for detecting malware a plurality of times during a predetermined period. In the above-described information processing device, the data transmission unit may transmit electronic data or electronic data converted based on a predetermined algorithm to the execution environment and the execution history storage unit when the command acquisition unit acquires the command. In the above-described information processing device, the execution environment may perform the operation of the electronic data, and then, transmit the electronic data after execution to the execution history storage unit.

The above-described information processing device may include a restriction unit that restricts the operation of the electronic data until a predetermined period expires. The above-described information processing device may include a transmission history storage unit that stores identification information of another information processing device when the electronic data is transmitted to the other information processing device. The above-described information processing device may include a notification unit that refers to identification information of another information processing device stored in the transmission history storage unit, and notifies the other information processing device that the electronic data is infected with malware, when the malware detection unit detects malware.

In a second aspect of the present invention, an information processing device is provided. The above-described information processing device includes, for example, a command acquisition unit that acquires a command for accessing electronic data. The above-described information processing device may include a remote control unit that establishes a remotely controllable communication path with the execution environment in which processing for accessing the electronic data is to be executed, and transmits, to an execution environment via the remotely controllable communication path, an execution instruction for executing processing for accessing the electronic data on the execution environment, when the command acquisition unit acquires the command. The above-described information processing device may include an access history storage unit that stores an address of the electronic data, or the electronic data or electronic data converted based on a predetermined algorithm for a predetermined period. The above-described information processing device may include a malware detection unit that (i) accesses an address stored in the access history storage unit to detect malware, or (ii) scans the electronic data stored in the access history storage unit or electronic data converted based on a predetermined algorithm to detect malware.

In the above-described information processing device, the malware detection unit may perform processing for detecting malware a plurality of times during a predetermined period. The above-described information processing device may include a restriction unit that restricts access to the electronic data until the predetermined period expires. The above-described information processing device may include an access information acquisition unit that acquires information indicating the electronic data has been accessed from another information processing device. The above-described information processing device may include an access information storage unit that stores identification information of the other information processing device that has accessed the electronic data. The above-described information processing device may include a notification unit that refers to identification information of another information processing device stored in the access information storage unit, and notifies the other information processing device that the electronic data is infected with malware, when the malware detection unit detects malware.

The information processing device according to the first aspect or the second aspect may include a report creation unit that creates a report regarding a detection status of malware by the malware detection unit. The information processing device according to the first aspect or the second aspect may include a deletion unit that deletes the execution environment. The information processing device according to the first aspect or the second aspect may include a standby unit that prepares a snapshot of the execution environment. The information processing device according to the first aspect or the second aspect may include a cleanup unit that returns the execution environment to the snapshot of the execution environment. In the information processing device according to the first aspect or the second aspect, the remote control unit and the execution environment may be realized on the same physical machine.

In a third aspect of the present invention, a program is provided. The above-described program may be a program for causing a computer to function as the information processing device according to the first aspect or the second aspect. A storage medium storing the above-described program may be provided.

Note that the above-described summary of the invention does not enumerate all the necessary features of the present invention. A sub-combination of these feature groups can also be an invention.

BRIEF DESCRIPTION OF DRAWINGS

FIG. 14 schematically illustrates an example of a file processing system 1400.

DESCRIPTION OF EMBODIMENTS

Figure 1:
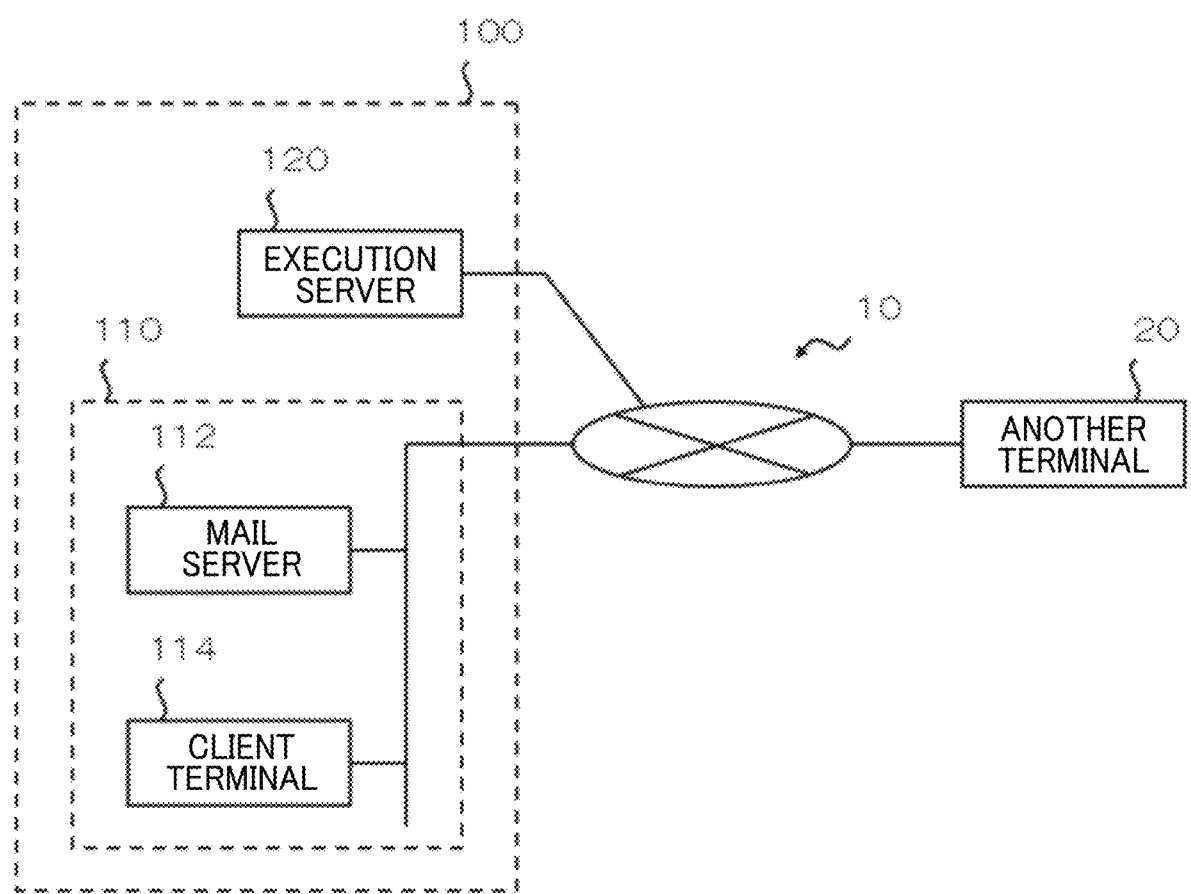
FIG. 1 schematically illustrates an example of a file transfer system 100.

Hereinafter, the present invention will be described through the embodiments of the invention, but the following embodiments do not limit the invention according to the claims. Not all combinations of features described in the embodiments are essential to the solution of the invention. Note that, in the drawings, the same or similar parts may be denoted by the same reference numerals and redundant description may be omitted. The technical matters described in the specific embodiment can be applied to other embodiments as long as no technical contradiction arises.

FIG. 1 schematically illustrates an example of a file transfer system 100. In the present embodiment, the file transfer system 100 includes a mail system 110 and an execution server 120. The mail system 110 has a mail server 112 and a client terminal 114. In the present embodiment, the mail system 110 and the execution server 120 transmit and receive information via a network 10. The file transfer system 100, the mail system 110, the mail server 112, the client terminal 114, and the execution server 120 may be an example of an information processing device. The execution server 120 may be an example of an execution environment. The network 10 may be an example of a communication line.

Each unit of the file transfer system 100 may be realized by hardware, software, or a combination of hardware and software. The computer may function as at least a part of the file transfer system 100 by executing a program. The program may be stored in a computer readable medium such as a CD-ROM, a DVD-ROM, a memory, or a hard disk, and may be stored in a storage device connected to a network. The program may be installed on a computer that constitutes at least a part of the file transfer system 100 from a computer readable medium or the storage device connected to a network.

The program that causes a computer to function as at least a part of the file transfer system 100 may include a module that defines the operation of each unit of the file transfer system 100. These programs or modules operate on a processor, a communication interface, a storage device, or the like to cause a computer to function as each unit of the file transfer system 100 or cause the computer to execute an information processing method in the file transfer system 100.

The information processing described in the above-described program functions as a specific means in which software and various hardware resources of the file transfer system 100 cooperate by being read into a computer. Then, the file transfer system 100 according to the purpose of use can be built by realizing operation or processing of information according to the purpose of use of the computer in the present embodiment by these specific means.

Each unit of the file transfer system 100 may be realized by a virtual server or a cloud system. Units of the file transfer system 100 may be built on the same network, or may be built on different networks. Units of the file transfer system 100 may be built on the same physical server, or may be built on different physical servers.

The file transfer system 100 transmits and receives information to and from another terminal 20 via the network 10. In an embodiment, when the electronic data received from the other terminal 20 includes an electronic file, the file transfer system 100 extracts the electronic file in the mail system 110 and transfers the extracted electronic file from the mail system 110 to the execution server 120. The extracted electronic file may be an example of electronic data to be subjected to a command regarding access or operation.

In the present embodiment, the electronic file is executed on the execution server 120. This makes it possible to prevent the mail system 110 from being infected with a virus, even if the electronic file is infected with a virus. For example, even when the size of the electronic data that can be received by the terminal on the mail system 110 side is limited and the electronic file cannot be received by the terminal, if the capacity of the storage device of the terminal is small and the electronic file cannot be received, or even when an electronic file executable application is not installed in the terminal and the electronic file cannot be executed, the recipient of the electronic data can view the electronic file.

In another embodiment, when the electronic data to be transmitted to the other terminal 20 includes an electronic file, the file transfer system 100 extracts the electronic file in the mail system 110 and transfers the extracted electronic file from the mail system 110 to the execution server 120. The mail system 110 notifies the other terminal 20 of the transferred electronic file URI. As a result, the user of the other terminal 20 can access the electronic file transferred to the execution server 120.

In the present embodiment, the electronic file is executed on the execution server 120. This makes it possible to prevent the other terminal 20 from being infected with a virus, even if the electronic file is infected with a virus. Furthermore, the size of electronic data to be transmitted to the other terminal 20 can be reduced. As a result, for example, even when the size of the electronic data that can be received by the other terminal 20 is limited and the electronic file cannot be received by the other terminal 20, if the capacity of the storage device of the other terminal 20 is small and the electronic file cannot be received, or even when an electronic file executable application is not installed in the other terminal 20 and the electronic file cannot be executed, the user of the other terminal 20 can view the electronic file.

As described above, according to the file transfer system 100, even when the electronic file is infected with a new type of virus that the virus testing software does not support, the electronic file can be executed safely. Furthermore, according to the file transfer system 100, even when the computer using the OS whose support deadline has passed has acquired electronic data including an electronic file, the electronic file can be executed safely.

Note that, examples of an electronic file include an executable file, an application file executed by an application, a script, and the like. Examples of the application file include a text file, a Word file, a PDF file, a JPEG file, and the like. Executing an electronic file can include, in addition to executing an executable file, any processing executed with respect to an electronic file such as viewing, printing, editing, duplicating, moving, transmitting, and storing an electronic file, converting a file format, copying electronic file contents to a clipboard, capturing a screen, opening an electronic file using a predetermined application, and processing an electronic file using a predetermined application.

The network 10 may be a wired communication transmission line, a wireless communication transmission line, or a combination thereof. The network 10 may be the Internet, a dedicated line, a wireless communication network, or a combination thereof.

The other terminal 20 may be a device capable of transmitting and receiving information to and from the file transfer system 100, and may be a personal computer, a mobile terminal, a wireless terminal, a home appliance or the like. Examples of a mobile terminal include a mobile phone, a smart phone, a PDA, a tablet, a wearable device, a notebook computer and a laptop computer.

The other terminal 20 may be realized by activating software that defines operation of each unit of the other terminal 20, in an information processing device having a general configuration including: a data processing device having a CPU, a ROM, a RAM, a communication interface and the like; an input device such as a keyboard, a touch panel, or a microphone; an output device such as a display device, a speaker, or a vibration device; and a storage device such as a memory or an HDD. The other terminal 20 may be realized by a virtual server or a cloud system.

The mail server 112 transmits and receives e-mails to and from the other terminal 20 via the network 10. The e-mail may include an attached file. The e-mail may be an example of electronic data. The attached file may be an example of an electronic file.

The mail server 112 receives an e-mail addressed to the client terminal 114 from the other terminal 20. When the received e-mail includes an attached file, the mail server 112 extracts the attached file from the e-mail. The mail server 112 transmits the extracted attached file to the execution server 120. Furthermore, the mail server 112 creates notification data indicating that an e-mail has been received from the other terminal 20, and transmits the notification data to the client terminal 114.

The mail server 112 receives an e-mail addressed to the other terminal 20 from the client terminal 114. When the received e-mail includes an attached file, the mail server 112 extracts the attached file from the e-mail. The mail server 112 transmits the extracted attached file to the execution server 120. Furthermore, the mail server 112 creates notification data indicating that an e-mail has been received from client terminal 114, and transmits the notification data to the other terminal 20.

Before transmitting an extracted attached file to the execution server 120, the mail server 112 may convert the attached file. The mail server 112 may transmit the converted attached file to the execution server 120. The converted attached file may be an example of a file associated with the electronic file.

The mail server 112 may convert the attached file so that execution on the client terminal 114 is more difficult than the attached file before conversion. Examples of the conversion processing of the attached file include processing of changing the format, extension or name of the attached file, processing of encrypting the attached file, processing of converting the structure of the attached file, and the like.

The notification data may include access information to the extracted attached file. The access information to the attached file may be the URI of the attached file or the converted attached file. The URI of the attached file or the converted attached file may be a URL indicating the storage location of the attached file or the converted attached file on the execution server 120. The access information to the attached file may be an example of at least one of transmission destination identification data and execution environment identification data.

The access information to the attached file may be a remote control program for causing a computer to execute a procedure for establishing a communication path in between the computer and another computer that stores the attached file or the converted attached file. The remote control program may be an executable file or an application file of a remote control application pre-installed on a computer. The remote control program may be a script. The above-described communication path may be a communication path in which another computer that stores the attached file or the converted attached file can be remotely controlled from a computer executing the remote control program.

The remote control program may be a program for causing a computer to further execute a procedure for transmitting an execution instruction for executing an attached file on the above-described another computer to the other computer via a remotely controllable communication path. The remote control program may be a program for causing a computer to further execute a procedure for transmitting an instruction for executing processing of returning the converted attached file to the attached file before conversion on the above-described another computer to the other computer via a remotely controllable communication path.

According to an embodiment, the mail server 112 converts the file format of the attached file from the file format of the application that created the attached file to the file format of the application for remote control. The client terminal 114 stores, for example, a file format or an extension of the electronic file in association with information indicating whether the electronic file associated with the file format or the extension is to be executed on the client terminal 114. The client terminal 114 detects, for example, the change of the association information by the OS and the change of the association information by the user, and performs the change of the association information again. The above association information is, for example, information that associates the file format or extension of the electronic file with the application that can use the electronic file. The client terminal 114 may monitor activation of the execution file by the OS to detect activation of the execution file. The file format conversion processing or the extension conversion processing may be an example of a predetermined algorithm. The electronic file whose file format or extension has been converted may be an example of electronic data converted on the basis of a predetermined algorithm.

As a result, for example, when the client terminal 114 receives an execution instruction of the attached file of which file format has been converted, the converted attached file in file format can be executed on the client terminal 114. When the attached file of which file format has been converted is executed on the client terminal 114, the remote control application previously installed on the client terminal 114 is activated.

When the file format or the extension of the attached file of which file format has been converted is not associated with the information indicating whether the file is to be executed on the client terminal 114, the client terminal 114 may cause the display device to display a screen to allow the user to select whether the file is executed on the client terminal, and receive the user selection result via the input device. When the file format or the extension of the attached file of which file format has been converted is not associated with the information indicating whether the file is executed on the client terminal 114, the client terminal 114 may determine that the file is not executed on the client terminal.

When the remote control application is activated, for example, the client terminal 114 reads access information to the attached file from the notification data, and transmits the attached file to the computer indicated by the access information. Furthermore, the client terminal 114 establishes a remotely controllable communication path between the client terminal 114 and the computer indicated by the access information.

Even when the extension of the attached file is converted, the remotely controllable communication path may be established by a similar procedure to that in a case where the file format of the attached file is converted. The attached file of which file format or extension has been converted may be an example of a remote control program.

The client terminal 114 is used by the user of the file transfer service provided by the file transfer system 100. The client terminal 114 transmits and receives e-mails to and from the other terminal 20 via the mail server 112. The client terminal 114 receives notification data indicating that an e-mail from the other terminal 20 has been received, from the mail server 112. The client terminal 114 accesses the execution server 120 on the basis of the access information to the attached file included in the notification data.

The client terminal 114 may be any device capable of transmitting and receiving information to and from the other terminal 20, the mail server 112, and the execution server 120, and may be a personal computer, a mobile terminal, a wireless terminal, a home appliance or the like. Examples of a mobile terminal include a mobile phone, a smart phone, a PDA, a tablet, a wearable device, a notebook computer and a laptop computer.

The client terminal 114 may remotely control the execution server 120. For example, the client terminal 114 execute a remote control program included in the notification data to establish a remotely controllable communication path in between the client terminal 114 and the execution server 120. The client terminal 114 may activate a pre-installed remote control program to establish a remotely controllable communication path in between the client terminal 114 and the execution server 120. For example, the client terminal 114 and the execution server 120 uses a protocol such as remote desktop protocol (RDP), RDP over HTTPS, ICA, XProtocol, or PCoIP to transmit a user input from the client terminal 114 to the execution server 120, or transmit screen information of the execution server 120 from the execution server 120 to the client terminal 114.

The client terminal 114 transmits an execution instruction for executing the attached file on the execution server 120 to the execution server 120 via the remotely controllable communication path. The client terminal 114 may transmit the execution instruction when the user opens the e-mail, or may transmit the execution instruction when the user tries to execute the attached file. When the converted attached file is stored in the execution server 120, the client terminal 114 may transmit an instruction to perform processing of returning the converted attached file to the attached file before conversion, to the execution server 120 via the remotely controllable communication path.

The client terminal 114 may share at least part of the information stored in the clipboard with the clipboard of the execution server 120. The client terminal 114 may not share at least part of the information stored in the clipboard with the clipboard of the execution server 120.

The execution server 120 transmits and receives information to and from the mail server 112, the client terminal 114 and another terminal 20. The execution server 120 includes a virtual server that executes an electronic file by remote control from the client terminal 114 or the other terminal 20. The execution server 120 receives the extracted attached file or the converted attached file from the mail server 112. The execution server 120 stores the received attached file or the converted attached file.

The execution server 120 receives an instruction from the user via the client terminal 114 or the other terminal 20. The execution server 120 may establish a communication path with the client terminal 114 or the other terminal 20 in which the execution server 120 can be remotely controlled, and may receive an instruction from the user via the communication path. The user inputs an instruction to the execution server 120 using, for example, a mouse or a keyboard of the client terminal 114. For example, the execution server 120 executes the attached file according to an instruction from the user. The execution server 120 may execute processing of returning the converted attached file to the attached file before conversion, according to the attached file execution instruction or an instruction different from the execution instruction.

When the execution server 120 is remotely controlled, screen information on the execution server 120 is transmitted from the execution server 120 to the client terminal 114 or the other terminal 20. When the execution server 120 is remotely controlled, communication from the execution server 120 to the client terminal 114 or the other terminal 20 is restricted. Therefore, by executing the attached file, it is possible to prevent the spread of the virus from the execution server 120 to the client terminal 114 or the other terminal 20 even when the execution server 120 is infected with a virus.

The execution server 120 may restrict access from the user. For example, the execution server 120 associates and stores the identification information of the user and the identification information of the directory to which the user is permitted to access. This makes it possible to restrict specific directories that can be read and written by specific users.

In the present embodiment, the case where the mail system 110 of the file transfer system 100 includes the mail server 112, and the mail server 112 processes an electronic file has been described. However, the file transfer system 100 and the mail system 110 are not limited to the present embodiment. In another embodiment, the file transfer system 100 and the mail system 110 may include a proxy server instead of the mail server 112 or together with the mail server 112, and at least part of the information processing in the mail server 112 may be performed by the proxy server. The above proxy server may be an example of an information processing device.

Figure 2:
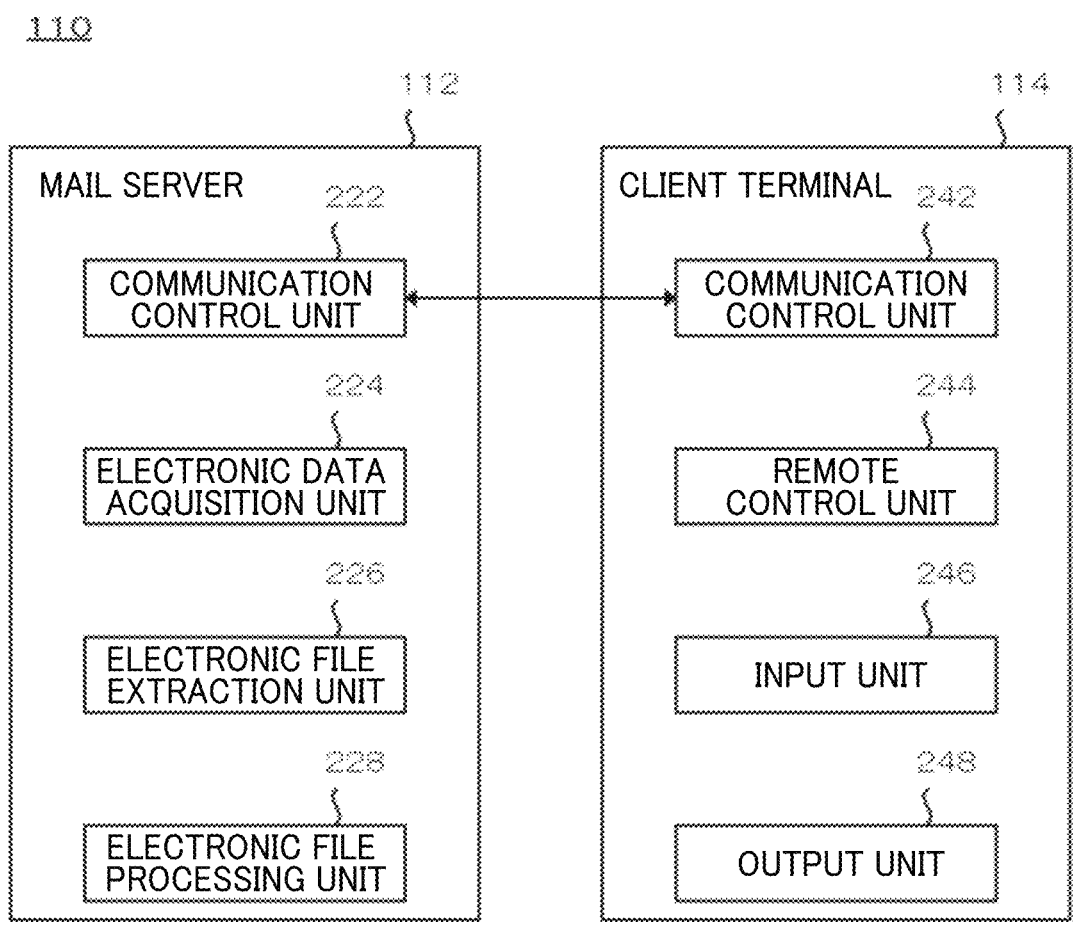
FIG. 2 schematically illustrates an example of a mail system 110.

FIG. 2 schematically illustrates an example of the mail system 110. In the description of FIG. 2, each unit of the mail system 110 will be mainly described, taking as an example a case where the mail system 110 receives an e-mail addressed to the client terminal 114 from the other terminal 20.

In the present embodiment, the mail server 112 includes a communication control unit 222, an electronic data acquisition unit 224, an electronic file extraction unit 226, and an electronic file processing unit 228. Each unit of the mail server 112 may transmit and receive information to and from each other. In the present embodiment, the client terminal 114 includes a communication control unit 242, a remote control unit 244, an input unit 246, and an output unit 248. Each unit of the client terminal 114 may transmit and receive information to and from each other. The input unit 246 may be an example of the command acquisition unit.

The communication control unit 222 controls communication between the mail server 112 and an external computer. Examples of the external computer include the other terminal 20, a client terminal 114, an execution server 120 and the like. The communication control unit 222 may be a communication interface. The communication control unit 222 may correspond to a plurality of communication methods.

The communication control unit 222 may have a firewall function. The communication control unit 222 may set a firewall so that the client terminal 114 cannot directly access the information stored in the mail server 112.

The electronic data acquisition unit 224 acquires electronic data. For example, the electronic data acquisition unit 224 acquires the e-mail transmitted to the mail system 110. The electronic data acquisition unit 224 transmits the acquired e-mail to the electronic file extraction unit 226. In the present embodiment, the electronic data acquisition unit 224 acquires an e-mail from the other terminal 20. However, the electronic data acquisition unit 224 is not limited to the present embodiment. The electronic data acquisition unit 224 may acquire electronic data stored in a storage device such as a hard disk, a memory, or a file sharing server, or may acquire electronic data from another application.

The electronic file extraction unit 226 extracts an electronic file from the electronic data. For example, the electronic file extraction unit 226 receives, from the electronic data acquisition unit 224, the e-mail acquired by the electronic data acquisition unit 224. The electronic file extraction unit 226 determines whether the received e-mail includes an attached file. When the electronic file extraction unit 226 determines that the received e-mail includes an attached file, the electronic file extraction unit 226 extracts the attached file from the e-mail.

The electronic file extraction unit 226 transmits the extracted attached file to the electronic file processing unit 228. The electronic file extraction unit 226 may distinguish the attached file from the part other than the attached file of the e-mail, and transmit the file to the electronic file processing unit 228. As a result, the electronic file processing unit 228 can create notification data using header information included in the e-mail, information on the mail text, and the like.

The electronic file processing unit 228 executes various processes on the extracted electronic file. For example, the electronic file processing unit 228 receives, from the electronic file extraction unit 226, the attached file and a part other than the attached file of the e-mail. The electronic file processing unit 228 determines an execution environment in which the received attached file is to be executed. The execution environment may be built on a virtual server. As a result, even when the execution environment is infected with a virus, the execution environment can be easily rebuilt.

The electronic file processing unit 228 may determine the above-described execution environment on the basis of user identification information for identifying the user of the client terminal 114. For example, the electronic file processing unit 228 first determines that the attached file is executed on the execution server 120 on the basis of the user identification information. Next, the electronic file processing unit 228 determines the storage location of the attached file in the execution server 120.

The electronic file processing unit 228 may obtain information on the storage location of the attached file in the execution server 120 from the execution server 120, and determine the storage location of the attached file. For example, when the electronic file processing unit 228 transmits information such as user identification information and the format and size of the attached file to the execution server 120, and request for notification of information on the location in which the attached file is to be stored when the attached file is transmitted to the execution server 120. According to the request from the electronic file processing unit 228, the execution server 120 determines the storage location of the attached file on the basis of the information such as the user identification information and the format and size of the attached file.

The electronic file processing unit 228 may execute conversion processing of the received attached file. Examples of the conversion processing of the attached file include processing of changing the format, extension or name of the attached file, processing of encrypting the attached file, and the like. The encryption of the attached file may be performed by an application program that performs encryption processing.

The electronic file processing unit 228 creates notification data including access information to the attached file on the basis of the information on the storage location of the attached file in the execution server 120. The electronic file processing unit 228 may create the notification data using header information included in the e-mail, information of the mail text, and the like.

The electronic file processing unit 228 transfers the attached file or the converted attached file. The electronic file processing unit 228 may transfer the attached file or the converted attached file to the execution server 120. The electronic file processing unit 228 may transfer the attached file or the converted attached file to the client terminal 114 together with the notification data or in the notification data.

The electronic file processing unit 228 acquires information on the execution environment of the electronic file on the execution server 120 when executing various processes on the extracted electronic file. The electronic file processing unit 228 may obtain the information on the execution environment from the execution server 120. Examples of the information on the above-described execution environment include information identifying a server that serves as the execution environment, the expiration date of the server, the user ID of the user of the file transfer system 100 or the client terminal 114 in the server, a password associated with the user ID, and the like.

The communication control unit 242 controls communication between the client terminal 114 and an external computer. Examples of an external computer include the other terminal 20, the mail server 112, the execution server 120 and the like. The communication control unit 242 may be a communication interface. The communication control unit 242 may correspond to a plurality of communication methods.

The communication control unit 242 may execute authentication processing with the execution server 120. The communication control unit 242 may transmit the authentication information of the client terminal 114 to the execution server 120. The authentication information of the client terminal 114 may be information used for an authentication method such as LDAP authentication or NTLM authentication.

In an embodiment, the communication control unit 242 causes the display device of the output unit 248 to display an authentication screen while executing authentication processing with the execution server 120, and acquires authentication information from the user. The communication control unit 242 executes an authentication processing using the authentication information acquired from the user. Examples of authentication information include identification information of the execution server 120 such as an IP address, a user ID, and password information of the user ID.

In another embodiment, the communication control unit 242 receives the authentication information from the execution server 120 in advance, and stores the received authentication information in the storage device of the client terminal 114. The communication control unit 242 executes authentication processing using the authentication information stored in the storage device. As a result, while the authentication processing with the execution server 120 is performed, the authentication processing can be completed without displaying the authentication screen and obtaining authentication information from the user.

The communication control unit 242 may control the connection time with the execution server 120. The communication control unit 242 may restrict communication with the execution server 120 when communication with the execution server 120 is started and a predetermined time has elapsed. Examples of a method of restricting communication include interruption of communication, restriction of communication speed, and the like.

The remote control unit 244 establishes a remotely controllable communication path in between the client terminal 114 and the execution server 120. The remote control unit 244 transmits an instruction from the user of the client terminal 114 to the execution server 120 via the remotely controllable communication path.

The remote control unit 244 remotely controls the execution server 120 on the basis of the instruction from the user input to input unit 246. For example, the remote control unit 244 transmits, to the execution server 120, an execution instruction for executing the attached file on the execution server 120. The remote control unit 244 acquires screen information of the execution server 120 from the execution server 120. The remote control unit 244 transmits the screen information to the output unit 248. As a result, the user of the client terminal 114 can safely view the attached file stored in the execution server 120.

When the user desires to download the attached file to the client terminal 114, the user inputs to the input unit 246 a transfer instruction for transferring the attached file stored in the execution server 120 to the client terminal 114. The remote control unit 244 receives the user's transfer instruction from the input unit 246 and transmits the transfer instruction to the execution server 120. This allows the user to securely obtain the attached file.

The remote control unit 244 may be realized by executing a program pre-installed on the client terminal 114. The remote control unit 244 may be realized by executing a remote control program included in the notification data received from the electronic file processing unit 228, on the client terminal 114.

When the remote control unit 244 establishes a remotely controllable communication path in between the client terminal 114 and the execution server 120, or transmits an instruction from the user of the client terminal 114 to the execution server 120 via the remotely controllable communication path, the remote control unit 244 may obtain information on the execution environment on the execution server 120. The remote control unit 244 may obtain the information on the execution environment from the execution server 120. Examples of the information on the above-described execution environment include information identifying a server that serves as the execution environment, the expiration date of the server, the user ID of the user of the file transfer system 100 or the client terminal 114 in the server, a password associated with the user ID, and the like.

The input unit 246 receives an input from the user. The input unit 246 may obtain an instruction or command related to the operation of the electronic data. Examples of the input unit 246 include a keyboard, a mouse, a touch panel, a microphone, and the like. The output unit 248 outputs information to the user. Examples of the output unit 248 include a display device, a speaker, and the like.

Figure 3:
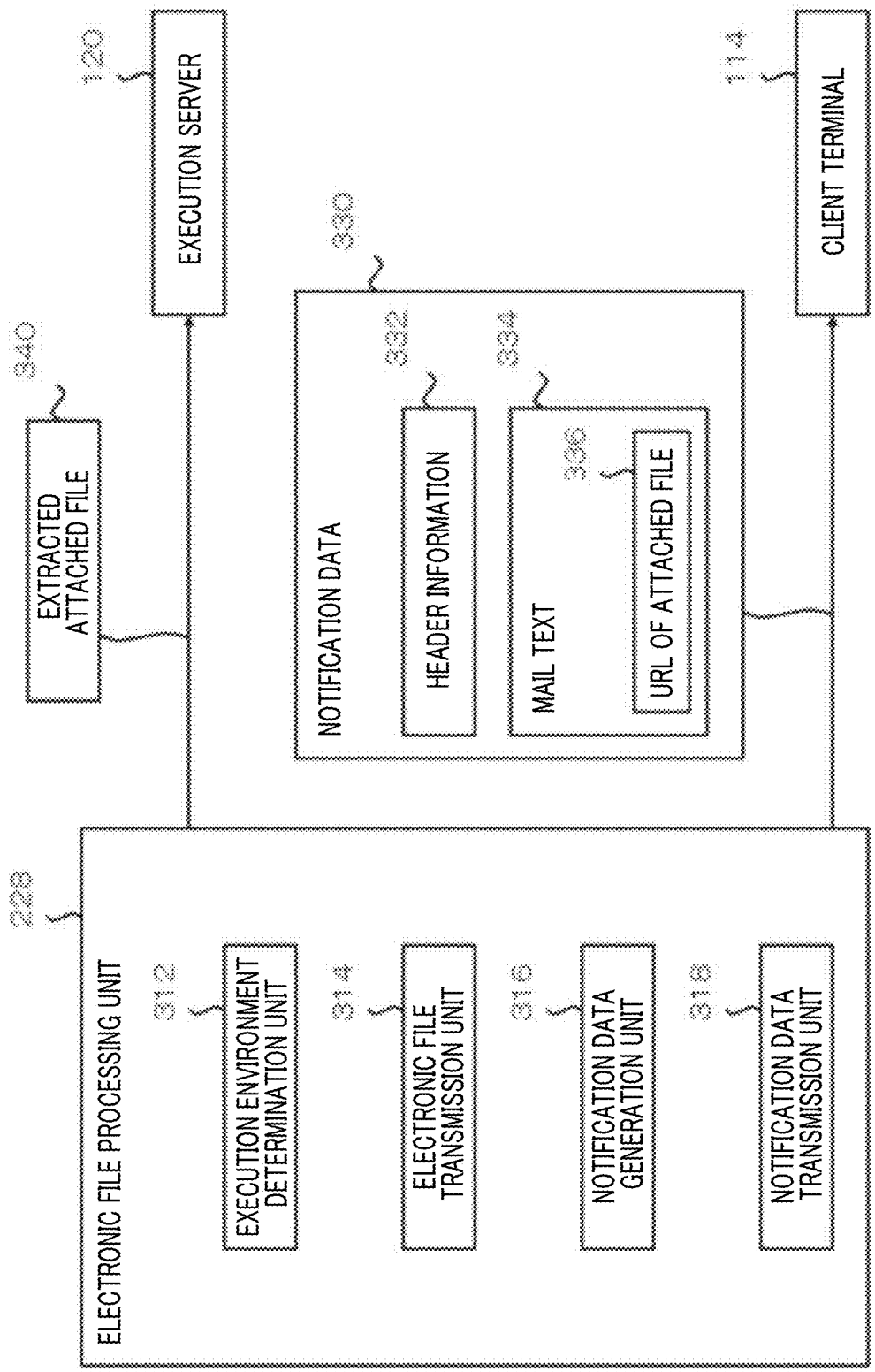
FIG. 3 schematically illustrates an example of an electronic file processing unit 228.

FIG. 3 schematically illustrates an example of the electronic file processing unit 228. In the description of FIG. 3, each unit of the electronic file processing unit 228 will be mainly described by taking an example in which the electronic file processing unit 228 transfers the attached file 340 extracted from the e-mail to the execution server 120. In the present embodiment, the electronic file processing unit 228 includes an execution environment determination unit 312, an electronic file transmission unit 314, a notification data generation unit 316, and a notification data transmission unit 318. The notification data generation unit 316 may be an example of a file conversion unit.

The execution environment determination unit 312 determines the execution environment in which the attached file 340 extracted by the electronic file extraction unit 226 is to be executed. In an embodiment, the execution environment determination unit 312 associates and stores user identification information for identifying each of one or more users and server identification information for identifying a virtual server assigned to the user, and determines the virtual server on which the attached file 340 is to be executed on the basis of the user identification information of the user of the client terminal 114.

In another embodiment, the execution environment determination unit 312 determines the virtual server in which the attached file 340 is to be executed on the basis of the identification information of the client terminal 114, the protocol of the connection destination URI (for example, HTTP, FTP, or the like), the connection destination URI, the connection source IP address, the version of the connection source IP address, or information on the creator, the recipient, the file name, the file format, the extension, the file size or the like of the attached file 340. In another embodiment, the execution environment determination unit 312 randomly determines, from among one or more virtual servers, a virtual server in which the attached file 340 is to be executed.

In still another embodiment, the execution server 120 determines the virtual server in which the attached file 340 is to be executed. In an embodiment, the execution environment determination unit 312 requests the execution server 120 to determine the execution environment in which the attached file 340 is to be executed. The execution server 120 determines the execution environment in which the attached file 340 is to be executed on the basis of, for example, the identification information of the client terminal 114, the identification information of the user of the client terminal 114, the protocol of the connection destination URI (for example, HTTP, FTP, or the like), the connection destination URI, the connection source IP address, the version of the connection source IP address, or information on the creator, the recipient, the file name, the file format, the extension, the file size or the like of the attached file 340. The execution server 120 notifies the execution environment determination unit 312 of the determined execution environment. As a result, the execution environment determination unit 312 can determine the execution environment on which the attached file 340 is to be executed.

The execution environment determination unit 312 may determine the storage location of the attached file 340 in the execution environment. The execution environment in which the attached file 340 is to be executed may be determined on the basis of the storage location of the attached file 340. The execution environment determination unit 312 may transmit at least one of the information for identifying the execution environment and the information indicating the storage location of the attached file to the electronic file transmission unit 314 and the notification data generation unit 316.

The execution environment determination unit 312 may obtain information on the execution environment when the attached file is executed, when the remote control protocol is executed, or the like. The remote control unit 244 may obtain the information on the execution environment from the execution server 120. Examples of the information on the above-described execution environment include information identifying a server that serves as the execution environment, the expiration date of the server, the user ID of the user of the file transfer system 100 or the client terminal 114 in the server, a password associated with the user ID, and the like.

In the present embodiment, the case where the execution environment determination unit 312 is disposed in the electronic file processing unit 228 has been described. However, the execution environment determination unit 312 is not limited to this embodiment. The execution environment determination unit 312 may be disposed in the execution server 120.

The electronic file transmission unit 314 transmits, for example, the attached file 340 to the execution server 120 on the basis of the determination of the execution environment determination unit 312. The electronic file transmission unit 314 may transmit the converted attached file 340 to the execution server 120.

The notification data generation unit 316 generates notification data 330 indicating that an e-mail from the other terminal 20 has been received. In the present embodiment, the notification data generation unit 316 generates the notification data 330 for the client terminal 114. The notification data 330 for the client terminal 114 includes header information 332 and a mail text 334. The mail text 334 includes a URI 336 of the attached file 340. The URI 336 may be a URL indicating a storage location of the attached file 340 in the execution server 120 or the converted attached file 340. The notification data 330 may be an example of a data structure. The URI 336 may be an example of access information to the attached file 340. The URI 336 may be an example of at least one of transmission destination identification data and execution environment identification data.

The notification data generation unit 316 may generate the header information 332 using the header information included in the e-mail acquired by the electronic data acquisition unit 224. The notification data generation unit 316 may generate the mail text 334 on the basis of the information of the mail text included in the e-mail acquired by the electronic data acquisition unit 224 and the information of the storage location of the attached file 340 in the execution server 120 determined by the execution environment determination unit 312.

The notification data generation unit 316 may generate notification data for the execution server 120. The notification data for the execution server 120 may include restriction information for restricting the operation on the attached file 340 on the execution server 120.

The restriction information may be information in which user identification information for identifying a valid user of the electronic file is associated with operation permitted or prohibited for the user. The restriction information may be information in which electronic file identification information for identifying an electronic file and operation permitted or prohibited for the electronic file are associated. When the electronic file is encrypted, the restriction information may be information in which a pass code used for decoding the electronic file is further associated with the user identification information or the electronic file identification information.

Examples of user identification information for identifying a valid user of the electronic file include an e-mail address indicating the destination of the e-mail to which the electronic file is attached, information indicating the creator of the electronic file, and the like. Examples of the electronic file identification information include the name of the electronic file and the like. Examples of operation permitted or prohibited, include viewing, printing, editing, duplicating, moving, and transmission of electronic files, copying of the contents of electronic files to the clipboard, capturing of a screen, and the like.

The notification data generation unit 316 may generate the notification data 330 including at least one of the user identification information and the electronic file identification information included in the restriction information when the restriction information is created. As a result, for example, when the client terminal 114 that receives the notification data 330 accesses the execution server 120 on the basis of the URI 336 of the attached file 340, the client terminal 114 can transmit at least one of the user identification information and the electronic file identification information to the execution server 120. The client terminal 114 may transmit a user instruction including at least one of user identification information and electronic file identification information to the execution server 120.

According to another embodiment, the notification data generation unit 316 may store the restriction information in a particular proxy server, cloud system, database system (not shown). The notification data generation unit 316 may receive the restriction information from another system storing the restriction information and execute the restriction processing. The notification data generation unit 316 may create the notification data 330 including the URI of the specific proxy server and information used for user authentication in the proxy server.

The notification data transmission unit 318 transmits the notification data 330 to the client terminal 114. The notification data transmission unit 318 may transmit the restriction information to the execution server 120. After transmitting the notification data 330 to the client terminal 114, the notification data transmission unit 318 may delete the attached file 340 or the converted attached file 340 from the mail server 112.

In the present embodiment, the case where the notification data transmission unit 318 transmits the notification data 330 via the network 10 has been described. However, the transmission processing of the notification data 330 by the notification data transmission unit 318 is not limited to the present embodiment. The transmission destination of the notification data 330 may be a storage device on a computer in which the notification data transmission unit 318 is disposed, another application operating on the computer, or an external storage device. Examples of the external storage device include a hard disk, a memory, a CD-ROM, or the like.

In the present embodiment, the case where the attached file 340 is transferred to the execution server 120 has been described. However, the electronic file to be transferred is not limited to the attached file 340. The electronic file to be transferred may be the attached file 340 after conversion. For example, the notification data generation unit 316 executes conversion processing of the attached file 340. Examples of the conversion processing of the attached file 340 include processing of changing the format, extension or name of the attached file 340, processing of encrypting the attached file 340, and the like. The electronic file transmission unit 314 transmits the converted attached file 340 to the execution server 120. As a result, the converted attached file 340 is transferred to the execution server 120.

Figure 4:
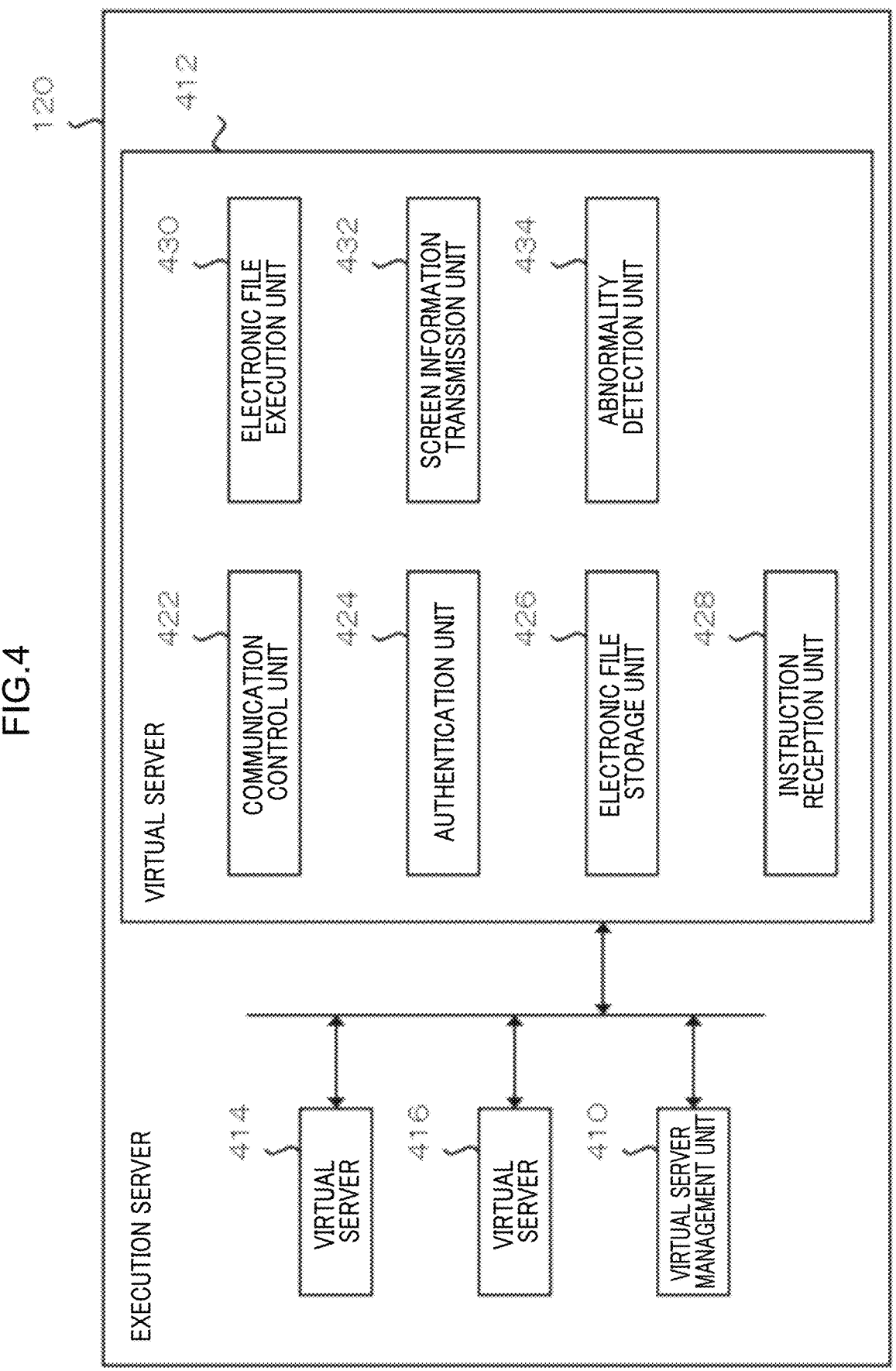
FIG. 4 schematically illustrates an example of an execution server 120.

FIG. 4 schematically illustrates an example of the execution server 120. The execution server 120 includes a virtual server management unit 410 and one or more virtual servers. In the present embodiment, the execution server 120 includes a virtual server 412, a virtual server 414, and a virtual server 416 as one or more virtual servers. The virtual server management unit 410 may be an example of a deletion unit, a standby unit, or a cleanup unit. The method for virtualizing each unit of the execution server 120 is not particularly limited. Each unit of the execution server 120 may be virtualized using a known virtualization technology or a virtualization technology to be developed in the future. For example, each unit of the execution server 120 is virtualized using a host type virtualization technology, a hypervisor type virtualization technology, a container type virtualization technology, and a technology combining these. In an embodiment, at least a part of the execution server 120 may be built on client terminal 114. For example, at least one of the virtual server 412, the virtual server 414, and the virtual server 416 is realized by using a process space in a virtual machine or container on the client terminal 114. In this case, the virtual server management unit 410 may be realized using the process space in the virtual machine or container on the client terminal 114, or may be built on the host OS of the client terminal 114.

The virtual server 412 has a communication control unit 422, an authentication unit 424, an electronic file storage unit 426, an instruction reception unit 428, an electronic file execution unit 430, a screen information transmission unit 432, and an abnormality detection unit 434. The virtual server 414 and the virtual server 416 may have a similar configuration to the virtual server 412. The virtual server 412, the virtual server 414, and the virtual server 416 may be an example of at least one of the execution environment and the information processing device.

The virtual server management unit 410 transmits and receives information to and from the remote control unit 244 using protocols such as http, https, ssh, remote desktop protocol (RDP), RDP over HTTPS, ICA, XProtocol, or PCoIP. At least one of the virtual server 412, the virtual server 414, and the virtual server 416 may transmit and receive information to and from the remote control unit 244 using a protocol such as remote desktop protocol (RDP), RDP over HTTPS, ICA, XProtocol, or PCoIP.

The virtual server management unit 410 manages one or more virtual servers included in the execution server 120. The virtual server management unit 410 rebuilt at least one of the one or more virtual servers when a predetermined event occurs. As a result, even when one of the virtual servers is infected with a virus, it is possible to easily launch a virtual server that is not contaminated with a virus.

As described above, the virtual server is an example of the execution environment. Examples of processing for rebuilt the execution environment (sometimes referred to as cleanup) include (i) separation processing of the execution environment (sometimes referred to as usage separation), (ii) processing of returning the execution environment to a snapshot at a specific time point (preferably a snapshot in a state not infected with a virus), (iii) failover processing of the execution environment (sometimes referred to as usage failover), and the like. In an embodiment, the virtual server management unit 410 may temporarily disconnect the execution environment from the user's use while the execution environment is cleaned up.

Examples of the predetermined event include an instruction from the user, a lapse of a predetermined period, a fact that the abnormality detection unit 434 has detected abnormality, a fact that a file has been created in a specific directory, a fact that a value is written in a specific registry, a fact that a specific value is written in a registry, a fact that the use of the virtual server by the client terminal 114 has ended, and the like. The rebuilding of the virtual server may be returning the virtual server to a specific state after the virtual server is built on the execution server 120, or restoring the OS of the virtual server or the execution server 120 to a specific state.

The rebuilding of the virtual server may be returning information peculiar to the user of the client terminal 114 to a state before the use of the virtual server by the client terminal 114 is started. At this time, other settings than setting of information peculiar to the user may not be changed. Examples of the information peculiar to the user include an electronic file stored in a user directory, usage history of a browser, information of a registry, and the like. The information peculiar to the user may be returned to the state before the use of the virtual server by the client terminal 114 is started, when the use of the virtual server by the client terminal 114 is ended.

Examples of the specific state after the virtual server is built on the execution server 120 include a state before a specific application is installed on the virtual server after the virtual server is built on the execution server 120, a state immediately after a specific application is installed on the virtual server, a state immediately before the rebuilding processing is performed, and the like. Examples of the processing of restoring the OS to a specific state include processing of initializing the OS.

The virtual server management unit 410 may store, in the setting file, settings related to the user in the virtual server, before rebuilding the virtual server. The virtual server management unit 410 may store a plurality of setting files for each user or each virtual server. Each of the plurality of setting files may store the above-described settings related to the user at different times. After rebuilding the virtual server, the virtual server management unit 410 reads the above-described setting files. As a result, the execution server 120 or the virtual server can be returned to a specific state.

When the above-described predetermined event occurs, the virtual server management unit 410 may execute maintenance processing of the OS (sometimes referred to as a guest OS) of the virtual server. Examples of the maintenance processing of the guest OS include processing of returning user information used by the guest OS to a specific state. The virtual server management unit 410 may perform maintenance processing of the guest OS for each guest OS. Examples of a specific state include a predetermined state or a state designated by the user.

When rebuilding the specific virtual server, or when maintaining the guest OS of the virtual server, the virtual server management unit 410 may update reference information of the virtual server so that the user of the client terminal 114 or the file transfer system 100 cannot refer to the virtual server. When rebuilding the specific virtual server or maintaining the guest OS of the virtual server is ended, the virtual server management unit 410 may update reference information of the virtual server so that the user of the client terminal 114 or the file transfer system 100 can refer to the virtual server.

In response to a request from the mail system 110, the virtual server management unit 410 may determine the execution environment in which the attached file 340 is to be executed. In response to a request from the mail system 110, the virtual server management unit 410 may determine the storage location of the attached file 340. The virtual server management unit 410 may transmit at least one of the determined execution environment and storage location to the mail system 110.

The virtual server management unit 410 may determine the execution environment or the storage location of the electronic data or the electronic file on the basis of the current value or the predicted value such as the load of the virtual server 412 to the virtual server 416, the resource usage, and the number of client terminals connected. The virtual server management unit 410 may determine the virtual server to which the client terminal 114 is connected on the basis of the current value or the predicted value such as the load of the virtual server 412 to the virtual server 416, the resource usage, and the number of client terminals connected.

The virtual server management unit 410 may concentrate the load on at least the virtual server 412 to the virtual server 416, and may allocate the load such that the loads on the virtual server 412 to the virtual server 416 become substantially even. As a result, the virtual server 412 to the virtual server 416 can be operated efficiently. The virtual server management unit 410 may perform processing such as building a new virtual server or rebuilding or deleting an existing virtual server on the basis of the current value or predicted value such as the load of one or more servers, the resource usage, and the number of client terminals connected.

The virtual server management unit 410 may collectively manage the environments of the virtual server 412 to the virtual server 416. For example, the virtual server management unit 410 collectively edits the settings of the OSs of the virtual server 412 to the virtual server 416. The virtual server management unit 410 may install applications collectively to the virtual server 412 to the virtual server 416 or may distribute electronic data or electronic files.

The virtual server management unit 410 may generate a management screen for managing the OSs of the virtual server 412 to the virtual server 416. The above-described management screen may be a GUI or a CUI.

The virtual server management unit 410 may store the usage history of each of the virtual server 412 to the virtual server 416. The virtual server management unit 410 may store the usage history of each of the virtual server 412 to the virtual server 416 for each client terminal 114 or for each user of the client terminal 114. The usage history may include information related to files executed in the virtual server. When the virtual server can access an external server or the like, the usage history may include the IP address of the external server or the like accessed by the virtual server.

The virtual server management unit 410 may restrict the use of at least one of the virtual server 412 to the virtual server 416 (sometimes referred to as a virtual server 412 or the like) by the client terminal 114. For example, when the client terminal 114 starts using the virtual server 412 or the like and a predetermined time has elapsed, the virtual server management unit 410 may restrict the use of the virtual server 412 or the like. The virtual server management unit 410 may execute processing for extending the usage time of the virtual server 412 or the like, or may execute processing of immediately stopping the usage of the virtual server 412 or the like.

The virtual server management unit 410 may obtain, from the virtual server 412, information stored in a cookie of a web browser installed in the client terminal 114, the virtual server 412 or the like, a bookmark registered in the web browser (sometimes referred to as "favorite"), the user ID stored in the web browser, password information for each site such as login password to the website, setting information of various websites, setting information of the web browser, plug-in, or the like. Note that various plug-ins may be installed in the web browser. This is similar for a web browser installed in another information processing device.

The virtual server management unit 410 may store the information acquired from the client terminal 114, the virtual server 412, or the like in an arbitrary storage device such as the storage device of the execution server 120, the storage device of the client terminal 114, or the storage device of the mail server 112. The virtual server management unit 410 may store predetermined information among pieces of information acquired from the virtual server 412 or the like in any storage device described above.

The virtual server management unit 410 may transmit proxy information of a web browser installed on the client terminal 114 to the virtual server 412 or the like. The virtual server management unit 410 may transmit proxy information corresponding to each of the virtual server 412 to the virtual server 416.

The communication control unit 422 controls communication between the virtual server 412 and an external computer. Examples of the external computer include the other terminal 20, the mail server 112, the client terminal 114, the virtual server management unit 410, the virtual server 414, the virtual server 416, or the like. The communication control unit 422 may be a communication interface. The communication control unit 422 may correspond to a plurality of communication methods.

The communication control unit 422 may establish a remotely controllable communication path in between the client terminal 114 or the other terminal 20 and the virtual server 412 according to a request from the client terminal 114 or the other terminal 20. The communication control unit 422 may prohibit transmission of information from the virtual server 412 to the outside unless the virtual server 412 responds according to a request to the virtual server 412.

The communication control unit 422 may control the connection time with the client terminal 114. The communication control unit 422 may limit communication with the client terminal 114 when communication with the client terminal 114 is started and a predetermined time has elapsed. Examples of a method of restricting communication include interruption of communication, restriction of communication speed, and the like.

Since the virtual server 412 executes the attached file 340 transferred from the client terminal 114, the virtual server 412 may be infected with a virus. However, by limiting the communication with the outside by the communication control unit 422, even if the virtual server 412 is infected with a virus, the virtual server 412 can be prevented from transmitting a virus to an external computer or attacking an external computer with denial of service attack (DoS).

The authentication unit 424 authenticates an external computer or user. The authentication unit 424 may permit remote control from an authenticated computer or user.

The electronic file storage unit 426 receives the attached file 340 or the converted attached file 340 from the client terminal 114 or the other terminal 20. The electronic file storage unit 426 stores the received attached file 340 or the converted attached file 340.

The instruction reception unit 428 accepts an instruction from the user (sometimes referred to as a user instruction) via the client terminal 114 and the network 10. The instruction reception unit 428 may receive an instruction from the user via the other terminal 20 and the network 10.

The electronic file execution unit 430 executes the attached file 340 or the converted attached file 340 on the basis of the user's instruction. For example, when the instruction reception unit 428 receives an execution instruction for executing the attached file 340, the electronic file execution unit 430 reads the attached file 340 stored in the electronic file storage unit 426, and executes the attached file 340. When the attached file 340 after conversion is stored in the electronic file storage unit 426, the electronic file execution unit 430 executes processing for returning the attached file 340 after conversion to the attached file 340 before conversion, and then executes the attached file 340.

When the execution server 120 has received the restriction information from the mail server 112, the electronic file execution unit 430 may determine whether to respond to the user instruction on the basis of the restriction information. For example, the electronic file execution unit 430 refers to the restriction information to determine whether the operation indicated by the user instruction is permitted or prohibited for the user or the electronic file. This makes it possible to limit the operation on the electronic file.

According to an embodiment, the electronic file execution unit 430 refers to the user identification information and the restriction information included in the user instruction, and extracts the operation permitted or prohibited for the user identified by the user identification information. The electronic file execution unit 430 compares the operation indicated by the user instruction with the extracted operation to determine whether to execute the operation indicated by the user instruction.

According to another embodiment, the electronic file execution unit 430 refers to the name of the electronic file and the restriction information indicated by the user instruction to extract operation permitted or prohibited for the electronic file. The electronic file execution unit 430 compares the operation indicated by the user instruction with the extracted operation to determine whether to execute the operation indicated by the user instruction.

The screen information transmission unit 432 transmits screen information to be displayed to the user. When the instruction reception unit 428 receives the user instruction from the client terminal 114, the screen information transmission unit 432 transmits the screen information to be displayed on the display device of the client terminal 114 to the client terminal 114 via the network 10. When the instruction reception unit 428 receives the user instruction from the other terminal 20, the screen information transmission unit 432 transmits the screen information to be displayed on the display device of another terminal 20 to another terminal 20 via the network 10.

The abnormality detection unit 434 detects abnormality of the virtual server 412. The abnormality detection unit 434 the abnormality detection unit 434 detects abnormality of the virtual server 412 when the virtual server 412 executes operation other than the operation according to the instruction from the user. When the abnormality detection unit 434 detects abnormality of the virtual server 412, the abnormality detection unit 434 may notify the virtual server management unit 410 that abnormality has been detected.

The abnormality detection unit 434 may perform a virus test of the attached file 340. When the abnormality detection unit 434 detects a virus, the abnormality detection unit 434 may generate screen information indicating that the virus has been detected. When the abnormality detection unit 434 detects a virus, the abnormality detection unit 434 may notify the virtual server management unit 410 that the virus has been detected.

In the present embodiment, an embodiment of the execution server 120 has been described with reference to FIG. 4. However, the execution server 120 is not limited to the present embodiment. For example, the division of roles between the virtual server 410, the virtual server 412, the virtual server 414, and the virtual server 416 is not limited to the above embodiment.

In an embodiment, the virtual server management unit 410 may have at least part of the functions of the communication control unit 422, and at least part of the information processing in the communication control unit 422 may be executed by the virtual server management unit 410. In another embodiment, the communication control unit 422 may have at least part of the function of the virtual server management unit 410, and at least part of the information processing in the virtual server management unit 410 may be executed by the communication control unit 422.

Figure 5:
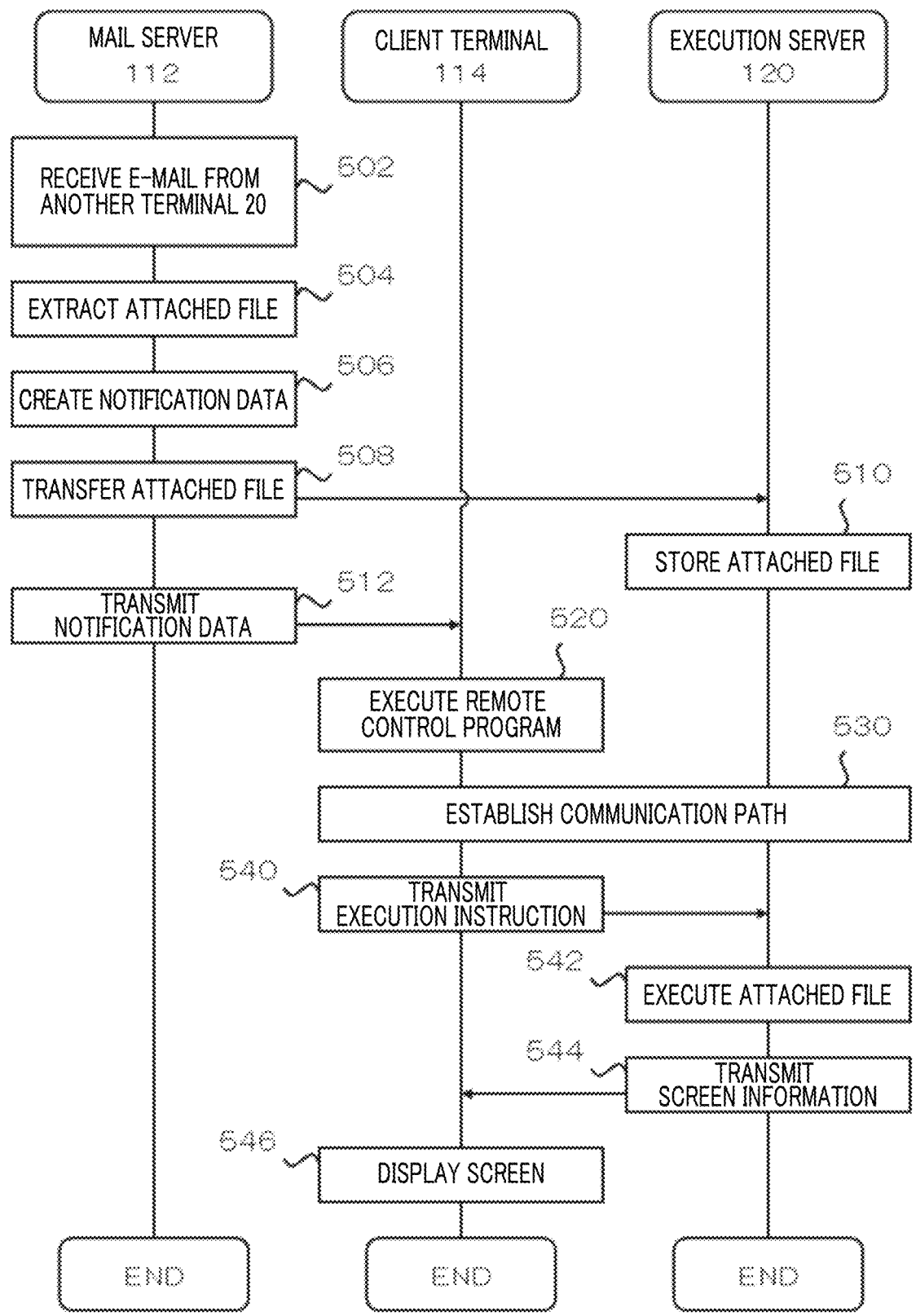
FIG. 5 schematically illustrates an example of processing in the file transfer system 100.

FIG. 5 schematically illustrates an example of processing in the file transfer system 100. FIG. 5 schematically illustrates an example of processing when the mail server 112 receives an e-mail addressed to the client terminal 114 from the other terminal 20.

According to the present embodiment, in step 502 (step may be abbreviated as S), the electronic data acquisition unit 224 acquires an e-mail addressed to the client terminal 114 from the other terminal 20. In S504, the electronic file extraction unit 226 extracts the attached file 340 included in the e-mail. In S506, the notification data generation unit 316 generates the notification data 330. In S508, the electronic file transmission unit 314 transmits the attached file 340 to the virtual server 412. In S510, the electronic file storage unit 426 stores the attached file 340. In S512, the notification data transmission unit 318 transmits the notification data 330 to the client terminal 114.

The user of the client terminal 114 checks the notification data 330 on the client terminal 114. When the user desires to view or download the attached file 340 in S520, the user executes the remote control program on the client terminal 114. In S530, the remote control unit 244 establishes a remotely controllable communication path in between the client terminal 114 and the execution server 120.

According to an embodiment, the user activates the remote control program installed on the client terminal 114. Next, the user inputs the URI of the attached file 340 into the remote control program. As a result, the remote control unit 244 establishes a remotely controllable communication path in between the client terminal 114 and the execution server 120. According to another embodiment, a link is made to the URI of the attached file 340 in the notification data 330, and when the user clicks the link, the remote control program installed on the client terminal 114 is activated. As a result, the remote control unit 244 establishes a remotely controllable communication path in between the client terminal 114 and the execution server 120.

In S540, when the user desires to execute the attached file, the user inputs, to the input unit 246, an execution instruction for executing the attached file 340 on the virtual server 412. When the input unit 246 accepts an execution instruction from the user, the remote control unit 244 transmits the execution instruction to the virtual server 412. In S542, when the instruction reception unit 428 accepts an execution instruction from the client terminal 114, the electronic file execution unit 430 executes the attached file 340. In S544, the screen information transmission unit 432 transmits the screen information to the client terminal 114. In S546, the output unit 248 displays the screen information.

By the above processing, the user can safely view the execution result of the attached file 340. When the user desires to download the attached file 340, the user inputs to the input unit 246 a transfer instruction for transferring the attached file 340 to the client terminal 114. The remote control unit 244 receives the user's transfer instruction from the input unit 246 and transmits the transfer instruction to the virtual server 412. As a result, the user can acquire the attached file 340.

Figure 6:
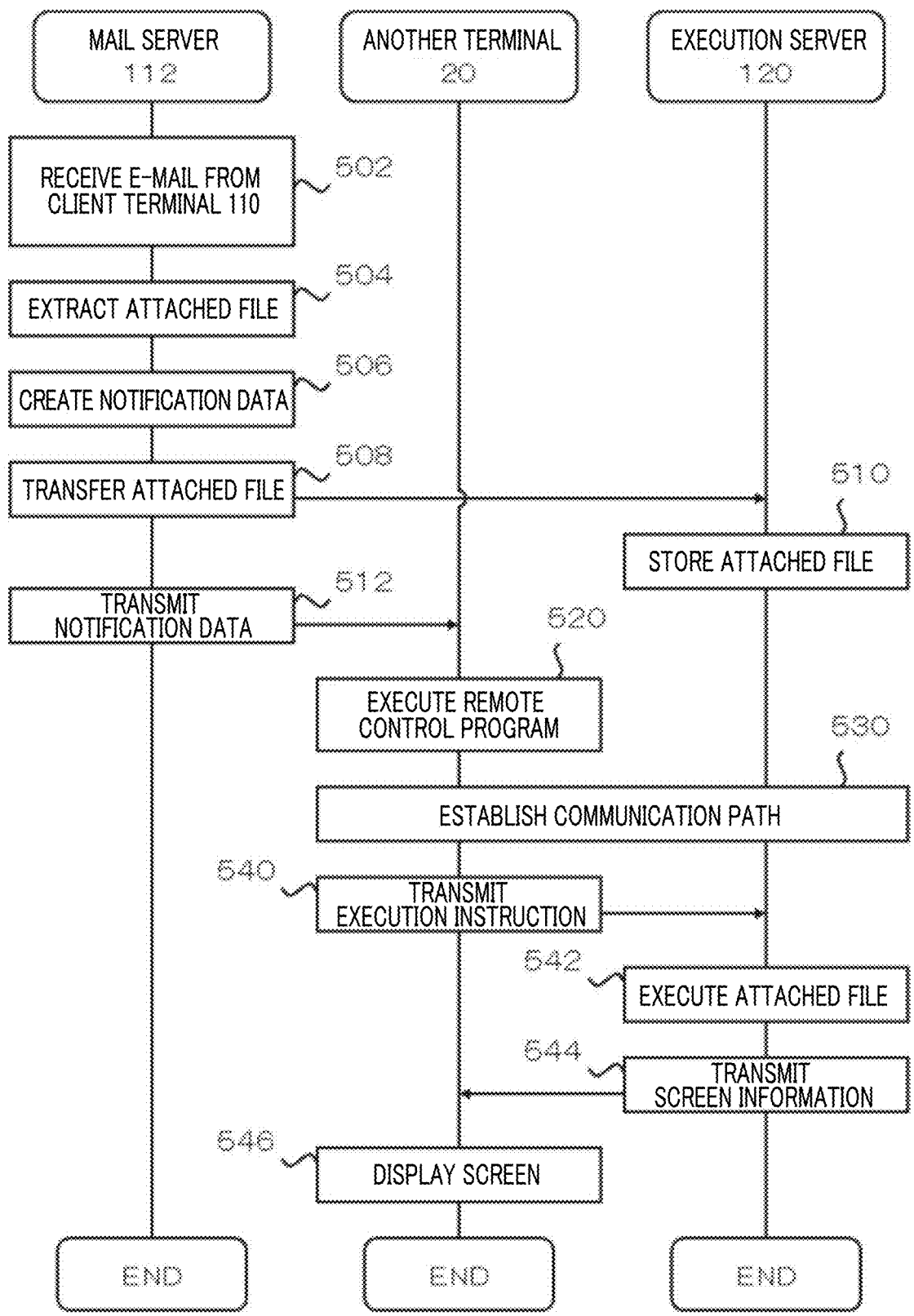
FIG. 6 schematically illustrates an example of processing in the file transfer system 100.

FIG. 6 schematically illustrates an example of processing in the file transfer system 100. FIG. 6 schematically illustrates an example of processing when the mail server 112 receives an e-mail addressed to the other terminal 20 from the client terminal 114. The processing in FIG. 6 is different from the processing in FIG. 5 in that, the electronic data acquisition unit 224 receives an e-mail addressed to the other terminal 20 from the client terminal 114 in S502, and the processing after S520 is performed between the other terminal 20 and the virtual server 412. The processing in FIG. 6 may have a similar configuration to the processing in FIG. 5 with respect to the configuration other than the difference.

Figure 7:
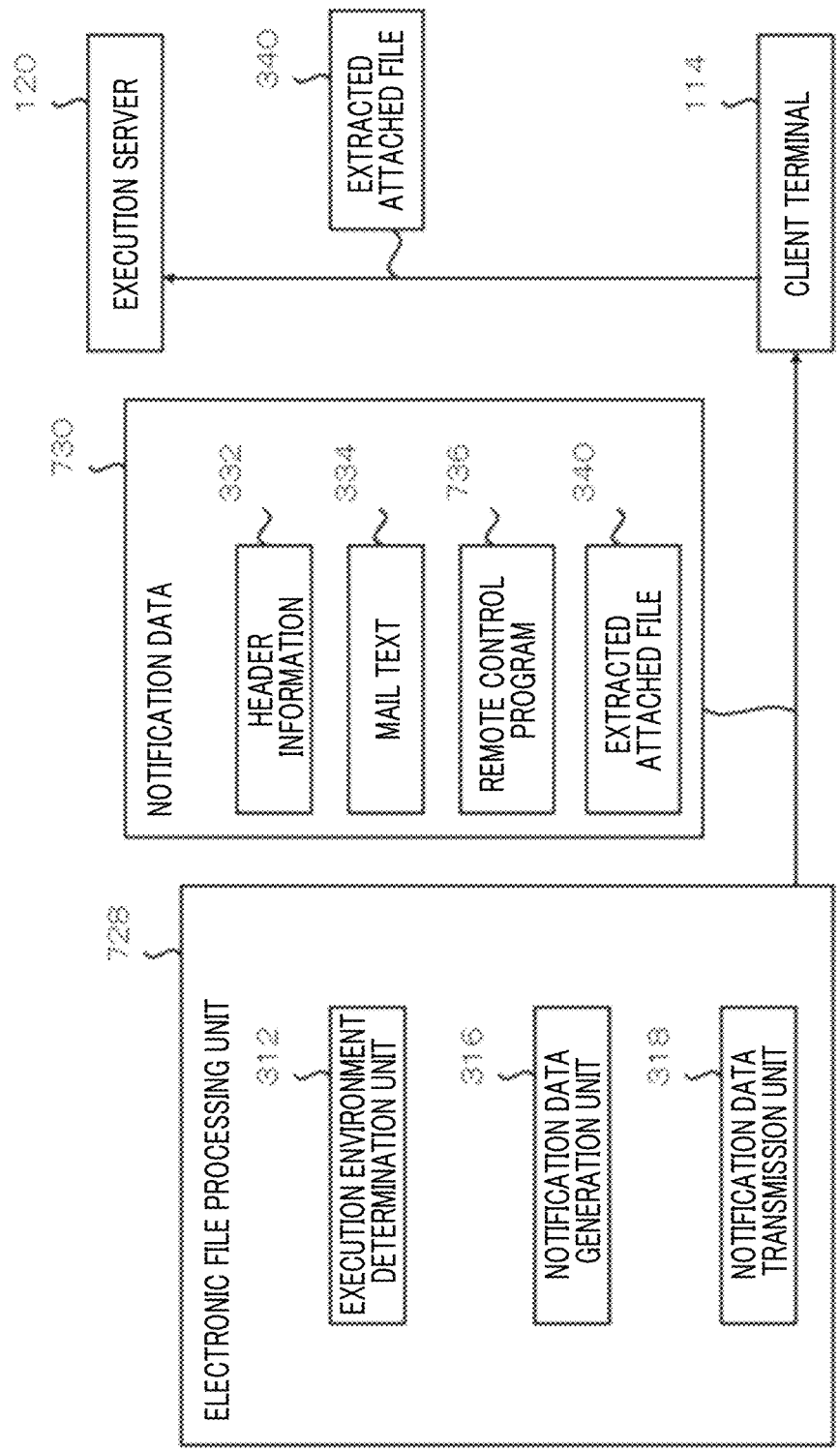
FIG. 7 schematically illustrates an example of an electronic file processing unit 728.

FIG. 7 schematically illustrates an example of the electronic file processing unit 728. The electronic file processing unit 728 is different from the electronic file processing unit 228 in that the electronic file processing unit 728 does not have the electronic file transmission unit 314, and the notification data generation unit 316 generates the notification data 730 including the attached file 340 and the remote control program 736. The electronic file processing unit 728 may have the similar configuration to the electronic file processing unit 228 except for the configuration other than the difference.

In the present embodiment, the notification data generation unit 316 generates a remote control program 736 for remotely controlling the execution environment determined by the execution environment determination unit 312. The notification data generation unit 316 may be an example of a remote control program generation unit. In an embodiment, the remote control program 736 may include transmission destination identification data for identifying a transmission destination of the attached file 340 or the converted attached file 340, and execution environment identification data for identifying the execution environment in which the attached file 340 is to be executed. The remote control program 736 may be an example of the access information to the attached file 340. The remote control program 736 may be an example of at least one of transmission destination identification data and execution environment identification data. In another embodiment, the mail text 334 may include transmission destination identification data and execution environment identification data, and the remote control program 736 may acquire the transmission destination identification data and execution environment identification data included in the mail text 334 when executing.

The remote control program 736 may be a program for causing a computer to execute a procedure for establishing a communication path in between the computer and the virtual server 412. The above-described communication path may be a communication path in which another computer that stores the attached file or the converted attached file can be remotely controlled from a computer executing the remote control program. The remote control program 736 may be a program for causing a computer to further execute a procedure for transmitting an execution instruction for executing the attached file 340 on the client terminal 114 to the execution environment via a remotely controllable communication path.

The remote control program 736 may be a program for causing the computer to further execute a procedure for transmitting the attached file 340 or the converted attached file 340 via the network 10 to the virtual server 412. As a result, when the remote control program 736 is executed on the client terminal 114, the client terminal 114 can transfer the attached file 340 included in the notification data 730 to the virtual server 412.

The notification data generation unit 316 generates the notification data 730. In the present embodiment, the notification data 730 includes the header information 332, the mail text 334, the attached file 340, and the remote control program 736. The mail text 334 and the attached file 340 may be electronic files separate from the remote control program 736, and the remote control program 736 may be an electronic file including at least one of the mail text 334 and the attached file 340.

The notification data 730 may be an example of a data structure. The notification data 730 may be an example of a data structure stored by the client terminal 114 or the other terminal 20. For example, the notification data 730 may have a data structure including: data of the attached file 340; transmission destination identification data for identifying the transmission destination of the attached file 340; execution environment identification data for identifying the virtual server 412 in which the attached file 340 is to be executed; a procedure for transmitting the data of the attached file 340 or the converted attached file 340 to the transmission destination identified by the transmission destination identification data to the client terminal 114 or the other terminal 20; and a program for executing a procedure for establishing a remotely controllable communication path in between the client terminal 114 or the other terminal 20 and the virtual server 412 identified by the execution environment identification data. The client terminal 114 or the other terminal 20 may be an example of a first computer. The virtual server 412 may be an example of a second computer.

In the present embodiment, the case where the attached file 340 is transferred to the execution server 120 via the client terminal 114 has been described. However, the electronic file to be transferred is not limited to the attached file 340. The converted attached file 340 may be transferred to the execution server 120 via the client terminal 114.

Figure 8:
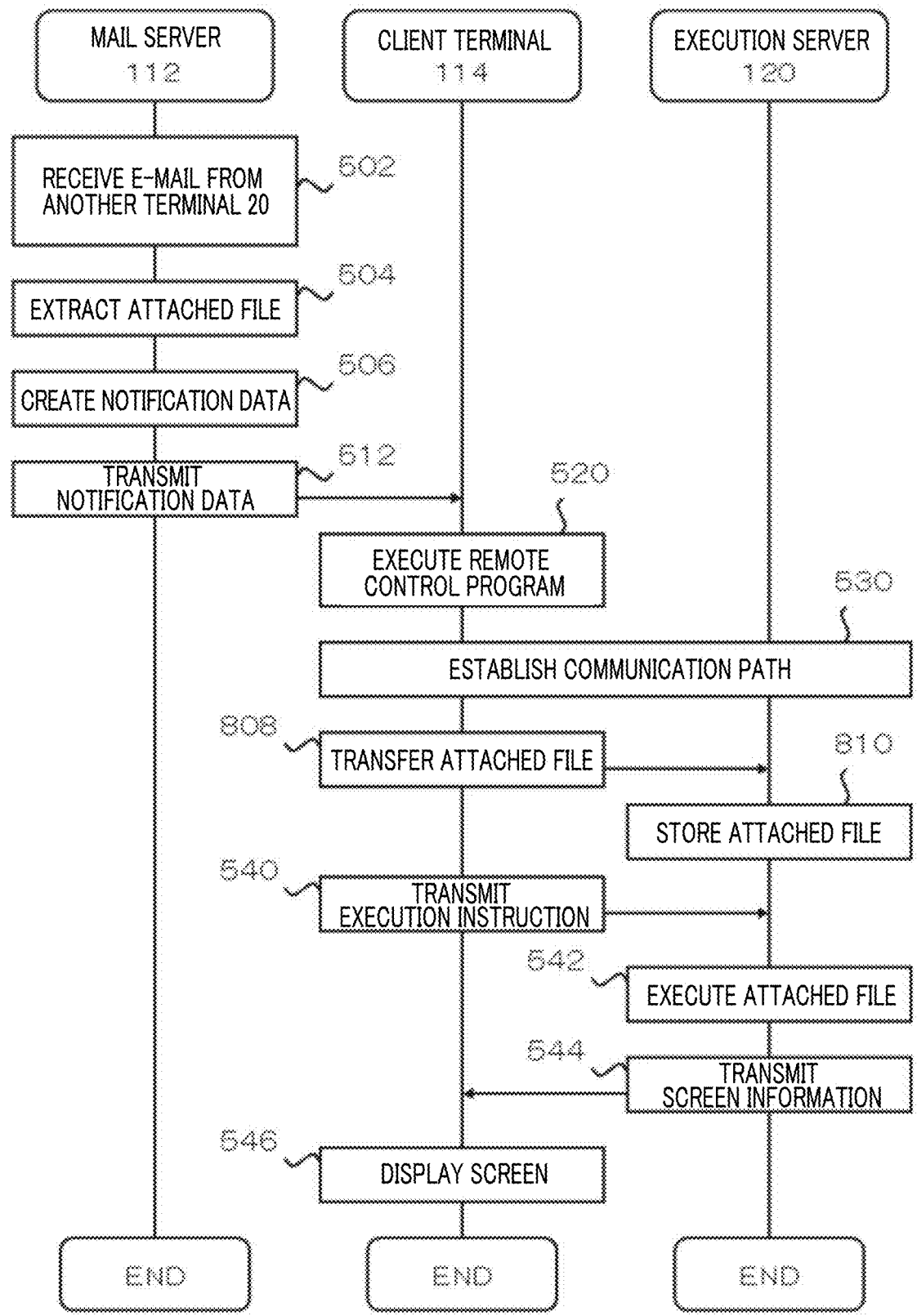
FIG. 8 schematically illustrates an example of processing in the file transfer system 100.

FIG. 8 schematically illustrates an example of processing in the file transfer system 100 including the electronic file processing unit 728. FIG. 8 schematically illustrates an example of processing when the mail server 112 receives an e-mail addressed to the client terminal 114 from the other terminal 20. The processing in FIG. 8 is different from the processing in FIG. 5 in that S808 and S810 are performed instead of S508 and S510. The processing in FIG. 8 may have a similar configuration to the processing in FIG. 5 with respect to the configuration other than the difference.

In S808, the remote control unit 244 extracts the attached file 340 included in the notification data 730. Furthermore, the remote control unit 244 transmits the attached file 340 to the execution server 120. In S810, the electronic file storage unit 426 stores the attached file 340.

In the present embodiment, the case where S808 and S810 are performed after S530 has been described. However, the timing at which S808 and S810 are performed is not limited to the present embodiment. In another embodiment, S808 and S810 may be performed after S520 and before S530.

Figure 9:
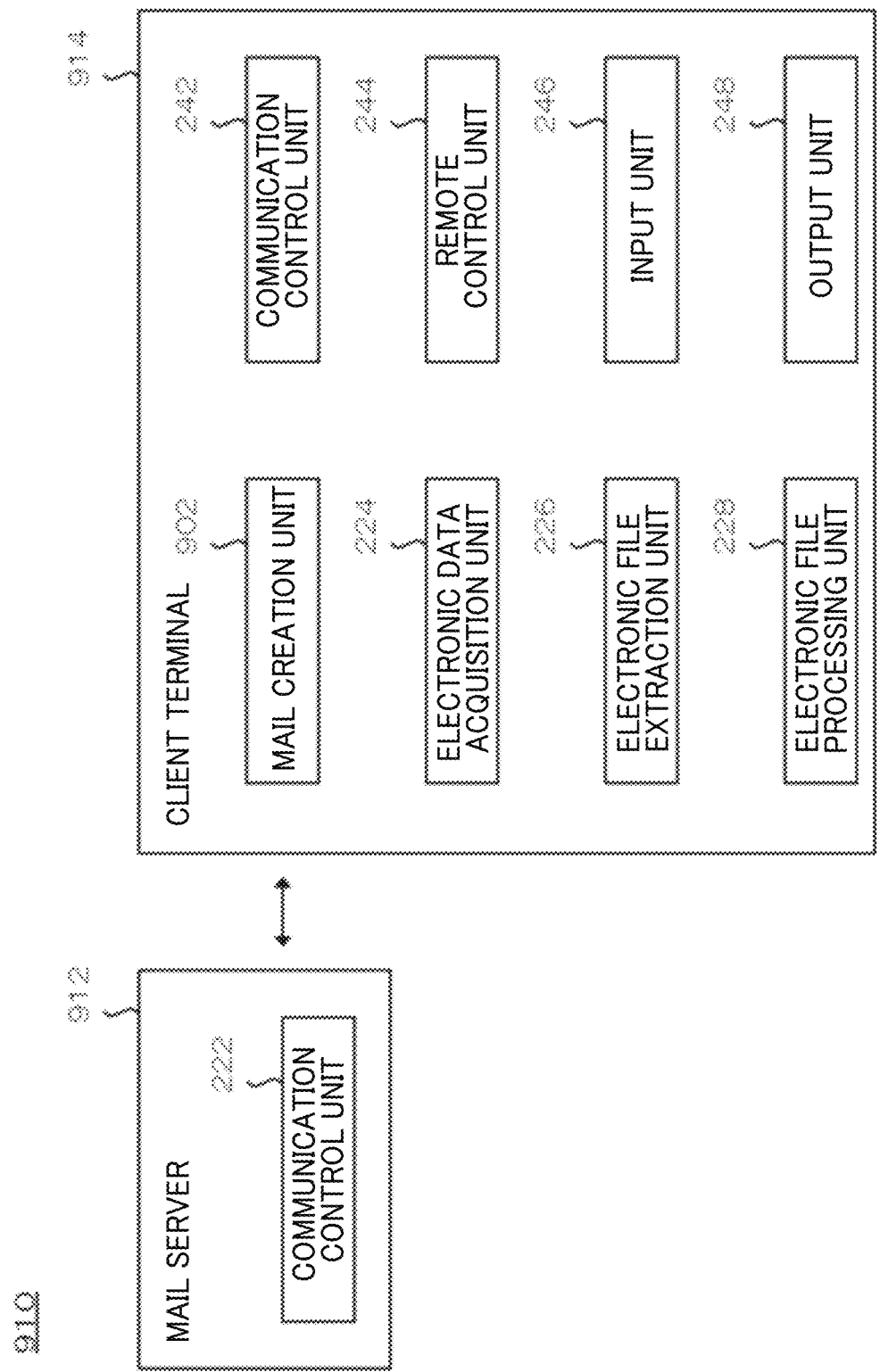
FIG. 9 schematically illustrates an example of a mail system 910.

FIG. 9 schematically illustrates an example of the mail system 910. The mail system 910 includes the mail server 912 and the client terminal 914. The client terminal 914 may have a mail creation unit 902 that creates an e-mail. The mail creation unit 902 may be an example of the command acquisition unit. The mail system 910 is different from the mail system 110 in that the electronic data acquisition unit 224, the electronic file extraction unit 226, and the electronic file processing unit 228 are disposed not on the mail server 912 but on the client terminal 914. The mail system 910 may have a similar configuration to the mail system 110 with respect to the configuration other than the above difference.

In the present embodiment, the case where the client terminal 914 includes the electronic file processing unit 228 has been described. However, the client terminal 914 is not limited to the present embodiment. The client terminal 914 may include the electronic file processing unit 728 instead of the electronic file processing unit 228. Furthermore, the electronic file processing unit 228 may not have the notification data transmission unit 318, and the notification data transmission unit 318 may transmit the notification data 330 or the notification data 730 to the mail creation unit 902.

In an embodiment, the electronic file processing unit 228 may detect the execution of the electronic file on the client terminal 914. The electronic file processing unit 228 may detect that the electronic file stored in the client terminal 914 is executed on the client terminal 914, or may detect that the electronic file stored in the external storage device connected to the client terminal 914 is executed on the client terminal 914. Examples of the external storage device include a semiconductor storage device such as a USB memory and an SB memory, a storage medium such as a CD, a DVD, and a BD, an information processing device connected to the client terminal 914 via a network, and the like.

The electronic file processing unit 228 may detect execution of a predetermined electronic file in the client terminal 914. The electronic file processing unit 228 may detect execution of a predetermined electronic file on the basis of the file format, the extension, or the like of the electronic file, or may detect execution of a predetermined electronic file on the basis of a predetermined list of electronic files.

When the execution of the electronic file is detected, the electronic file processing unit 228 causes the execution processing unit of the OS to cancel the execution of the electronic file. Furthermore, the electronic file processing unit 228 transmits the electronic file whose execution has been detected to the execution server 120. Next, the electronic file processing unit 228 activates the remote control unit 244 to establish a remotely controllable communication path with the execution server 120, and executes the electronic file on the execution server 120.

Figure 10:
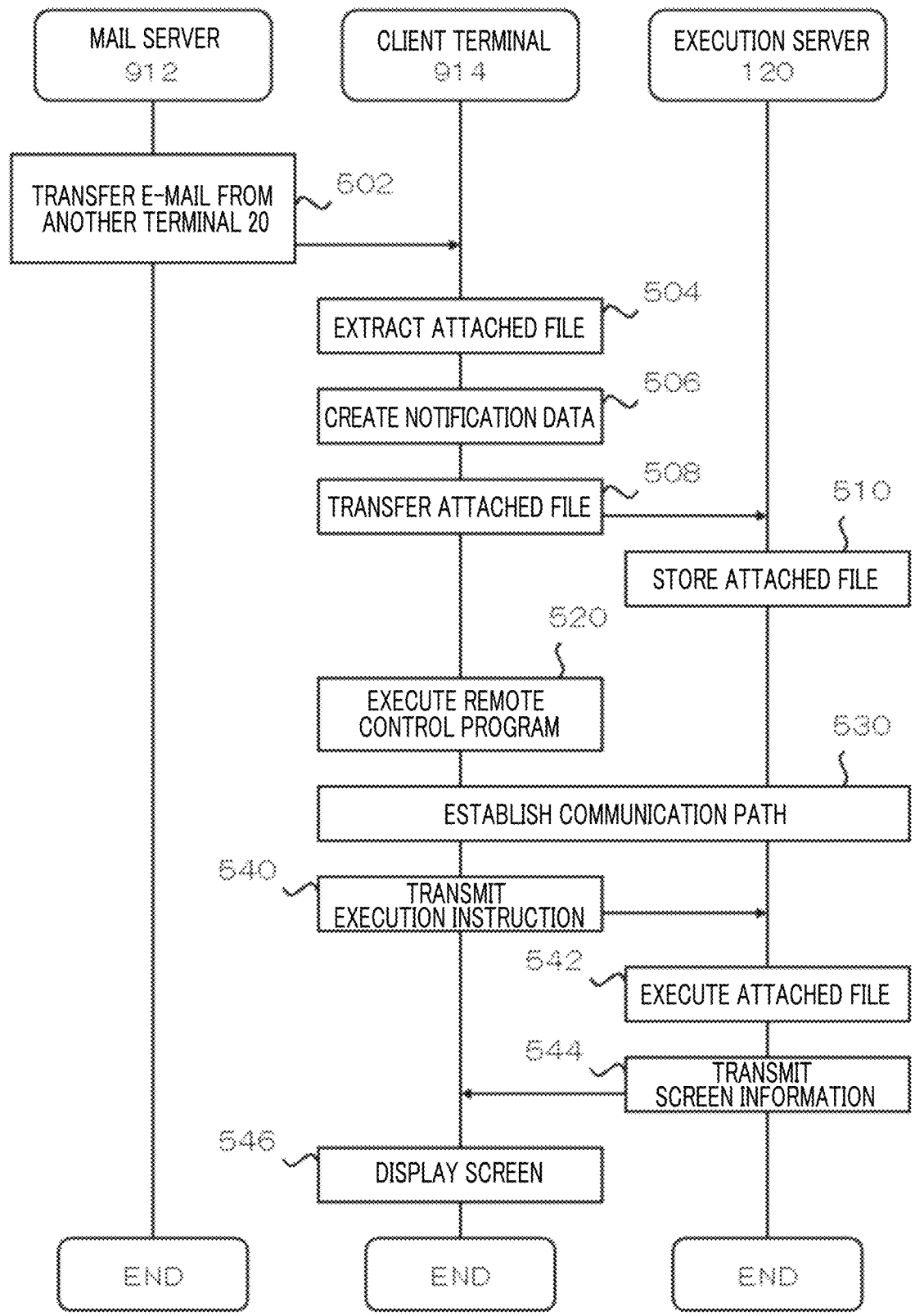
FIG. 10 schematically illustrates an example of processing in the file transfer system 100.

FIG. 10 schematically illustrates an example of processing in the file transfer system 100 including the mail system 910. FIG. 10 schematically illustrates an example of processing when the mail server 112 receives an e-mail addressed to the client terminal 114 from the other terminal 20.

The processing in FIG. 10 is different from the processing in FIG. 5 in that the e-mail from the other terminal 20 is transmitted from the mail server 112 to the client terminal 114 in S502, the processing in S504, S506 and S508 is executed in the client terminal 114, the processing in S512 is omitted. The processing in FIG. 10 may have a similar configuration to the processing in FIG. 5 with respect to the configuration other than the difference.

Figure 11:
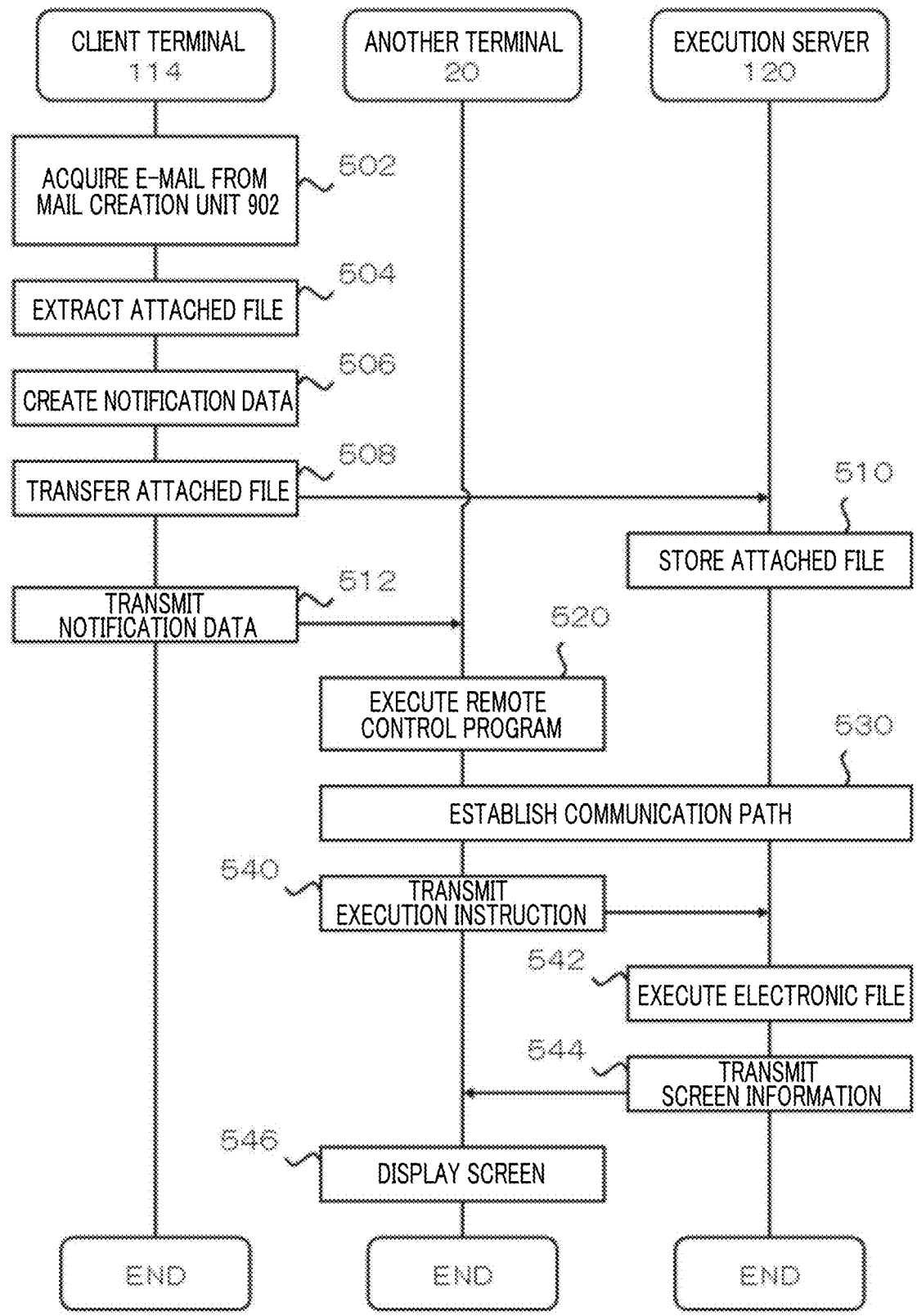
FIG. 11 schematically illustrates an example of processing in the file transfer system 100.

FIG. 11 schematically illustrates an example of processing in the file transfer system 100 including the mail system 910. FIG. 11 schematically illustrates an example of processing when the mail server 112 receives an e-mail addressed to the other terminal 20 from the client terminal 114.

The processing in FIG. 11 is different from the processing in FIG. 6 in that the processing in S502, S504, S506, S508 and S512 is executed in the client terminal 114, and the electronic data acquisition unit 224 of the client terminal 114 acquires an e-mail from the mail creation unit 902 in S502. The processing in FIG. 11 may have a similar configuration to the processing in FIG. 6 with respect to the configuration other than the difference.

Figure 12:
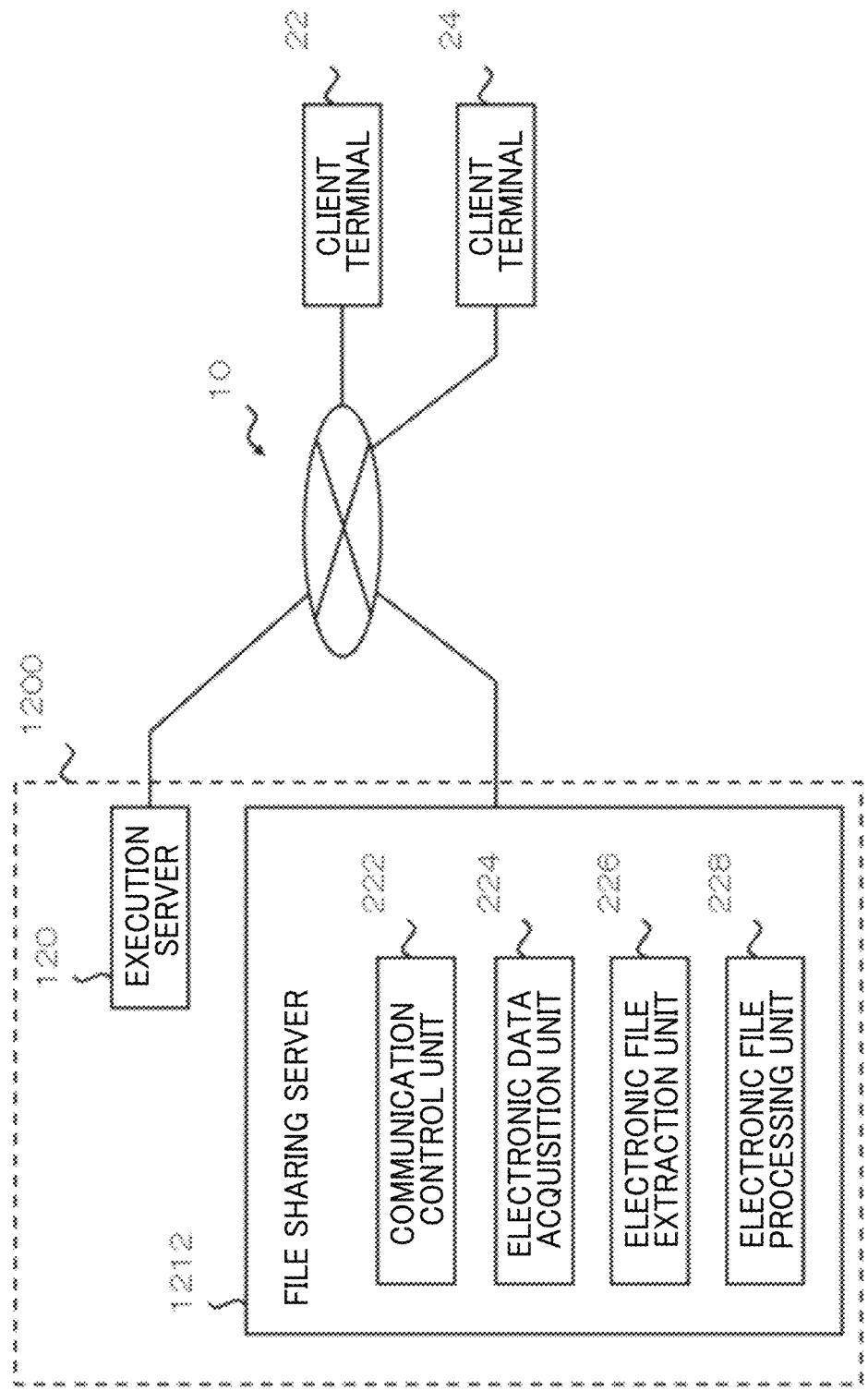
FIG. 12 schematically illustrates an example of a file transfer system 1200.

FIG. 12 schematically illustrates an example of the file transfer system 1200. The file transfer system 1200 includes the execution server 120 and the file sharing server 1212. The file sharing server 1212 includes a communication control unit 222, an electronic data acquisition unit 224, an electronic file extraction unit 226, and an electronic file processing unit 228.

The file transfer system 1200 is different from the file transfer system 100 in that the file transfer system 1200 includes the file sharing server 1212 instead of the mail system 110, and transmits and receives information with the client terminal 22 and the client terminal 24 via the network 10. The file transfer system 1200 may have a similar configuration to the file transfer system 100 with respect to the configuration other than the difference. The client terminal 22 and the client terminal 24 may have a similar configuration to the client terminal 114 or the other terminal 20. According to the file transfer system 1200, electronic files can be shared securely between the client terminal 22 and the client terminal 24.

The file transfer system 1200 may restrict operation for the attached file 340 on the execution server 120. The file transfer system 1200 may store restriction information in which user identification information for identifying a valid user of the electronic file is associated with an operation permitted or prohibited for the user. The user identification information for identifying the valid user of the electronic file may be information indicating the user designated when the electronic file is uploaded. Examples of operation permitted or prohibited, include viewing, printing, editing, duplicating, moving, and transmission of electronic files, copying of the contents of electronic files to the clipboard, capturing of a screen, and the like.

The restriction information may be information in which electronic file identification information for identifying an electronic file and operation permitted or prohibited for the electronic file are associated. The restriction information may be information in which user identification information, electronic file identification information, and processing of permitting or prohibiting for the electronic file or the user are associated. When the electronic file is encrypted, the restriction information may be information in which a pass code used for decoding the electronic file is further associated with the user identification information or the electronic file identification information.

The file transfer system 1200 may determine whether to respond to the user instruction on the basis of the restriction information. For example, when the file transfer system 1200 receives the user instruction for a specific electronic file from the user of the client terminal 22, the file transfer system 1200 refers to the restriction information to determine whether the operation indicated by the user instruction is permitted or not or prohibited or not for the user or the electronic file. This makes it possible to limit the operation on the electronic file.

The communication control unit 222 may have a firewall function. The communication control unit 222 may set a firewall so that the outside of the file transfer system 1200 cannot directly access the information stored in the file sharing server 1212. The communication control unit 222 may set an access right for each client terminal 114 or for each user of the client terminal 114.

The communication control unit 222 may realize a firewall function by an application program, or may realize a firewall function by an OS. The communication control unit 222 may set an appropriate firewall by changing the setting of the firewall function provided by the OS.

When the communication control unit 222 receives a request for instructing transmission of electronic data or an electronic file to the outside of the file sharing server 1212, the communication control unit 222 may accept the request if the request is from the virtual server management unit 410 of the execution server 120. On the other hand, when the request is not a request from the virtual server management unit 410 of the execution server 120, the request may not be accepted.

The file sharing server 1212 may include one server or may include a plurality of servers. The execution server 120 can retrieve a desired file even when the file sharing server 1212 includes a plurality of servers.

The file sharing server 1212 stores an electronic file shared between the client terminal 22 and the client terminal 24. The file sharing server 1212 may store the electronic file and the user information in association with each other as the same data as the user information and the electronic file, or may store the user information and the electronic file separately. The user information may be a unique SID used in Windows (registered trademark). The unique SID may be a login ID, a combination of a domain name and a user name, or may be a unique ID which is given by an application program and used to identify a user by the application program.

Figure 13:
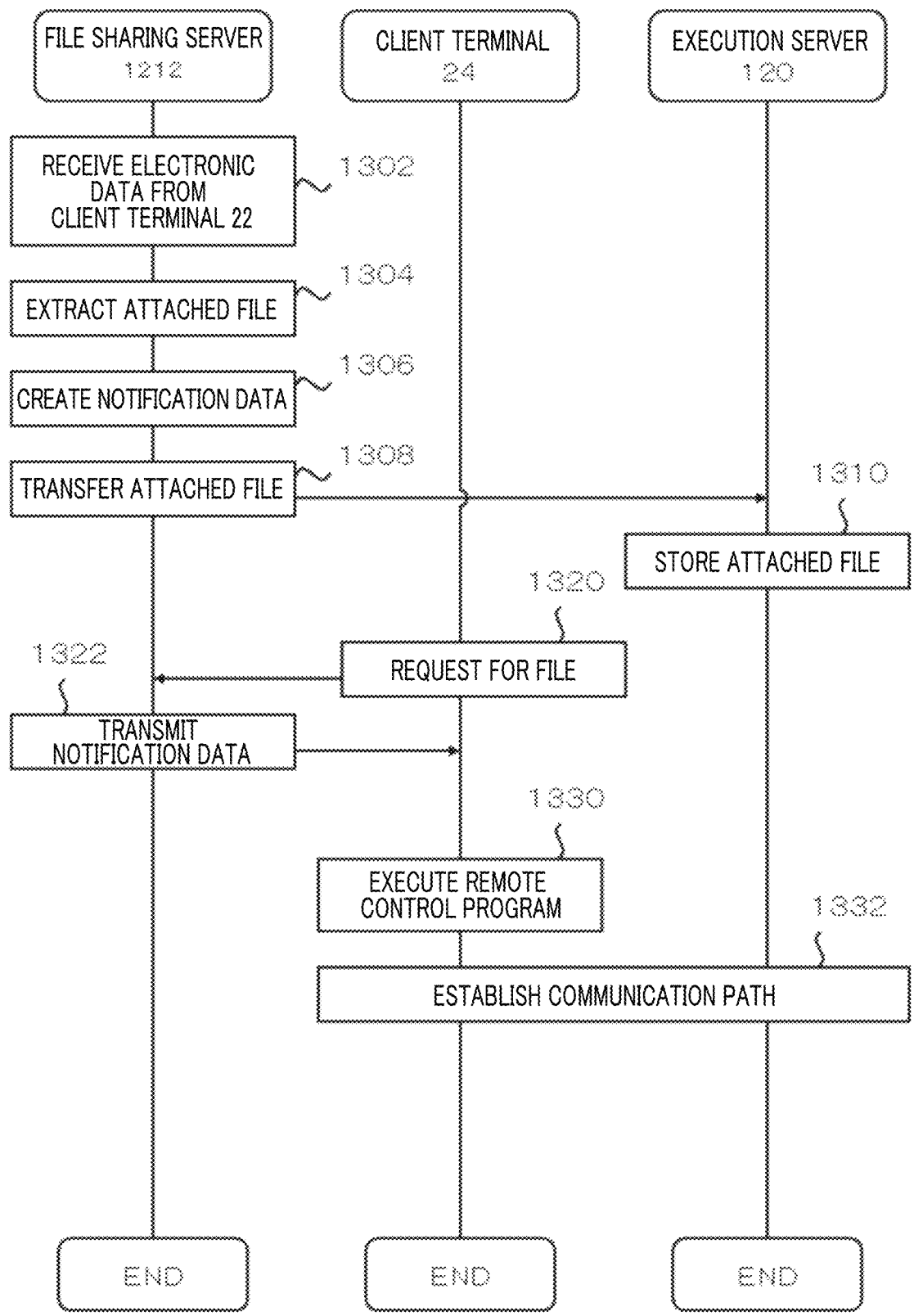
FIG. 13 schematically illustrates an example of processing in the file transfer system 1200.

FIG. 13 schematically illustrates an example of processing in the file transfer system 1200. FIG. 13 schematically illustrates an example of processing in the case where data uploaded by the client terminal 22 to the file sharing server 1212 is viewed from the client terminal 24.

In S1302, the electronic data acquisition unit 224 acquires electronic data uploaded from the client terminal 22. In S1304, the electronic file extraction unit 226 extracts an electronic file from the uploaded electronic data. In S1306, the notification data generation unit 316 generates notification data. In S1308, the electronic file transmission unit 314 transmits the electronic file to the virtual server 412. In S1310, the electronic file storage unit 426 stores the electronic file.

In S1320, the client terminal 24 requests the file sharing server 1212 to view or download the electronic file. In S1322, the notification data transmission unit 318 transmits the notification data to the client terminal 24.

The user of the client terminal 24 checks the notification data on the client terminal 24. When the user desires to view or download the electronic file in S1330, the user executes the remote control program on the client terminal 24. In S1332, the remote control unit 244 establishes a remotely controllable communication path in between the client terminal 24 and the execution server 120. The subsequent processing is similar to the processing in FIG. 5.

In the present embodiment, the case of using the file transfer system 100 and the file transfer system 1200 for the purpose of preventing virus infection has been described. However, the purpose of file transfer system 100 and file transfer system 1200 is not limited to the prevention of virus infection.

According to another embodiment, the file transfer system 100 or the file transfer system 1200 may be used to transmit the electronic file regardless of the setting of the transmission destination of the electronic file. According to still another embodiment, the file transfer system 100 or the file transfer system 1200 may be used to enable viewing of the electronic file regardless of the environment of the transmission destination of the electronic file.

FIG. 14 schematically illustrates an example of the file processing system 1400. The file processing system 1400 includes the execution server 120 and the file sharing server 1212, and a client terminal 1401. In the present embodiment, the client terminal 1401 has an electronic file storage unit 1402, an electronic file operation unit 1404, an electronic file storage control unit 1406, and an electronic file execution unit 430, in addition to the configuration of the client terminal 914 shown in FIG. 9. The execution server 120 has the same configuration as the execution server described in FIG. 4.

According to the embodiment described with reference to FIGS. 1, 9 and 12, the case where the client terminal or the file transfer system accepts an execution instruction for executing the electronic file and executes the electronic file on the execution server has been described. According to the present embodiment, a case will be described in which the file processing system 1400 accepts an instruction related to operation of an electronic file and executes operation according to the instruction on the execution server 120. The instruction related to the operation of the electronic file may be an example of the command related to the operation of electronic data. For example, when a user performs operation such as viewing or editing an electronic file stored in the client terminal 1401, the communication path is established between the client terminal 1401 and the execution server 120, and then the electronic file being a target of the operation is transferred from the client terminal 1401 to the execution server 120, and processing of the electronic file is executed on the virtual server.

The electronic file storage unit 1402 stores electronic files. In the present example, the electronic file storage unit 1402 stores the electronic file received from the file sharing server 1212. The electronic file operation unit 1404 acquires, for example, an instruction from the user related to the operation of the electronic file. Here, the operation of the electronic file may be processing to open the electronic file with a predetermined application, movement, duplicating, or printing of the electronic file, conversion of the file format, copying of the content of the electronic file to the clipboard, capturing of the screen, or the like.

The electronic file processing unit 228 has an execution environment determination unit 1408. The execution environment determination unit 1408 may determine the execution environment in which the operation of the electronic file is to be executed by remote control, on the basis of the format, the extension or the name of the electronic file, or the login ID of the client terminal 1401. The virtual server 412 to the virtual server 416 included in the execution server 120 are an example of the execution environment. The client terminal 1401 transfers the electronic file to the execution server 120 according to an instruction from the user, and remotely controls the electronic file on the virtual server of the execution server 120. The above instruction from the user may be an example of an execution instruction for executing operation of the electronic file on the execution environment. As a result, in the execution environment, processing according to the operation of the electronic file is performed. In the present embodiment, the operation of the electronic file indicated by the instruction from the user is not executed on the client terminal 1401.

The electronic file storage control unit 1406 controls whether the electronic file after being remotely controlled is stored in the electronic file storage unit 1402. The electronic file storage control unit 1406 may automatically acquire from the execution server 120 the electronic file after being remotely controlled in the execution server 120 and store the electronic file in the electronic file storage unit 1402, or may store the electronic file in the electronic file storage unit 1402 on the basis of the user's instruction. The electronic file storage control unit 1406 may store the electronic file after being remotely controlled on the execution server 120. The electronic file storage control unit 1406 may convert the file format or the extension of the electronic file after being remotely controlled in the execution server 120. For example, the electronic file storage control unit 1406 adds a predetermined character string to the extension of the electronic file acquired from the execution server 120.

The electronic file storage control unit 1406 may allow the user to select in advance whether to store the electronic file automatically or store the electronic file on the basis of the user's instruction. As described above, when the user performs some operation again on the electronic file stored in the electronic file storage unit 1402, the execution environment determination unit 1408 again determines the execution environment in which the electronic file is to be executed.

According to the above configuration, when the user performs processing such as viewing on the electronic file, actual processing on the electronic file is performed on the virtual server of the execution server 120 instead of the client terminal 1401. As a result, even when the electronic file is infected with a virus, the virus can be prevented from spreading to the client terminal 1401 while executing the processing to the electronic file.

In the present embodiment, the execution environment determination unit 1408 may determine whether to execute the electronic file on the execution server 120 by remote control or to execute the electronic file on the client terminal 1401. The execution environment determination unit 1408 may make the above determination on the basis of the format, the extension, or the name of the electronic file. The execution environment determination unit 1408 may cause the virtual server to execute the electronic file when the format, the extension, or the name of the electronic file is predetermined one, and may cause the electronic file execution unit 430 to execute the electronic file when the format, the extension, or the name of the electronic file is not predetermined one.

The execution environment determination unit 1408 may include means for causing the user to select whether to select an execution environment. For example, the execution environment determination unit 1408 causes the display device of the output unit 248 to display a screen for causing the user to select one of the execution server 120 and the client terminal 1401. The execution environment determination unit 1408 may receive the selection result of the user, and save the selection result as user setting for each user. The execution environment determination unit 1408 may select the execution environment on the basis of the user setting.

For example, when the execution environment determination unit 1408 determines that a specific electronic file is to be executed by a specific electronic file execution unit 430, the electronic file execution unit 430 executes the electronic file. Such a configuration can enhance the convenience for the user.

When the user operates the electronic file stored in the client terminal 1401, the execution environment determination unit 1408 may acquire information related to the execution environment. When the processing corresponding to the operation of the electronic file is executed on the execution server 120, examples of the information on the above-described execution environment include information identifying a server that serves as the execution environment, the expiration date of the server, the user ID of the user of the file transfer system 100 or the client terminal 114 in the server, a password associated with the user ID, and the like.

In the present embodiment, the case has been described in which the client terminal 1401 stores the electronic file acquired from the file sharing server 1212 in the storage device of the client terminal 1401, and operates the electronic file on the execution server 120 on the basis of the instruction from the user related to the operation of the electronic file. However, the file processing system 1400 is not limited to the present embodiment.

In another embodiment, when the client terminal 1401 accepts an instruction from the user related to the operation of the electronic file stored in the file sharing server 1212, the client terminal 1401 may request the file sharing server 1212 to transfer the electronic file to the execution server 120. The file sharing server 1212 may transfer the electronic file to the execution server 120 via at least one of the communication control unit 242, the remote control unit 244, the electronic file processing unit 228, and the electronic file operation unit 1404 of the client terminal 1401. The client terminal 1401 may establish a remotely controllable communication path in between the client terminal 1401 and the execution server 120 using a protocol such as RDP, and transmit to the execution server 120 an instruction for executing operation corresponding to the instruction from the user on the electronic file transferred from the file sharing server 1212.

In the present embodiment, the case has been described in which the electronic file storage control unit 1406 stores the electronic file after being remotely operated in the electronic file storage unit 1402 of the client terminal 1401. However, the file processing system 1400 is not limited to the present embodiment. According to another embodiment, the electronic file storage control unit 1406 may store the electronic file after being remotely controlled in the file sharing server 1212. In the present embodiment, the case has been described in which the client terminal 1401 has the electronic file storage control unit 1406 and the execution environment determination unit 1408. However, the file processing system 1400 is not limited to the present embodiment. According to another embodiment, the execution server 120 may have at least one of the electronic file storage control unit 1406 and the execution environment determination unit 1408. In still another embodiment, the function of the client terminal 1401 may be realized by the file sharing server 1212.

Figure 15A:
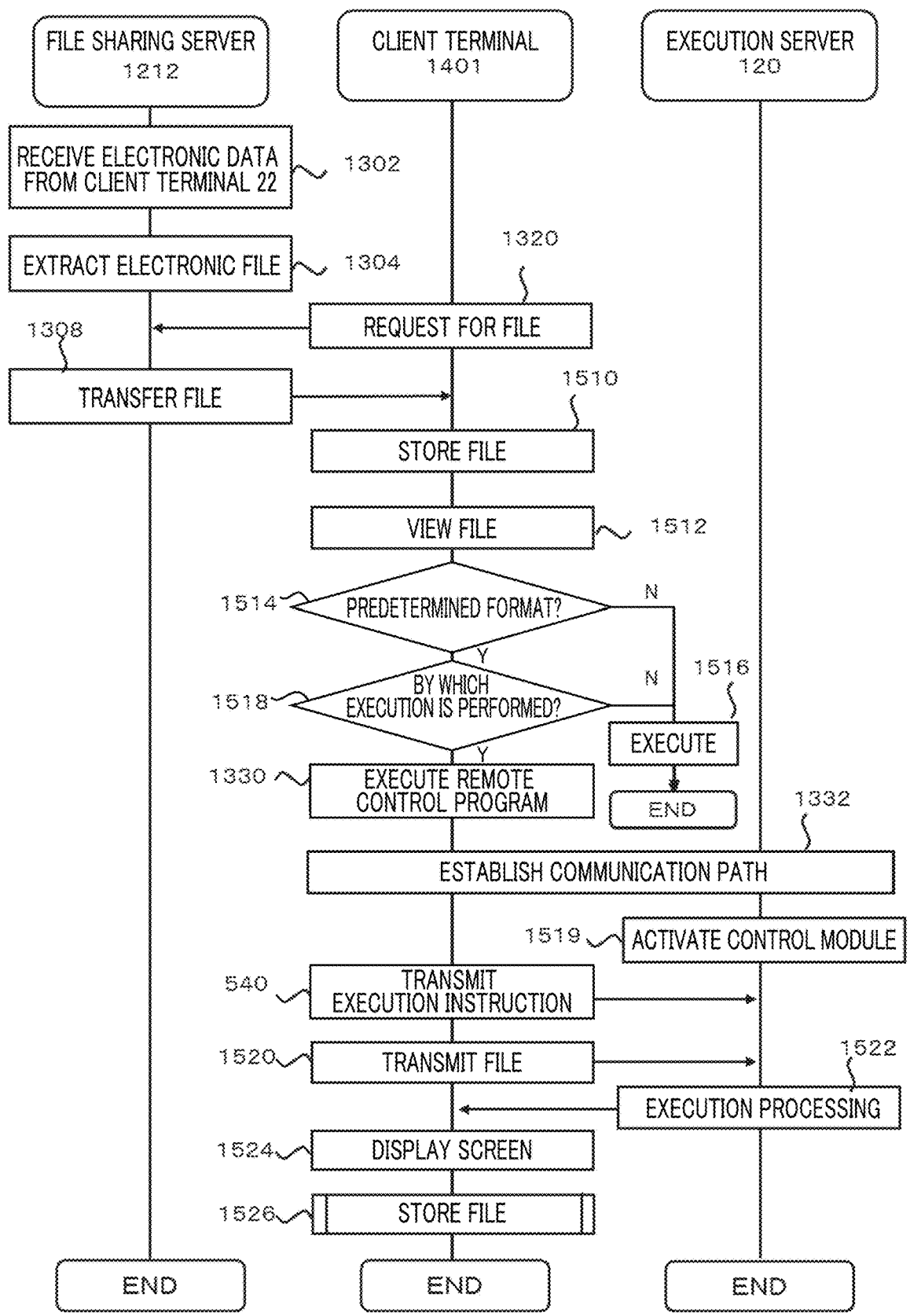
FIG. 15A schematically illustrates an example of processing in the file processing system 1400.

FIG. 15A schematically illustrates an example of processing in the file processing system 1400. This example shows an example of processing in a case where the client terminal 22 downloads and stores the data uploaded to the file sharing server 1212 to the client terminal 1401, and then views the electronic file. Note that, for steps in which the same reference numerals as in FIG. 13 are written, the similar processes to those in FIG. 13 may be performed.

In S1304, the file sharing server 1212 extracts an electronic file from the received electronic data, and in response to a request from the client terminal 1401 (S1320), transfers the extracted file to the client terminal (S1308). In S1510, the electronic file storage unit 1402 stores the electronic file transferred from the file sharing server 1212. In S1512, the electronic file operation unit 1404 performs processing for opening a file in order to view the file on the basis of the user's instruction.

In S1514, the execution environment determination unit 1408 checks whether the format, the extension, or the name of the electronic file is predetermined one. When it is not predetermined one (NO in S1514), the electronic file execution unit 430 executes the electronic file (S1516). If it is predetermined one (Yes in S1514), the execution environment determination unit 1408 displays, for example, a dialog display as to whether this electronic file is to be executed by the execution server 120 or by the client terminal 1401, so as to allow the user to select (S1518). When execution on the client terminal 1401 is selected (NO in S1518), the electronic file execution unit 430 executes the electronic file (S1516), and when execution on the execution server 120 is selected (YES in S1518), the remote control program is executed on the client terminal 1401 (S1330).

A communication path is established by execution of the remote control program (S1332). Specifically, as an example, the client terminal 1401 connects to the virtual host server of the execution server 120 and acquires information on the connection destination virtual guest server. The virtual host server may be the virtual server management unit 410. The virtual guest server may be the virtual server 414 or the virtual server 416. The information on the connection destination virtual guest server may be an example of the above-described information on the execution environment.

The execution server 120 determines a protocol such as TCP or UDP to be used on the basis of the type of the electronic file, the extension of the electronic file, URI, URL, URN, or the like. The execution server 120 opens a specific port on the basis of the determined protocol (sometimes referred to as opening a port). Thereafter, the client terminal 1401 designates the specific port described above, and connects to the virtual guest server using a protocol such as RDP.

The control module for controlling the application for executing the electronic file is activated with the connection according to the protocol such as the RDP as a trigger (S1519). Note that the control module may already be activated. The processing of opening the port may be performed by the control module. Thereafter, when the electronic file transmission unit 314 of the electronic file processing unit 228 transmits the electronic file (S1520), the application managed by the control module executes the electronic file (S1522).

The image data of the screen showing how the processing on the electronic file is performed is transmitted to the client terminal 1401 using a remote control technology such as RDP, and the display screen is displayed on the output unit 248 of the client terminal 1401 (S1524). The client terminal 1401 may execute transfer of electronic data or electronic file, transmission and reception of a command on the execution environment of the execution server 120 via the remotely controllable communication path. The client terminal 1401 may execute storing, overwriting storing or the like of electronic data or electronic file on the execution environment of the execution server 120 via the remotely controllable communication path (S1522).

When the processing or operation of the electronic data ends, an application such as a web browser operating on the execution environment of the execution server 120 may also end. The user may operate the client terminal 1401 to terminate an application such as a web browser operating on the execution environment of the execution server 120. When the execution server 120 receives an instruction to terminate the web browser, the execution server 120 closes the open port. The execution server 120 may close the port when detecting the end of processing or operation of the electronic data without receiving an instruction from the client terminal 1401. For example, the execution server 120 detects the end of processing or operation of the electronic data when communication with the client terminal 1401 or the network has not been performed for a certain period of time. The control module may execute detection processing of the end of processing or operation of the electronic data, and processing of closing a port.

When the remote control ends, the processing in the execution environment ends. Thereafter, the electronic file storage unit 1402 of the client terminal 1401 stores the electronic file as needed (S1526).

The above S1518 can be omitted. Alternatively, the execution environment determination unit 1408 may allow the user to select whether or not to display the dialog. When the electronic file is received in the above S1522, the control module may determine whether the received electronic file can be executed in the execution environment.

When the control module determines that the electronic file cannot be executed because the application that can execute the electronic file does not exist, or for other reasons, the electronic file processing unit 228 may display a message indicating that the electronic file cannot be executed on the screen of the file processing system 1400. In this case, the client terminal 1401 may further cause the electronic file execution unit 430 to display a screen that allows the user to check whether the electronic file is to be executed. In S1518, the control module is activated at the timing when the connection using the protocol such as RDP is performed, but the control module may be activated from the time when the virtual server is activated.

Figure 15B:
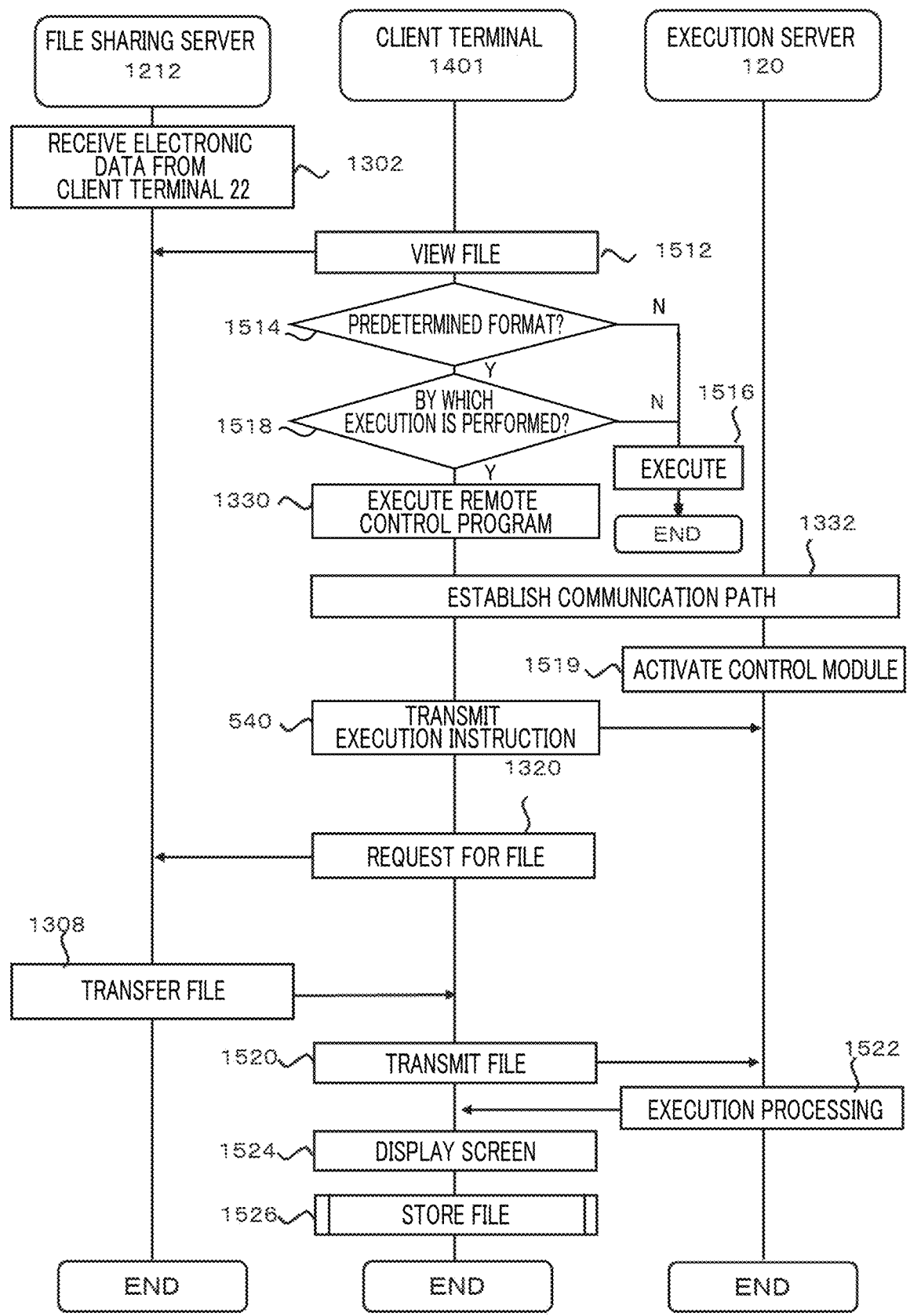
FIG. 15B schematically illustrates another example of processing in the file processing system 1400.

FIG. 15B schematically illustrates another example of processing in the file processing system 1400. In this example, the electronic data uploaded by the client terminal 22 to the file sharing server 1212 can be viewed without being stored in the client terminal 1401. More specifically, in response to a request for viewing from the client terminal 1401 (S1512), the remote control program is executed (S1330), and after the communication path is established, a request for the electronic file is given from the client terminal 1401 to the file sharing server 1212 (S1320).

In response to this request, the file sharing server 1212 transfers the electronic file to the execution server 120 (S1308), and the client terminal 1401 transmits the transferred electronic file to the execution server 120 (S1520). Thereafter, processing on the electronic file is executed in the execution server 120 (S1522), and the electronic file can be viewed in the client terminal 1401 (S1524). Thereafter, the electronic data is stored in the client terminal 1401 as necessary.

Note that, for steps in which the same reference numerals as in FIG. 15A are written, the similar processes to those in FIG. 15A may be performed. FIG. 15B shows that the electronic file is transferred to the execution server 120 via the client terminal 1401, but the file sharing server may transfer the electronic file to the execution server 120 without via the client terminal 1401.

Figure 16:
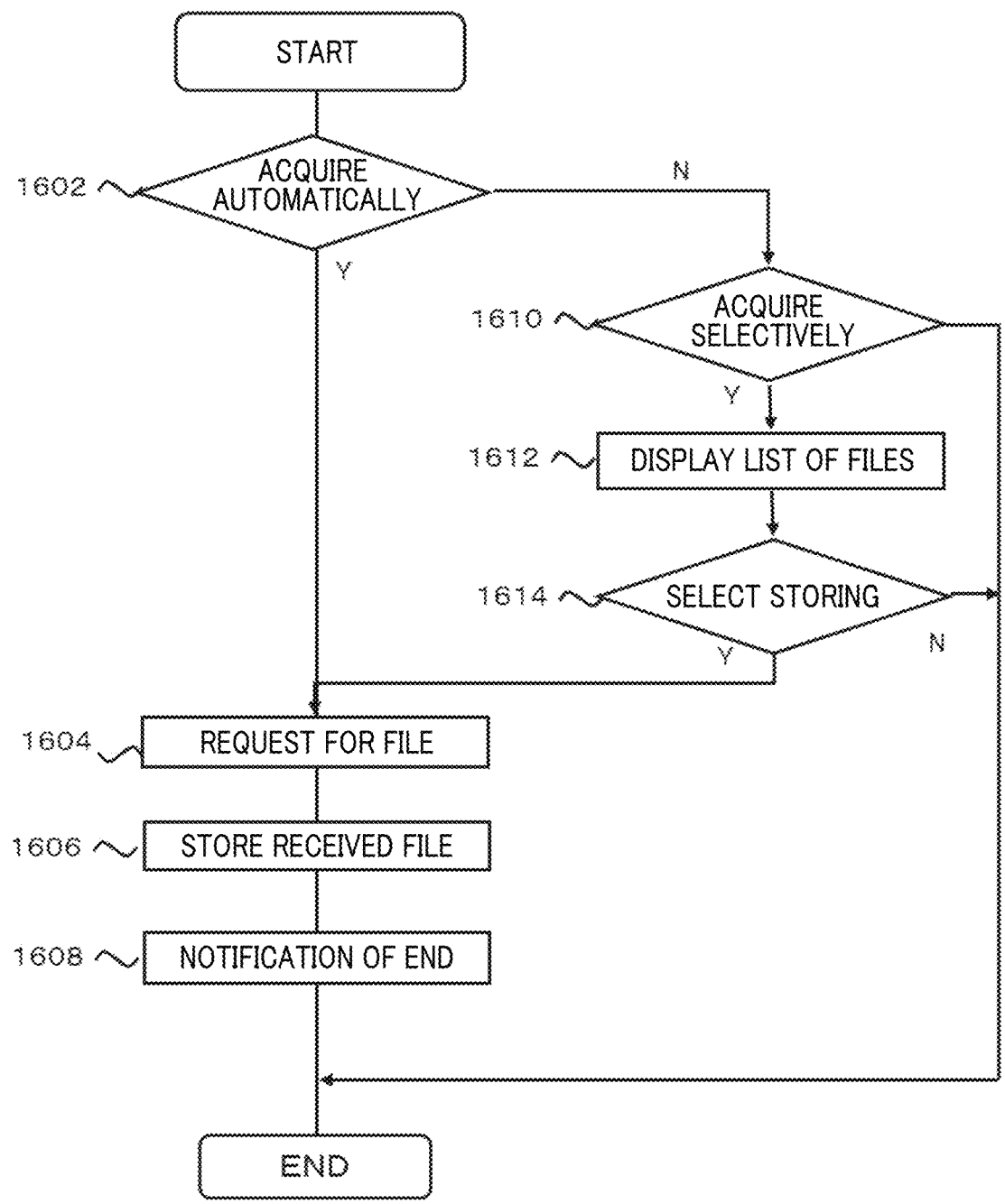
FIG. 16 schematically illustrates an example of file storing processing in the file processing system 1400.

FIG. 16 schematically illustrates an example of the processing of S1526. In the present example, the electronic file storage control unit 1406 allows the user to select in advance whether or not the electronic file is to be stored automatically. Furthermore, when not-automatic storing of the electronic file is selected, the electronic file storage control unit 1406 allows the user to select in advance whether or not processing of checking with the user whether to save the electronic file.

When automatic storing is selected (Yes in S1602), the electronic file storage control unit 1406 requests the execution server 120 for the electronic file (S1604). Then, when the corresponding electronic file is received from the execution server 120, the electronic file is automatically stored in a predetermined folder (S1604), and the end of execution of the file is notified to the virtual server (S1608).

When automatic storing is not selected, if performing processing of checking with the user whether or not the electronic file is to be stored is selected (No in S1602, Yes in S1610), the electronic file storage control unit 1406 causes file candidates to be stored to be displayed to the user (S1612). When storing the electronic file is selected (Yes in S1614), processing subsequent to S1604 is performed. When storing the electronic file is not selected (No in S1614), the processing is ended without storing the electronic file. Also when performing processing of checking with the user whether the electronic file is to be stored is not selected (NO in S1610), the processing ends without storing the electronic file.

Note that, as described in connection with FIG. 4, the virtual server may be rebuilt. Therefore, the electronic file stored in the virtual server in S1522 is preferably stored in the electronic file storage unit 1402 periodically or before the rebuilding of the virtual server is performed. In this case, the electronic file operation unit 1404 may automatically acquire the electronic file from the storage region of the virtual server, or may be configured to automatically transmit the electronic file from the virtual server.

In the present embodiment, as an example, the configuration has been described in which the electronic file is transmitted from the file sharing server 1212, and stored in the client terminal 1401. However, the electronic file may be, for example, an electronic file that is available by inserting a computer readable recording medium such as a USB memory or a DVD to the client terminal 1401. Even if such an electronic file is infected with a virus, the execution of the electronic file is not performed in the client terminal 1401 but is performed in the execution server 120, so that the virus can be prevented from spreading to the client terminal 1401.

Figure 17:
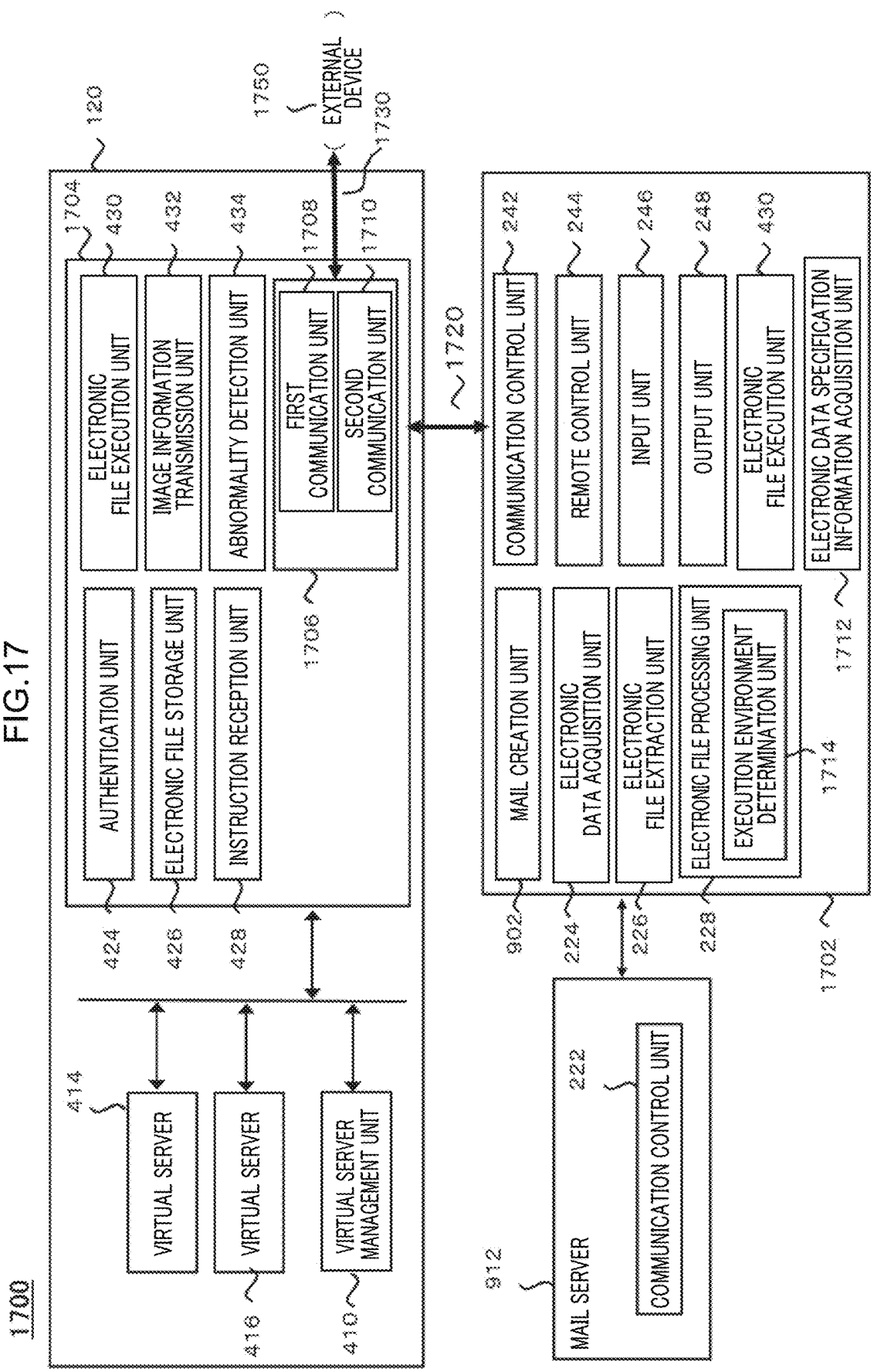
FIG. 17 schematically illustrates an example of a mail system 1700.

FIG. 17 schematically illustrates an example of the mail system 1700. The mail system 1700 includes the execution server 120, the mail server 912, and a client terminal 1702. In the present embodiment, the execution server 120 is different from the execution server 120 that has been described in connection with FIG. 4 in that a virtual server 1704 generated in the execution server 120 includes a communication control unit 1706 having a first communication unit 1708 and a second communication unit 1710. The execution server 120 may have a similar configuration to the execution server 120 in connection with FIG. 4 except for the above differences.

In the present embodiment, the client terminal 1702 is different from the client terminal 914 that has been described in connection with FIG. 9 in that the client terminal 1702 has the electronic data specification information acquisition unit 1712 and the electronic file processing unit 228 has the execution environment determination unit 1714. The client terminal 1702 may have a similar configuration to that of the client terminal 914 described in connection with FIG. 9 except for the above differences. The execution environment determination unit 1714 may be an example of a remote control program generation unit.

In the present embodiment, the client terminal 1702 acquires electronic data specification information that identifies electronic data. For example, when the user clicks a URL included in an electronic file such as an e-mail, an HTML file, a document file, a text file, and a PDF file, the client terminal 1702 acquires the URL as electronic data specification information. The client terminal 1702 transmits the acquired electronic data specification information to the execution server, and causes the execution server 120 to execute the electronic data identified by the electronic data specification information. The execution server 120 acquires the above-described electronic data via the communication path 1730. The communication path 1730 may be a communication path different from the communication path 1720 between the client terminal 914 and the execution server 120. The communication path 1720 may be an example of a first communication path. The communication path 1730 may be an example of a second communication path.

In the present embodiment, the e-mail received by the client terminal 1702 includes electronic data specification information. The electronic data specification information acquisition unit 1712 acquires electronic data specification information that identifies electronic data according to a user's instruction. Here, the electronic data specification information is information that can identify the location of the electronic data, and/or information that enables access to the electronic data.

The electronic data specification information is not particularly limited as long as the information can identify the electronic data. The electronic data specification information may be information that directly identifies electronic data, such as URI, URL, URN, or the like, or information that can indirectly identify the electronic data.

In an embodiment, the electronic data specification information may be a file that has information on the storage location of the electronic file or information on the link destination but does not have information on the content of the electronic file. Examples of such a file include a shortcut file. The shortcut file has, for example, an extension ".lnk".

When the link destination of the shortcut file is an electronic file stored on the execution server 120, for example, when the user activates the shortcut file on the client terminal 1702, a remotely controllable communication path is established in between the client terminal 1702 and the execution server 120 using the protocol such as RDP. Thereafter, the electronic file corresponding to the shortcut file is activated on the execution server 120.

The execution server 120 transmits the image data of the display screen to be displayed on the output unit 248 of the client terminal 1702 to the client terminal 1702. When the user operates the OS, application, file, or the like on the execution server 120 via the input unit 246 of the client terminal 1702, the execution server 120 transmits the image data of the display screen according to the user's operation to the client terminal 1702.

In another embodiment, the electronic data specification information may be a setting in which the client terminal and the electronic data are associated using an arbitrary protocol. The above-described protocol is not particularly limited, and an existing protocol such as FTP or Gopher or a protocol defined in the future can be used.

The electronic data in the present example may include electronic data that is not in the format of a file, in addition to the electronic file described in FIGS. 1 to 16. Examples of such electronic data include a symbolic link, a junction, a hard link, and the like.

The electronic file processing unit 228 of the client terminal 1702 has an execution environment determination unit 1714. When the electronic data specification information acquisition unit 1712 acquires the electronic data specification information, the execution environment determination unit 1714 may determine an execution environment in which the electronic data is to be executed. The execution environment determination unit 1714 determines the execution environment on the basis of, for example, the identification information of the client terminal 1702, the identification information of the user of the client terminal 1702, the protocol of the connection destination URI (HTTP, FTP, or the like), the connection destination URI, the connection source IP address, the version of the connection source IP address, the electronic data specification information, or information on the creator, the recipient, the file name, the file format, the extension, the file size or the like of the attached file 340.

The execution environment may be the execution server 120 or the client terminal 1702. The execution environment may be at least one of one or more virtual servers built in the execution server 120, and may be at least one of one or more virtual servers built by a command or request from the client terminal 1702.

The execution environment determination unit 1714 may generate a remote control program for acquiring electronic data from an external device 1750 in which the electronic data is placed. In an embodiment, the remote control program may be a program for causing the remote control unit 244 of the client terminal 1702 to perform (a-1) a procedure for establishing a remotely controllable communication path 1720 in between the client terminal 1702 and the execution environment determined by the execution environment determination unit 1714, (b-1) a procedure for transmitting an instruction for activating a web browser to the electronic file execution unit 430 of the virtual server 1704, (c-1) a procedure for transmitting to the electronic file execution unit 430 of the virtual server 1704 an instruction for acquiring electronic data identified by the URL acquired by the electronic data specification information acquisition unit 1712 via the web browser, (d-1) a procedure for transmitting an instruction for executing the above-described electronic data to the electronic file execution unit 430 of the virtual server 1704, and (e-1) a procedure for transmitting to the screen information transmission unit 432 of the virtual server 1704 an instruction for transmitting the image data of the display screen when the above-described electronic data is executed to the client terminal 1702.

In another embodiment, the execution environment determination unit 1714 may generate a remote control program for remotely controlling the execution environment determined by the execution environment determination unit 1714. The remote control program may be a program for causing execution of (b-2) a procedure for causing the electronic file execution unit 430 of the virtual server 1704 to activate a web browser, (c-2) a procedure for causing the electronic file execution unit 430 of the virtual server 1704 to acquire electronic data identified by the URL acquired by the electronic data specification information acquisition unit 1712 to via the web browser, (d-2) a procedure for causing the electronic file execution unit 430 of the virtual server 1704 to execute the above-described electronic data to, and (e-2) a procedure for causing the screen information transmission unit 432 of the virtual server 1704 to transmit the image data of the display screen when the above-described electronic data is executed to the client terminal 1702. The electronic file execution unit 430 and the screen information transmission unit 432 of the virtual server 1704 may be an example of a computer of the virtual server 1704.

The external device 1750 is a device different from the execution server 120 in which the execution environment in which electronic data is executed is placed. The external device 1750 may be realized as a physical device or as a virtual server.

When the execution environment acquires the electronic data from the external device 1750, the execution environment needs to communicate not only with the client terminal 1702 but also with the external device 1750. In the present embodiment, the virtual server 1704 included in the execution server 120 includes the communication control unit 1706 including the first communication unit 1708 and the second communication unit 1710.

In the present embodiment, the communication control unit 1706 determines a TCP port or a UDP port that opens the firewall. The communication control unit 1706 may determine the TCP port or the UDP port that opens the firewall on the basis of the identification information of the client terminal 114, the identification information of the user of the client terminal 114, the protocol of the connection destination URI (HTTP, FTP, or the like), the connection destination URI, the connection source IP address, the version of the connection source IP address, or information on the creator, the recipient, the file name, the file format, the extension, the file size or the like of the attached file 340. In another embodiment, the virtual server management unit 410 may determine at least one of the TCP port and the UDP port that open the firewall.

In the present embodiment, when the communication control unit 1706 receives a URI of electronic data and a request instructing acquisition of the electronic data specified by the URI, the communication control unit 1706 accepts the request if the request is from a predetermined application. On the other hand, if the request is not from a predetermined application, the communication control unit 1706 does not accept the request.

The remote control program may be a program for executing a procedure for establishing a remotely controllable communication path 1720 in between the client terminal 1702 and the execution environment of the execution server 120. In an embodiment, the remote control program is executed by the client terminal 1702 to establish the communication path 1720 in between the first communication unit 1708 and the client terminal 1702. The communication path 1720 may be a communication path based on a remote control protocol such as RDP.

The remote control program may be a program for causing the execution server 120 to execute a procedure for establishing the communication path 1730 in between the external device 1750 and the execution environment of the execution server 120. The communication path 1730 may be a remotely controllable communication path, or may be a normal communication path based on a protocol such as HTTP or HTTPS.

For example, when the remote control program is executed by the execution server 120, a second communication path 1730 is established in between the second communication unit 1710 and the external device 1750. The second communication path 1730 may be established in between the second communication unit 1710 and the external device 1750 the remote control program being executed by the client terminal 1702. For example, the communication path 1730 may be established by the client terminal 1702 transmitting to the execution server 120 an instruction for establishing the communication path 1730 in between the second communication unit 1710 and the external device 1750.

The execution environment determination unit 1714 may generate a remote control program for causing the execution server 120 to execute a procedure for acquiring electronic data via the communication path 1730. The remote control program may be a program for causing the execution server 120 to execute a procedure for processing the acquired electronic data in the execution environment and a procedure for transmitting the image data of the display screen to the client terminal 1702 via the communication path 1720.

For example, by executing the remote control program in the execution environment of the execution server 120, while executing the electronic data identified by the URL in the execution environment, it is possible to display the result on the screen of the client terminal 1702. With such a configuration, even when the data at the URL destination is infected with a virus, the contents of the data can be viewed safely.

The execution environment determination unit 1714 may acquire information on the execution environment when accessing data identified by the electronic data specification information. The execution environment determination unit 1714 may acquire information on the execution environment from the storage device of the execution server 120 or the client terminal 1702 or another storage device.

For example, the execution environment determination unit 1714 acquires information on the execution environment when the URI, the URL, the URN, or the like of the electronic data is acquired, when receiving a command instructing access to the URI, the URL, the URN, or the like of the electronic data from the user, or when the user executes a shortcut file of the electronic data. When the processing corresponding to the operation of the electronic file is executed on the execution server 120, examples of the information on the above-described execution environment include information identifying a server that serves as the execution environment, the expiration date of the server, the user ID of the user of the file transfer system 100 or the client terminal 114 in the server, a password associated with the user ID, and the like.

The execution environment determination unit 1714 may determine the execution environment on the basis of at least one of a predetermined whitelist and a blacklist. At least one of the whitelist and the blacklist may be stored in the client terminal 1702, may be stored in the execution server 120, or may be stored in an external server (not shown).

The whitelist may be a list of URIs permitted to be accessed, or a list of file formats or extensions permitted to be executed on the client terminal 1702. The blacklist may be a list of URIs prohibited to be accessed, or a list of file formats or extensions prohibited to be executed on the client terminal 1702. When items corresponding to both the whitelist and the blacklist exist, the execution environment determination unit 1714 may determine which of the whitelist and the blacklist is to be prioritized on the basis of a predetermined algorithm or a user instruction.

The execution environment determination unit 1714 may transmit to the execution server 120 a command to instruct to read the information stored in the storage device of the client terminal 1702 into a region for storing various settings related to the web browser installed on the virtual server 1704. The above-described region may be a cookie. The above-described region may be a region for storing information related to the bookmark. Examples of the information stored in the storage device of the client terminal 1702 include information stored in a cookie of a web browser installed in the client terminal 1702, information for a bookmark registered in the web browser, the user ID stored in the web browser, password information for each site such as login password to the website, setting information of various websites, setting information of the web browser, and the like.

In the present embodiment, the details of the client terminal 1702 and the execution server 120 have been described by taking the case where the electronic data specification information is included in the e-mail received by the client terminal 1702 as an example. However, the client terminal 1702 and the execution server 120 are not limited to the present embodiment. Even when the client terminal 1702 and the execution server 120 include electronic data specification information in the website viewed through the web browser installed on the client terminal 1702, the procedure similar to this embodiment can be used to process or operate the electronic data identified by the electronic data specification information.

In the present embodiment, the case has been described in which, when the electronic data specification information acquisition unit 1712 acquires electronic data specification information, the execution environment determination unit 1714 generates the remote control program, and the client terminal 1702 or the execution server 120 executes the remote control program, and the processing of establishing the communication path, the processing of acquiring the electronic data and the processing of executing the electronic data are performed. However, the information processing in the mail system 1700 is not limited to the present embodiment.

In another embodiment, the remote control program may be pre-installed on the client terminal 1702. For example, the electronic data specification information acquisition unit 1712 acquires electronic data specification information. The execution environment determination unit 1714 determines the execution environment in which electronic data identified by the electronic data specification information acquired by the electronic data specification information acquisition unit 1712 is to be executed. When the electronic data specification information acquisition unit 1712 acquires the electronic data specification information, the remote control program is executed on the client terminal 1702, and for example, the following processing is performed.

First, the communication control unit 242 and the remote control unit 244 establish the communication path 1720 with the execution environment determined by the execution environment determination unit 1714. Thereafter, the remote control unit 244 transmits to the instruction reception unit 428 of the virtual server 1704 an instruction for causing the electronic file execution unit 430 of the virtual server 1704 to activate the web browser. Furthermore, the remote control unit 244 transmits to the instruction reception unit 428 an instruction for causing the electronic file execution unit 430 of the virtual server 1704 to acquire and execute the electronic data identified by the electronic data specification information.

The electronic file execution unit 430 of the virtual server 1704 activates the web browser on the basis of the instruction from the remote control unit 244, and establishes the communication path 1730 with an external device 1750 that stores the electronic data identified by the electronic data specification information via the second communication unit 1710. Furthermore, the electronic file execution unit 430 of the virtual server 1704 acquires the electronic data from the external device 1750 on the basis of an instruction from the remote control unit 244, and executes the electronic data on the electronic file execution unit 430. The screen information transmission unit 432 transmits the image data of the display screen for a case where the electronic data is executed, to the client terminal 1702 via the communication path 1720.

In the present embodiment, an embodiment of the execution server 120 has been described with reference to FIG. 17. However, the execution server 120 is not limited to the present embodiment. For example, the division of roles between the virtual server 410, the virtual server 412, the virtual server 414, and the virtual server 416 is not limited to the above embodiment.

In an embodiment, the virtual server management unit 410 may have at least part of the functions of the communication control unit 1702, and at least part of the information processing in the communication control unit 1702 may be executed by the virtual server management unit 410. In another embodiment, the communication control unit 1702 may have at least part of the function of the virtual server management unit 410, and at least part of the information processing in the virtual server management unit 410 may be executed by the communication control unit 1702.

[Example of Information Processing in Mail System 1700]

Figure 18:
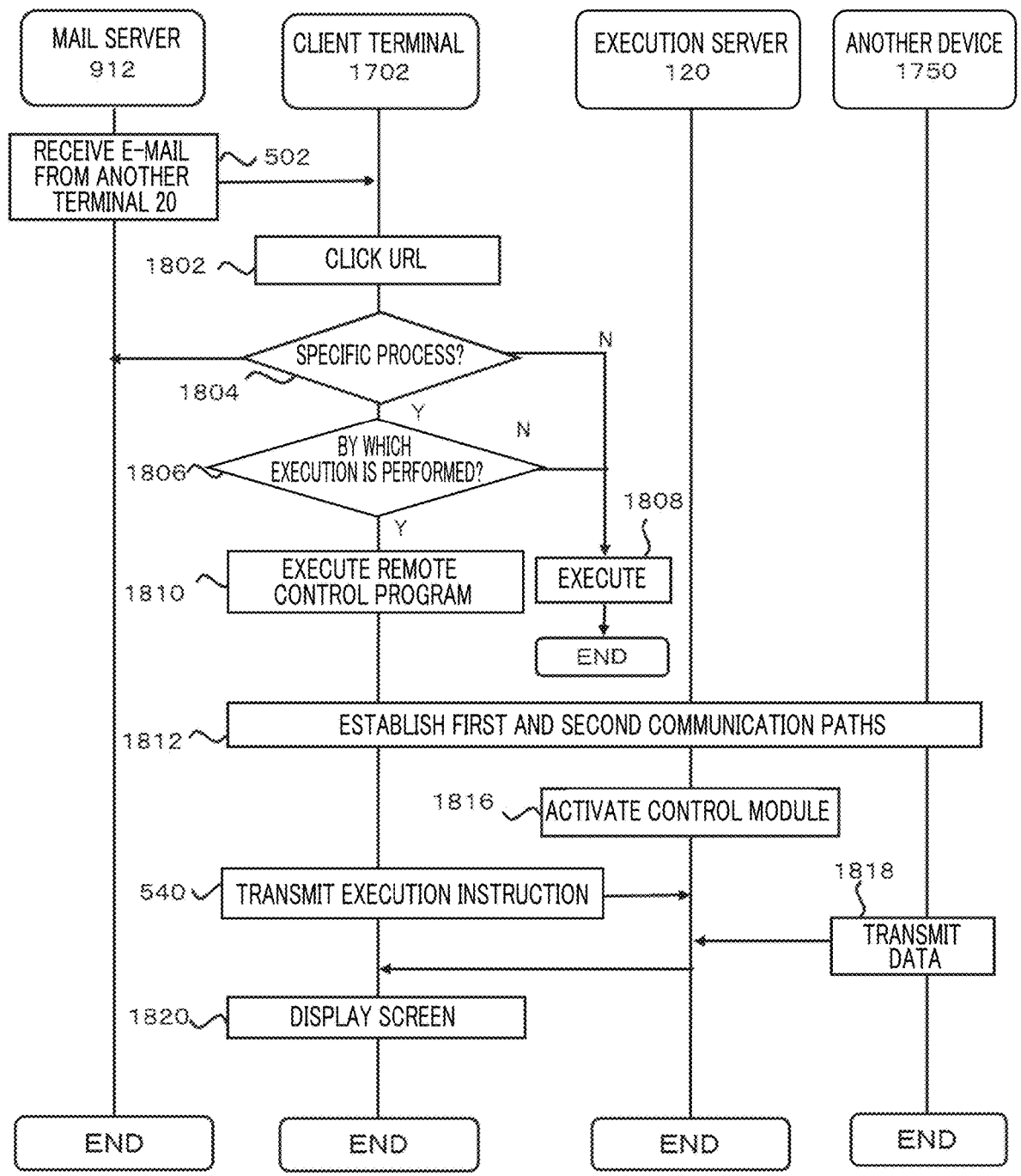
FIG. 18 schematically illustrates an example of processing in the mail system 1700.

FIG. 18 schematically illustrates an example of processing in the mail system 1700. Note that, for steps in which the same reference numerals as in FIG. 10 are written, the similar processes to those in FIG. 10 may be performed.

According to the present embodiment, in S502, the electronic data acquisition unit 224 of the client terminal 1702 receives an e-mail from the other terminal 20. In S1802, the electronic data specification information acquisition unit 1712 detects that the user has clicked on the URL attached to the e-mail, and acquires the URL.

In S1804, the execution environment determination unit 1714 checks whether the electronic data specification information acquisition unit 1712 has acquired electronic data specification information using a predetermined process. Examples of the predetermined process include acquiring the electronic data specification information when the user opens an e-mail using a predetermined mailer such as Outlook, when the user clicks a URL in a predetermined electronic file such as a document file such as Word or Excel, a text file, or a PDF file, or when the user clicks the URL during using of a predetermined application such as a web browser.

When the process in which the electronic data specification information acquisition unit 1712 acquires the electronic data specification information is not a predetermined process (NO in S1804), the electronic file execution unit 430 of the client terminal 1702 executes the electronic data (S1808). Note that, the execution of the electronic data may be opening a page identified by the URL acquired by the electronic data specification information acquisition unit 1712 using a web browser associated with the client terminal 1702.

When the process in which the electronic data specification information acquisition unit 1712 acquires the electronic data specification information is a predetermined process (Yes in S1804), the execution environment determination unit 1714 allows the user to check whether the electronic data identified by the URL acquired by the electronic data specification information acquisition unit 1712 is to be executed in the execution server 120 or the client terminal 1702 (S1806). In this case, the execution environment determination unit 1714 can cause the user to perform the above-described check by displaying a display means such as a dialog display to the user.

When execution on the client terminal 1702 is selected (NO in S1806), the electronic file execution unit 430 of the client terminal 1702 executes electronic data (S1808). On the other hand, when execution on the execution server 120 is selected (YES in S1806), the remote control program is executed on the client terminal 1702 (S1810).

When the remote control program is executed, the communication path 1720 and the communication path 1730 are established (S1812). Specifically, as an example, the execution environment determination unit 1714 of the client terminal 1702 connects to the virtual host server of the execution server 120 and acquires information on the connection destination virtual guest server. The virtual host server may be the virtual server management unit 410. The virtual guest server may be at least one of the virtual server 412 to the virtual server 416. The information on the connection destination virtual guest server may be an example of the above-described information on the execution environment.

The execution server 120 determines a protocol such as TCP or UDP to be used by the execution server 120, on the basis of the type of the electronic file, the extension of the electronic file, URI, URL, URN, or the like. The execution server 120 opens a specific port on the basis of the determined protocol (sometimes referred to as opening a port). Thereafter, the client terminal 1401 designates the specific port described above, and connects to the virtual guest server using a protocol such as RDP.

According to an embodiment, the execution server 120 permits only TCP communication for communication with the client terminal 1702, and opens ports of TCP (80, 53) and UPD (53). As a result, the page of the URL destination can be processed by the web browser on the execution environment (for example, the web browser installed on the virtual server 1704 of the execution server 120). These ports may be an example of the first communication unit and the second communication unit.

The electronic file execution unit 430 of the virtual server 1704 activates a control module that controls an application for executing the electronic data identified by the URL, triggered by the connection by the protocol such as the RDP (S1816). The control module controls the application to execute the electronic data. Examples of the above-described application include a web browser, a viewer, a word processor application, a spreadsheet application, a presentation application and the like. The above-described processing of opening the port may be executed by the control module.

According to an embodiment, when the control module is activated on the virtual server 1704, the remote control unit 244 of the client terminal 1702 transmits the URL acquired by the electronic data specification information acquisition unit 1712 in S1802 to the electronic file execution unit 430 of the virtual server 1704 via the first communication path 1720 (S540). The remote control unit 244 may transmit the above-described URL to the virtual server 1704 by designating the first communication unit 1708. The URL may be an example of the execution instruction.

Next, in the electronic file execution unit 430 of the virtual server 1704, the control module activates the web browser. As a result, the electronic data identified by the URL received from the client terminal 1702 is processed by the Web browser. For example, the web browser requests the external device 1750 to transmit the electronic data identified by the above URL. The web browser transmits and receives information to and from the external device 1750 via the second communication unit 1710 and the communication path 1730. The external device 1750 transmits the electronic data identified by the above-described URL to the web browser in response to the request from the web browser (S1818). The electronic data identified by the above-described URL may be data of a web page described in HTML.

The web browser of the virtual server 1704 receives the electronic data from the external device 1750 and executes the electronic data. The screen information transmission unit 432 uses a remote control technology such as RDP to transmit the image data of the display screen of the web browser to the client terminal 1702, and the display screen is displayed on the output unit 248 of the client terminal 1702 (S1820).

When the processing or operation of the electronic data ends, the user operates the client terminal 1702 to transmit an instruction for terminating the web browser operating on the virtual server 1704 to the virtual server 1704. When the instruction reception unit 428 of the virtual server 1704 receives the above-described user instruction, the communication control unit 1706 closes the open port. The execution server 120 may close the port when detecting the end of processing or operation of the electronic data without receiving a user instruction. For example, the execution server 120 detects the end of processing or operation of the electronic data when communication with the client terminal 1702 or the network has not been performed for a certain period of time. The control module may execute detection processing of the end of processing or operation of the electronic data, and processing of closing a port.

Note that, in the above-described processing, some steps may be omitted, or the order of the steps may be switched with each other. For example, S1806 may be omitted. In S1806, the execution environment determination unit 1714 may allow the user to select whether or not to display the dialog.

According to the present embodiment, in S1816, the control module is activated at the timing when the connection using the protocol such as RDP is performed. However, the timing for activating the control module is not limited to the present embodiment. In another embodiment, the control module may be activated when the virtual server is activated.

In the embodiment illustrated in FIG. 18, the electronic data specification information acquisition unit 1712 acquires electronic data specification information by the user clicking a URL attached to an e-mail received from the other terminal 20. However, the electronic data specification information acquisition unit 1712 is not limited to the present embodiment. The electronic data specification information acquisition unit 1712 may acquire electronic data specification information from the electronic data that can be accessed by the client terminal 1702 by various methods.

For example, the electronic data specification information acquisition unit 1712 may acquire the electronic data specification information when the client terminal 1702 accesses the electronic data originally stored in the client terminal 1702 or the electronic data stored in a recording medium such as a USB memory or a DVD. The electronic data may be a document file such as a word or excel, a text file, a PDF file or the like.

As described above, when viewing the web screen of the URL destination, the execution environment (for example, a virtual server) requires two communication ports in order to communicate with both the client terminal and the external device. The execution server 120 may or may not have such a virtual server in advance. The virtual server may have only one communication port. Therefore, when the execution environment determination unit 1714 determines the virtual environment to execute the electronic data, the execution environment determination unit 1714 may select the execution environment having the second communication path with the external device 1750 from among a plurality of virtual servers of the execution server 120 at the time of receiving the electronic data specification information.

In an embodiment, the execution environment determination unit 1714 selects a virtual environment having both the first communication unit 1708 and the second communication unit 1710 in advance, and then a remote control program including a command for establishing the first and second communication paths may be executed. In another embodiment, the execution environment determination unit 1714 may select the virtual environment having only the first communication unit 1708, and perform remote control so as to generate a port corresponding to the second communication unit 1710 for the selected virtual environment. In this case, a remote control program including a command for establishing the communication path 1730 with the external device 1750 can be generated, and this program can be executed so that the communication path 1730 is established.

The present embodiment can be combined with other embodiments. For example, in FIG. 14, an example has been described in which, when the user performs an operation such as viewing of an electronic file stored in the client terminal 1401, the electronic file is transferred from the client terminal 1401 to the execution server 120, and processing is performed on the virtual server. However, when the electronic file includes electronic data specification information such as a URL, the processing associated with the operation such as viewing the electronic file can be performed in the virtual server, and the processing of viewing the web screen of the URL destination can also be performed in the fictitious server as described above. Alternatively, even when a mail is received from the mail server 112 or 912 described in FIGS. 1 to 10, similar processing can be performed when a URL is included in the mail.

In the embodiment shown in FIGS. 1 to 16, communication with an external device is not necessarily required. Rather, in consideration of security, it may be preferable that there is no port (second communication unit 1710) for opening the second communication path 1730. Therefore, the execution server 120 may generate in advance two types of virtual servers, that is, a virtual server capable of communicating with only the client terminal and a virtual server capable of communicating with both the client terminal and an external device.

The execution environment determination unit 1714 may determine which execution environment (virtual server) should be selected on the basis of at least any of information acquired according to the operation of the user, an application used for the operation of the user, and the user's operation itself. For example, when the URL is acquired by the operation of the user, a virtual server having a communication port capable of communicating with each of the external device and the client terminal is selected. Alternatively, when information indicating that the Word file is to be viewed by the operation of the user is acquired, the execution environment determination unit 1714 may select a virtual server having a communication port capable of communicating only with the client terminal 1702.

Alternatively or additionally, the execution environment determination unit 1714 may determine which execution environment (virtual server) should be selected according to at least one of acquisition of user-specific information such as a login user name, acquisition of an electronic file extension, and acquisition of an identifier that distinguishes the application used for processing the electronic file in the client terminal. Furthermore, the execution environment determination unit 1714 may determine which execution environment should be selected on the basis of the attributes of the electronic file, such as the file size of the electronic file, the file name, the file format, the location where the file is stored, and the date when the file is stored or updated. In this case, the execution environment determination unit 1714 may determine which execution environment should be selected when the electronic file operated by the user has predetermined attributes or combination of the predetermined attributes.

When a virtual server is not generated in advance in the execution server 120, if the URL is acquired by the electronic data specification information acquisition unit 1712, the execution environment determination unit 1714 may generate a remote control program for generating a virtual server having a communication port capable of communicating with both an external device and the client terminal, and cause the execution server 120 to execute the remote control program to generate a desired virtual server. Similarly, when information indicating that the Word file is to be viewed by the user is acquired, the execution environment determination unit 1714 generate a remote control program for generating a virtual server having a communication port capable of communicating only with the client terminal, and cause the execution server 120 to execute the remote control program.

[Embodiment in which Mail system 1700 is Realized on the Same Physical Machine]

As described above, the information processing device may be built on the same physical server, or may be built on different physical servers. An example in which the client terminal 1702 and the execution server 120 of the mail system 1700 are built on the same physical machine will described with reference to FIGS. 19 to 21.

Figure 19:
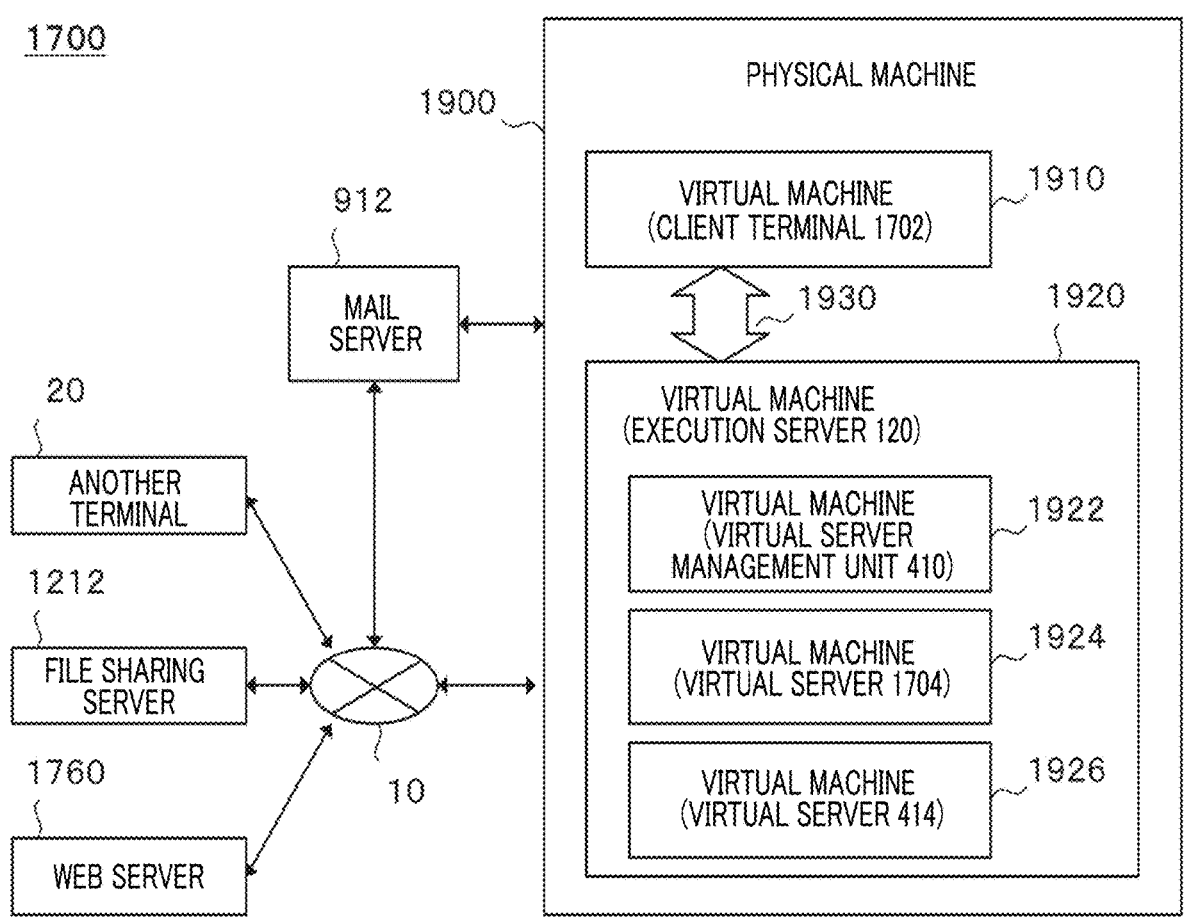
FIG. 19 schematically shows another example of the system configuration of the mail system 1700.
Figure 20:
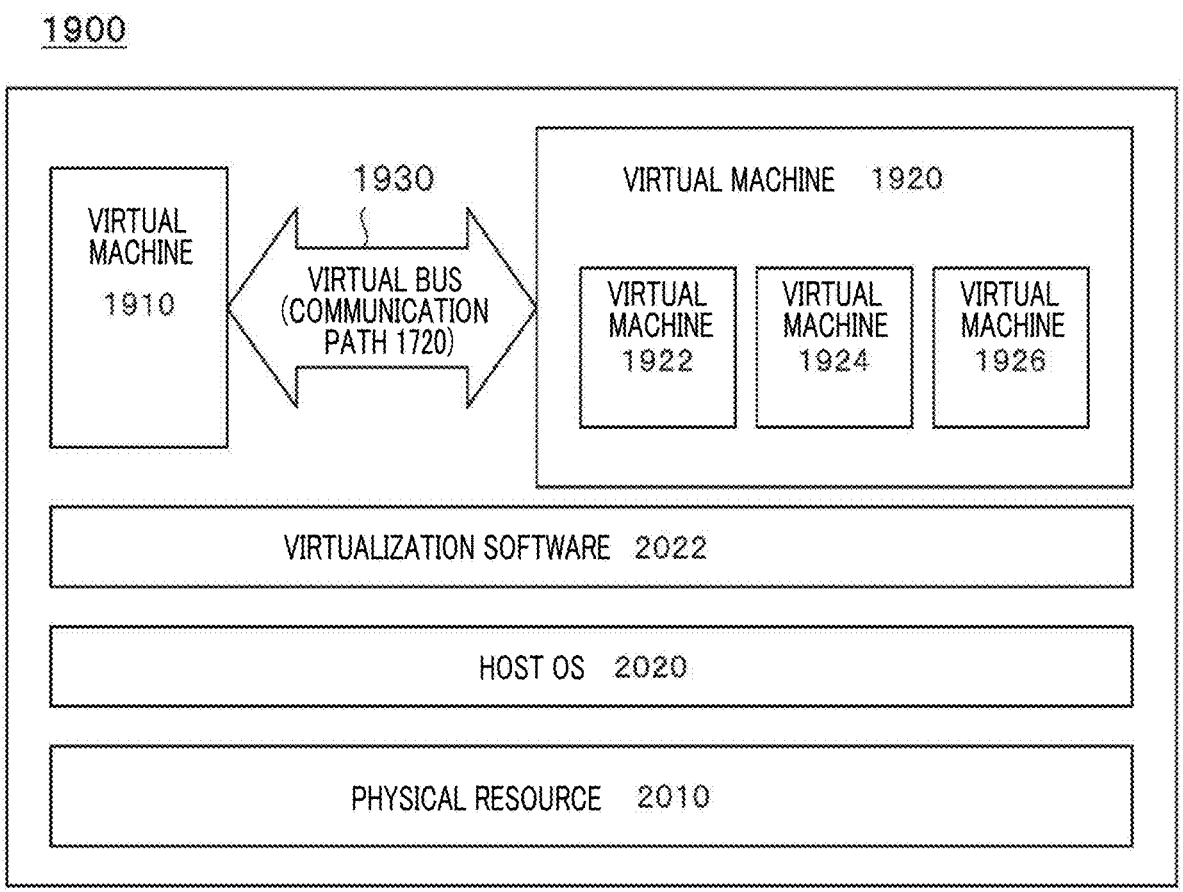
FIG. 20 schematically illustrates an example of the system configuration of a physical machine 1900.
Figure 21:
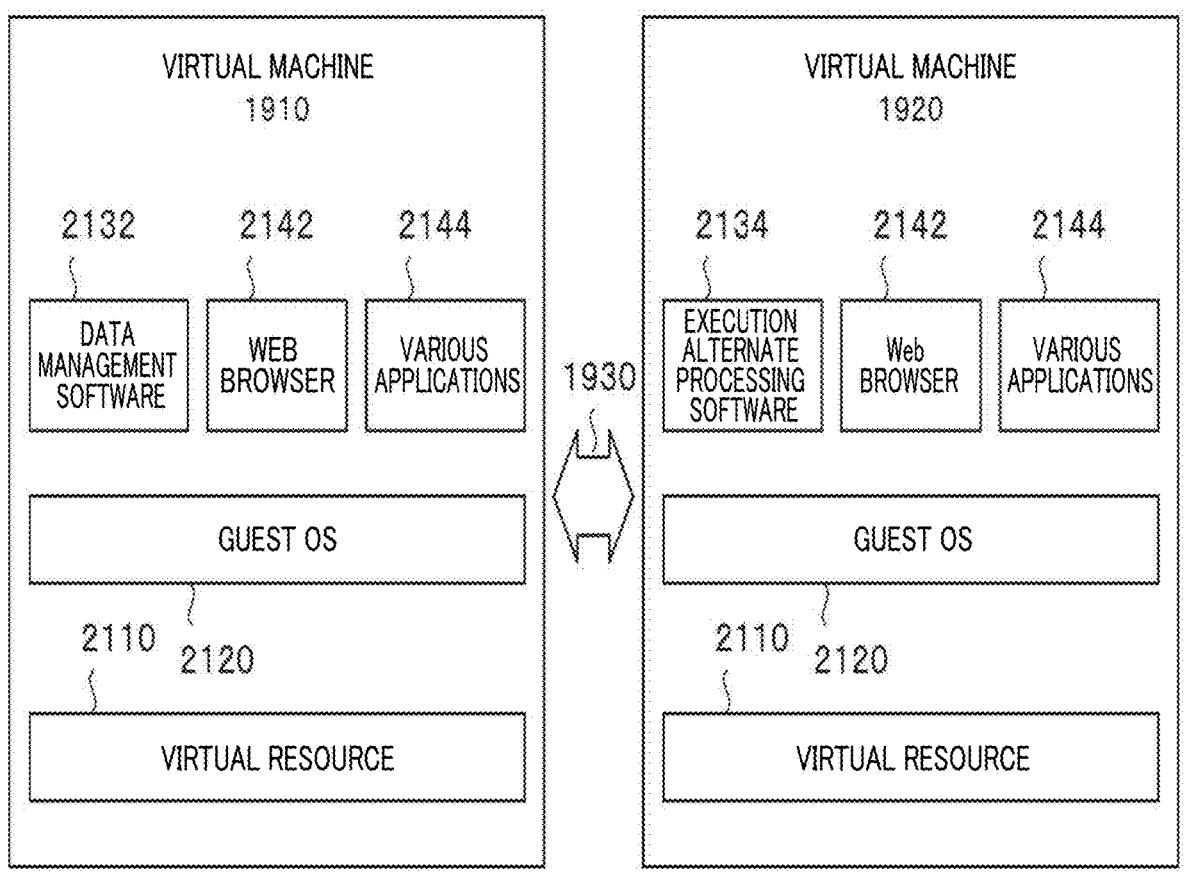
FIG. 21 schematically illustrates an example of the system configuration of a virtual machine 1910 and a virtual machine 1920.

FIG. 19 schematically shows an example of the system configuration of the mail system 1700. FIG. 20 schematically illustrates an example of the system configuration of a physical machine 1900. FIG. 21 schematically illustrates an example of the system configuration of the virtual machine 1910 and a virtual machine 1920.

As illustrated in FIG. 19, in the present embodiment, the mail system 1700 includes the mail server 912 and the physical machine 1900. In the present embodiment, the same physical machine 1900 functions as the client terminal 1702 and the execution server 120. According to the present embodiment, at least a part of the functions of the client terminal 1702 described in connection with FIGS. 17 and 18 and at least a part of the functions of the execution server 120 described in connection with FIGS. 17 and 18 are realized by the same physical machine 1900.

According to the present embodiment, the virtual machine 1910 and the virtual machine 1920 are built on the single physical machine 1900. In the present embodiment, the virtual machine 1920 includes a virtual machine 1922, a virtual machine 1924, and a virtual machine 1926.

In the present embodiment, on the physical machine 1900, a virtual bus 1930 for communicating information between the virtual machine 1910 and the virtual machine 1920 is built. The virtual bus 1930 may include a bridge interface built in between the host OS and the guest OS. Even when the virtual machine 1910 and the virtual machine 1920 are built on the same physical machine, for example, image data of a display screen showing the result of information processing in the virtual machine 1920 is transmitted to the virtual machine 1910 using a remote control technology such as RDP, the virtual bus 1930 may be an example of a remotely controllable communication path. Examples of the above-mentioned remote control technology include a technology of transmitting and receiving information using protocols, such as remote desktop protocol (RDP), RDP over HTTPS, ICA, XProtocol, or PCoIP.

In the present embodiment, for example, the virtual machine 1910 functions as the client terminal 1702. The virtual machine 1922 functions as, for example, the virtual server management unit 410. The virtual machine 1924 functions as, for example, the virtual server 1704. The virtual machine 1926 functions as, for example, the virtual server 414.

As shown in FIG. 20, in the present embodiment, the physical machine 1900 has a physical resource 2010 and a host OS 2020 for controlling the physical machine 1900. Examples of a virtual resource 2110 include a CPU, a memory, a storage, an NIC, and the like. According to the present embodiment, the virtual machine 1910, the virtual machine 1920, and the virtual bus 1930 are realized by operating virtualization software 2022 on the host OS 2020.

In the present embodiment, the case has been described in which the virtual machine is built by using the host OS and virtualization software to interpose two layers of the host OS and virtualization software between physical resources and virtual resource. However, the method of building the virtual machine is not limited to the present embodiment. In another embodiment, a hypervisor may be used to build the virtual machine. In this case, a layer (sometimes referred to as a hypervisor) for realizing virtualization is built on a physical resource, and a virtual machine is realized on the hypervisor.

In still another embodiment, container virtualization technology may create one or more separate process spaces (sometimes referred to as containers) in a single OS environment. In each container, an application can be executed without affecting other process spaces in the system or being affected by the system.

For example, in a first container built on the host OS of the physical machine 1900, a program for causing a computer of the physical machine 1900 to function as at least a part of the client terminal 1702 is executed. In a second container built on the host OS of the physical machine 1900, a program for causing a computer of the physical machine 1900 to function as at least a part of the execution server 120 is executed. Information may be transmitted and received between the first container and the second container using a remote control technology.

(i) After a command for executing the electronic file is accepted, a container for executing the electronic file may be prepared, (ii) before a command for executing the electronic file is accepted, the electronic file may be recorded using the prepared container. A container may be prepared each time an electronic file is executed. The container may be discarded immediately after the execution of the electronic file is completed, or may be discarded after a predetermined period of time has elapsed after the execution of the electronic file is completed. The container may be discarded after a randomly determined period of time has elapsed since execution of the electronic file has ended.

As shown in FIG. 21, the virtual machine 1910 has a virtual resource 2110 and a guest OS 2120 for controlling the virtual machine 1910. In the virtual machine 1910, for example, data management software 2132, a web browser 2142, and various kinds of application software 2144 are introduced. Examples of the virtual resource 2110 include a virtual CPU, a virtual memory, a virtual storage, a virtual NIC, and the like.

The data management software 2132 may be a program for causing the virtual CPU of the virtual machine 1910 to function as at least a part of the client terminal 1702 by being executed on the virtual machine 1910. The data management software 2132 is executed on the virtual machine 1910, so that the virtual resource 2110 functions as each unit of the client terminal 1702.

Similarly, the virtual machine 1920 has a virtual resource 2110 and a guest OS 2120 for controlling the virtual machine

1920. In the virtual machine 1920, for example, execution alternate processing software 2134, a web browser 2142, and various kinds of application software 2144 are introduced.

The execution alternate processing software 2134 may be a program for causing the virtual CPU of the virtual machine 1920 (may be at least one virtual CPU of the virtual machine 1922, the virtual machine 1924, and the virtual machine 1926) to function as at least a part of the execution server 120 by being executed on the virtual machine 1920. The execution alternate processing software 2134 is executed on the virtual machine 1920, so that the virtual resource 2110 of the virtual machine 1920 (may be at least one virtual resource 2110 of the virtual machine 1922, the virtual machine 1924, and the virtual machine 1926) functions as each unit of the execution server 120.

According to the present embodiment, when the virtual machine 1910 that functions as the client terminal 1702 accepts a command related to access to the electronic data or operation of the electronic data, processing for accessing the electronic data or processing for operating the electronic data is performed on the virtual machine 1924 that functions as the virtual machine 1704 in some cases. Therefore, arbitrary information may be shared or synchronized between the virtual machine 1910 and the virtual machine 1920. Furthermore, backup processing or restoration processing of arbitrary information may be performed between the virtual machine 1910 and the virtual machine 1920.

For example, setting information of at least one of the web browser 2142 and various kinds of application software 2144 is shared or synchronized between the virtual machine 1910 and the virtual machine 1920. Furthermore, backup processing or restoration processing of the above-described installation information may be performed. Examples of the setting information include (i) information stored in the cookie of the web browser, (ii) user ID stored in the web browser, and password information for each site such as website login password, (iii) site setting information of various websites, (iv) bookmark information, (v) browser proxy authentication information, and the like.

By building a system having the function of the client terminal 1702 and the function of the execution server 120 on the same physical machine, the installation cost of the system may be significantly reduced. For example, when the scale of introduction of the present system is relatively small, it may not be economically rational to newly build a server system to introduce this system. In such a case, the installation cost of this system can be suppressed by building a system having the function of the client terminal 1702 and the function of the execution server 120 on each physical machine to which this system is scheduled to be introduced.

In the embodiments of FIGS. 19 to 21, the case has been described in which, on one physical machine 1900, the virtual machine 1910 that functions as the client terminal 1702, the virtual machine 1922 that functions as the virtual server management unit 410, and the virtual machine 1924 that functions as the virtual server 1704, and the virtual machine 1926 that functions as the virtual server 414 are built. However, the mail system 1700 is not limited to the present embodiment.

In another embodiment, (i) a part of the client terminal 1702 and a part of the execution server 120 are built on the first physical machine, and (ii) the other parts are built on one or more physical machines different from the first physical machine. For example, the virtual machine 1910 that functions as the client terminal 1702, the virtual machine 1922 that functions as the virtual server management unit 410, and the virtual machine 1924 that functions as the virtual server 1704 are built on the first physical machine. On the other hand, the virtual machine 1926 that functions as the virtual server 414 may be built on the second physical machine different from the first physical machine.

[Another Example of Information Processing in Mail System 1700]

Figure 22:
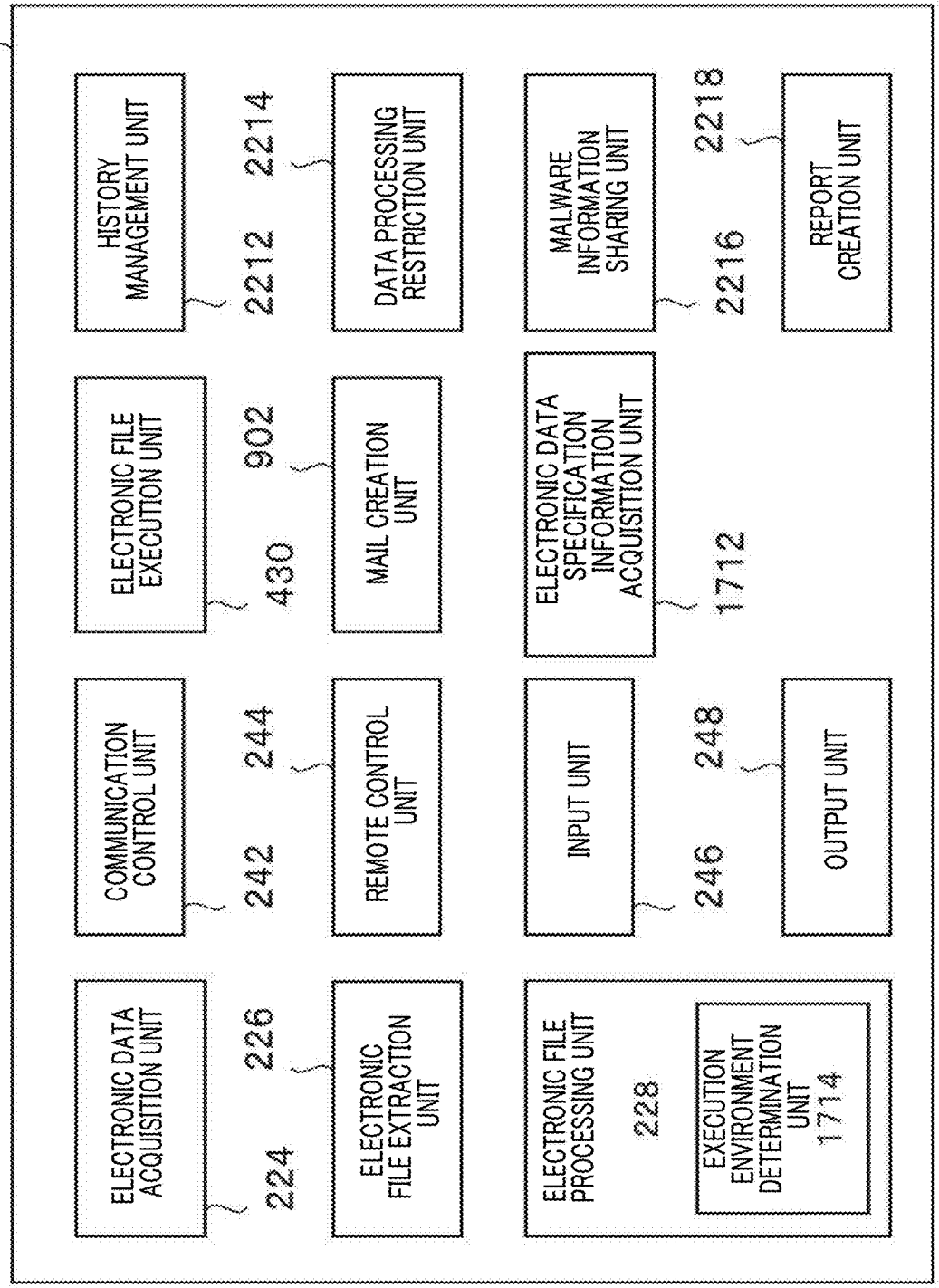
FIG. 22 schematically shows another example of a system realized by execution of data management software 2132.
Figure 23:
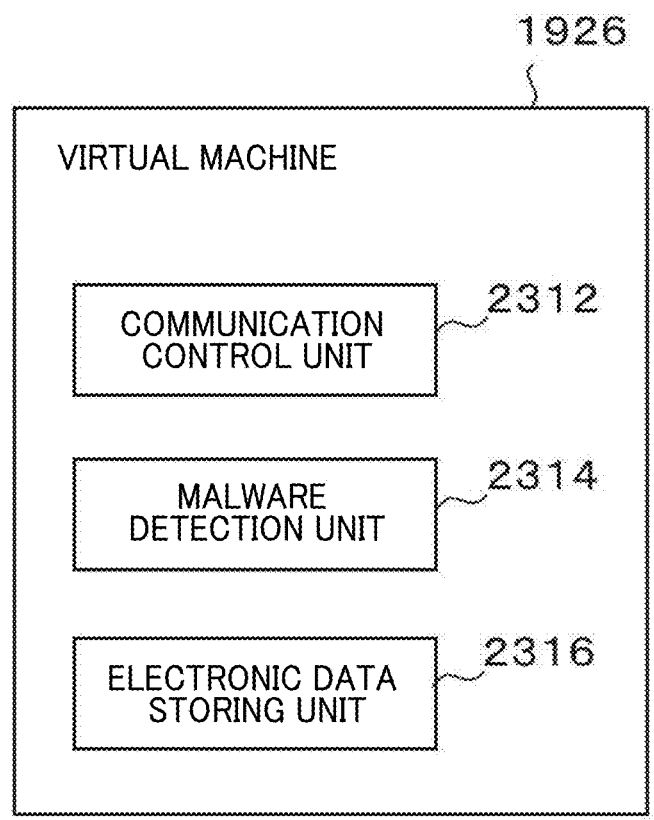
FIG. 23 schematically illustrates an example of a system realized by a virtual machine 1926.

The mail system 1700 of FIG. 19 may execute information processing similar to the information processing described in connection with FIGS. 17 and 18. Another example of information processing in the mail system 1700 will be described with reference to FIGS. 22 and 23. Specifically, an embodiment in which electronic data is stored for a fixed period in the mail system 1700 of FIG. 19 will be described with reference to FIGS. 22 and 23. FIG. 22 schematically illustrates an example of the client terminal 1702 realized by the virtual machine 1910. FIG. 23 schematically illustrates an example of the virtual server 414 realized by the virtual machine 1926.

In the present embodiment, the virtual machine 1910 functions as the client terminal 1702, and the virtual machine 1920 functions as the execution server 120. Furthermore, the virtual machine 1922 functions as the virtual server management unit 410, the virtual machine 1924 functions as the virtual server 1704, and the virtual machine 1926 functions as the virtual server 414.

[Overview of System Configuration of Mail System 1700]

In the present embodiment, the virtual machine 1910 that functions as the client terminal 1702 is different from the client terminal 1702 described in connection with FIG. 17, in that the virtual machine 1910 includes a history management unit 2212, a data processing restriction unit 2214, a malware information sharing unit 2216, and a report creation unit 2218. Regarding other configurations, the virtual machine 1910 may have a similar configuration to the client terminal 114, the client terminal 914, the client terminal 1401, or the client terminal 1702.

In the present embodiment, the virtual machine 1922 that functions as the virtual server management unit 410 may have a similar configuration to that of the virtual server management unit 410. The virtual machine 1924 that functions as the virtual server 1704 may have a similar configuration to that of the virtual server 412 or the virtual server 1704. In the present embodiment, the virtual machine 1926 that functions as the virtual server 414 includes, for example, a communication control unit 2312, a malware detection unit 2314, and an electronic data storing unit 2316.

The history management unit 2212 may be an example of a transmission history storage unit, an access history storage unit, an access information acquisition unit, or an access information storage unit. The data processing restriction unit 2214 may be an example of a restriction unit. The malware information sharing unit 2216 may be an example of a notification unit. The electronic data storing unit 2316 may be an example of an execution history storage unit.

In the present embodiment, the history management unit 2212 manages a history regarding access to the electronic data or operation of the electronic data. In an embodiment, when the electronic data is transmitted to another information processing device, the history management unit 2212 stores identification information of another information processing device. In another embodiment, the history management unit 2212 acquires, from another information processing device, information indicating that electronic data is accessed. The identification information of another information processing device that has accessed the electronic data may be stored. The history management unit 2212 may store electronic data addresses, or electronic data or electronic data converted on the basis of a predetermined algorithm, for a predetermined period.

In the present embodiment, for example, the data processing restriction unit 2214 restricts at least one of the operation of the electronic data, the access to the electronic data, and the execution of the electronic data until the storage period of the electronic data expires (sometimes referred to as operation of the electronic data or the like). Examples of the restriction include permission, conditional permission, prohibition, conditional prohibition. The data processing restriction unit 2214 may permit the operation of the electronic data or the like only on the execution server 120 (in particular, the virtual server 1704) or a machine that functions as the execution server 120 until the storage period of the electronic data expires.

The data processing restriction unit 2214 may prohibit operation of transmitting the electronic data to another information processing device until the storage period of the electronic data expires. The data processing restriction unit 2214 may permit the operation of transmitting the electronic file to another information processing device on the condition that the file format of the electronic file has been converted from the file format of the application that created the electronic file to the file format of the application for remote control, until the storage period of the electronic file expires. When the file format of the electronic file has been converted from the file format of the application that created the electronic file to the file format of the application for remote control, the data processing restriction unit 2214 may prohibit the processing of returning the file format of the application for remote control to the file format of the application until the storage period of the electronic file expires.

In an embodiment, the data processing restriction unit 2214 generates a list in which identification information of the electronic data, information on a period during which operation of the electronic data is restricted, and information indicating the contents of restriction are associated. For example, at least one of the electronic file processing unit 228 and the electronic file execution unit 430 refers to the above-described list to determine whether to operate the electronic data, to access the electronic data, or to execute the electronic data.

In the present embodiment, when the malware detection unit 2314 detects malware, the malware information sharing unit 2216 refers to the identification information of another information processing device stored in the history management unit 2212, and notifies another information processing device that the electronic data has been infected with malware.

In the present embodiment, the report creation unit 2218 creates a report regarding the detection status of malware by the malware detection unit 2314. This makes it possible to visualize the infection prevention effect of the present system.

According to the present embodiment, the address of the electronic data accessed in the past, or the electronic data or the electronic data executed in the past is stored for a predetermined period (sometimes referred to as a storage period). Then, the malware detection unit 2314 (i) scans the stored electronic data to perform the malware detection processing and/or (ii) accesses the stored address to perform malware detection processing, at least once during the storage period. In the malware detection processing, for example, it is determined whether the electronic data is infected with malware or whether the electronic data includes malware. The malware detection unit 2314 may scan electronic data accessed in the past or electronic data executed in the past a plurality of times over a predetermined storage period.

During the storage period of the electronic data or the address of the electronic data, the pattern file for malware detection may be updated. As a result, malware not detected at the time when the electronic data is accessed or executed may be detected during the storage period. Therefore, according to the above-described report, the degree of prevention of the damage caused by malware by this system becomes clear, for example, as compared with the case where, while malware detection software is introduced, this system is not introduced.

In the present embodiment, the communication control unit 2312 controls, for example, communication with at least one of the virtual machine 1926, the virtual machine 1910, the virtual machine 1922, the virtual machine 1924, and the virtual machine 1926. The communication control unit 2312 may have, for example, a similar configuration to that of the communication control unit 222, the communication control unit 242, the communication control unit 422, or the communication control unit 1706. The communication control unit 2312 has, for example, a configuration similar to that of the communication control unit 1706.

In the present embodiment, the malware detection unit 2314 scans electronic data accessed in the past or data executed in the past to determine the presence or absence of infection by malware. In an embodiment, the malware detection unit 2314 scans the electronic data stored in the electronic data storing unit 2316 or the history management unit 2212, or electronic data converted on the basis of a predetermined algorithm to detect malware. In another embodiment, the malware detection unit 2314 accesses the address stored in the history management unit 2212 to detect malware.

In the present embodiment, the malware detection unit 2314 performs processing for detecting malware a plurality of times during a predetermined period. For example, the malware detection unit 2314 performs processing for detecting malware a plurality of times during the storage period. The malware detection unit 2314 may have a similar configuration to that of the abnormality detection unit 434.

In the present embodiment, the electronic data storing unit 2316 stores electronic data accessed in the past or electronic data executed in the past, for a predetermined period (sometimes referred to as a storage period). For example, the electronic data storing unit 2316 stores electronic data or electronic data converted on the basis of a predetermined algorithm for a predetermined period, and the electronic data storing unit 2316 may store the address of electronic data for a predetermined period.

[Specific Configuration of Each Unit of Mail System 1700]

Each unit of the mail system 1700 may be realized by hardware, software, or hardware and software. At least a part of each unit of the mail system 1700 may be realized by a single server or machine, and may be realized by a plurality of servers or machines. At least a part of each unit of the mail system 1700 may be realized on a virtual server or on a cloud system. At least a part of each unit of the mail system 1700 may be realized by a personal computer or a mobile terminal. For example, the physical machine 1900 may be realized by a personal computer or a mobile terminal. Examples of a mobile terminal include a mobile phone, a smart phone, a PDA, a tablet, a notebook computer, a laptop computer, a wearable computer, and the like. The mail system 1700 may store information using a distributed ledger technology such as a block chain or a distributed network.

When at least a part of the components constituting the mail system 1700 is realized by software, the components realized by the software may be realized by activating software or a program that defines the operation related to the component in the information processing device of the general configuration. The above-described information processing device may include (i) a data processing device having a processor such as a CPU or GPU, a ROM, a RAM, a communication interface, and the like, (ii) an input device such as a keyboard, a touch panel, a camera, a microphone, various sensors, or a GPS receiver, (iii) an output device such as a display device, a speaker, or a vibration device, and (iv) a storage device such as a memory or an HDD (including an external storage device). In the above-described information processing device, the above-described data processing device or storage device may store the above-described software or program. The above-described software or program is executed by the processor to cause the above-described information processing device to perform operation defined by the software or program. The above-described software or program may be stored in a non-transitory computer readable recording medium.

[Overview of Information Processing in Mail System 1700]

As described above, when the virtual machine 1910 that functions as the client terminal 1702 accepts a command related to access to the electronic data or operation of the electronic data, processing for accessing the electronic data or processing for operating the electronic data is performed on the virtual machine 1924 that functions as the virtual machine 1704 in some cases. Examples of the operation of the electronic data include (i) operation for executing, viewing, editing, printing, duplicating, moving or transmitting the electronic data, (ii) operation for converting file format of the electronic data, (iii) operation for capturing screen data, and the like.

The operation for executing the electronic data may include operation for opening the electronic file using predetermined application software. The operation for duplicating the electronic data may include operation for copying the content of the electronic data to the clipboard. The electronic data may be an electronic file for various kinds of application software, may be HTML data of a website or the like, or may be various scripts embedded in the website or the like.

In the mail system 1700, the information transmitted from the virtual machine 1924 that functions as the virtual machine 1704 to the virtual machine 1910 that functions as the client terminal 1702 is restricted. For example, data other than the image data of the display screen indicating the result of the processing executed on the virtual machine 1924 cannot be transmitted from the virtual machine 1924 to the client terminal 1702.

As a result, the risk of malware infection of the virtual machine 1910 that functions as the client terminal 1702 is significantly reduced. Furthermore, when the electronic data is transmitted from the virtual machine 1910 that functions as the client terminal 1702 to another information processing device (for example, the other terminal 20, file sharing server 1212 or the like), transmission of electronic files infected with malware to another information processing device can be suppressed.

For example, before the virtual machine 1910 transmits the electronic data, (i) the electronic file execution 430 of the virtual machine 1924 that functions as the virtual server 1704 executes the electronic data, and (ii) the abnormality detection unit 434 of the virtual machine 1924 that functions as the virtual server 1704 performs abnormality detection processing. Then, when no abnormality is detected in the abnormality detection processing by the abnormality detection unit 434, the virtual machine 1910 transmits the electronic data, thereby preventing another information processing device from being infected with malware.

However, detection of malware by the abnormality detection unit 434 is limited. Furthermore, some malware in recent years have a longer incubation period than before. Therefore, although it is unlikely that electronic data infected with malware will be transmitted from an information processing terminal incorporating this system to an information processing terminal not incorporating this system, the possibility is not zero.

According to an embodiment of the present embodiment, (i) when the virtual machine 1910 that functions as the client terminal 1702 has accepted a command related to operation of the electronic data, or (ii) when processing for operating the electronic data has been performed on the virtual machine 1924 that functions as the virtual machine 1704, the electronic data is stored for a predetermined period. The above-described electronic data may be stored for a predetermined period of time after being converted on the basis of a predetermined algorithm. The above-described electronic data is stored, for example, in at least one of the virtual machine 1910 that functions as the client terminal 1702 and the virtual machine 1926 that functions as the virtual server 414.

On the other hand, according to the embodiment described in connection with FIGS. 19 to 23, (i) when the virtual machine 1910 that functions as the client terminal 1702 has accepted a command for accessing the electronic data, or (ii) when processing for accessing the electronic data has been performed on the virtual machine 1924 that functions as the virtual machine 1704, the address of the electronic data or the electronic data is stored for a predetermined period. The above-described address of the electronic data or the above-described electronic data is stored, for example, in at least one of the virtual machine 1910 that functions as the client terminal 1702 and the virtual machine 1926 that functions as the virtual server 414.

According to the present embodiment, for example, the malware detection unit 2314 scans electronic data accessed in the past or electronic data executed in the past a plurality of times over a predetermined storage period. Therefore, malware that cannot be detected when the electronic data is accessed or executed can be detected during the storage period. For example, the damage of another information processing terminal can be suppressed by sharing the detection result of the malware detection unit 2314 with another information processing terminal not incorporating this system.

[Specific Example of Information Processing in Mail System 1700]

An example of information processing in the mail system 1700 will be described by taking, as an example, a case where the mail system 1700 acquires a command for accessing a website provided by the web server 1760. HTML data describing a website may be an example of electronic data. Note that, in the case where the mail system 1700 executes electronic data such as an electronic file, the processing can be performed in a similar manner to the manner in the present embodiment. According to the present embodiment, first, the input unit 246 on the virtual machine 1910 acquires a command related to the operation of the electronic data. For example, the input unit 246 acquires a command for accessing a website provided by the web server 1760. The execution environment determination unit 1714 on the virtual machine 1910 determines whether to access the above-described website using the web browser on the virtual machine 1910 or access the above-described website using the web browser on the virtual machine 1924.

When the execution environment determination unit 1714 determines to access the above-described website using the web browser on the virtual machine 1924, the remote control unit 244 on the virtual machine 1910 includes establishes a remotely controllable communication path in between the virtual machine 1910 and the virtual machine 1924. The remote control unit 244 transmits to the electronic file execution unit 430 on the virtual machine 1924 a command for executing a web browser to access the above-described website via the above-described remotely controllable communication path. The command for accessing the website may be an example of the execution instruction.

The electronic file execution unit 430 on the virtual machine 1924 activates the web browser on the basis of the command received from the remote control unit 244, and accesses the above-described website. At this time, the electronic file execution unit 430 may store the address of the website in the electronic data storing unit 2316 on the virtual machine 1926. The electronic file execution unit 430 may store the HTML data of the above-described website in the electronic data storing unit 2316. The electronic file execution unit 430 may convert the above-described address or the above-described HTML data on the basis of a predetermined algorithm, and store the converted data in the electronic data storing unit 2316. The electronic data storing unit 2316 stores the electronic data received from the electronic file execution unit 430 for a predetermined storage period.

In the present embodiment, the case where the electronic file execution unit 430 stores the above-described data in the electronic data storing unit 2316 has been described. However, the module or section for storing the above data in the electronic data storing unit 2316 is not limited to the electronic file execution unit 430. According to another embodiment, for example, the remote control unit 244 stores the above-described data in the electronic data storing unit 2316.

The data processing restriction unit 2214 on the virtual machine 1910 may restrict the processing of the electronic data during the storage period. For example, when accessing the above-described website, information indicating that it should be determined whether to access the above-described website using the web browser on the virtual machine 1924 is transmitted to the execution environment determination unit 1714.

The malware detection unit 2314 on the virtual machine 1926 scans data stored in the electronic data storing unit 2316 to detect malware. When the electronic data storing unit 2316 stores the address of the electronic data, the malware detection unit 2314 detects malware by the following procedure, for example.

When the address of electronic data is stored in the electronic data storing unit 2316, first, the communication control unit 2312 on the virtual machine 1910 establishes a remotely controllable communication path in between the virtual machine 1910 and the virtual machine 1924. Next, the malware detection unit 2314 transmits to the electronic file execution unit 430 on the virtual machine 1924 a command for executing a web browser to access the above-described website via the above-described remotely controllable communication path.

In an embodiment, the malware detection unit 2314 receives, from the electronic file execution unit 430, image data of a display screen indicating the result of the processing performed on the virtual machine 1924. The malware detection unit 2314 may analyze the above-described image data to determine whether the above-described website is infected with malware.

In another embodiment, the malware detection unit 2314 receives content data from the electronic file execution unit 430. Examples of the content data include HTML data, CSS design data, browser cache data, moving image data, still image data, audio data, and the like. Examples of the browser cache data include a cookie and the like. The malware detection unit 2314 may analyze the above-described content data to determine whether the above-described website is infected with malware.

When malware has been detected, the malware detection unit 2314 transmits information indicating that malware has been detected to the report creation unit 2218 on the virtual machine 1910. The report creation unit 2218 creates a report regarding the detection status of malware by the malware detection unit 2314.

When malware has been detected, the malware detection unit 2314 may transmit information indicating that malware has been detected to the malware information sharing unit 2216 on the virtual machine 1910. The malware information sharing unit 2216 refers to the electronic data storing unit 2316, for example, and acquires identification information of another information processing device that has accessed the website in the past. The malware information sharing unit 2216 may transmit, to another information processing device, information indicating that the above-described website has been infected with malware.

[Another Embodiment of Physical Machine 1900]

Figure 24:
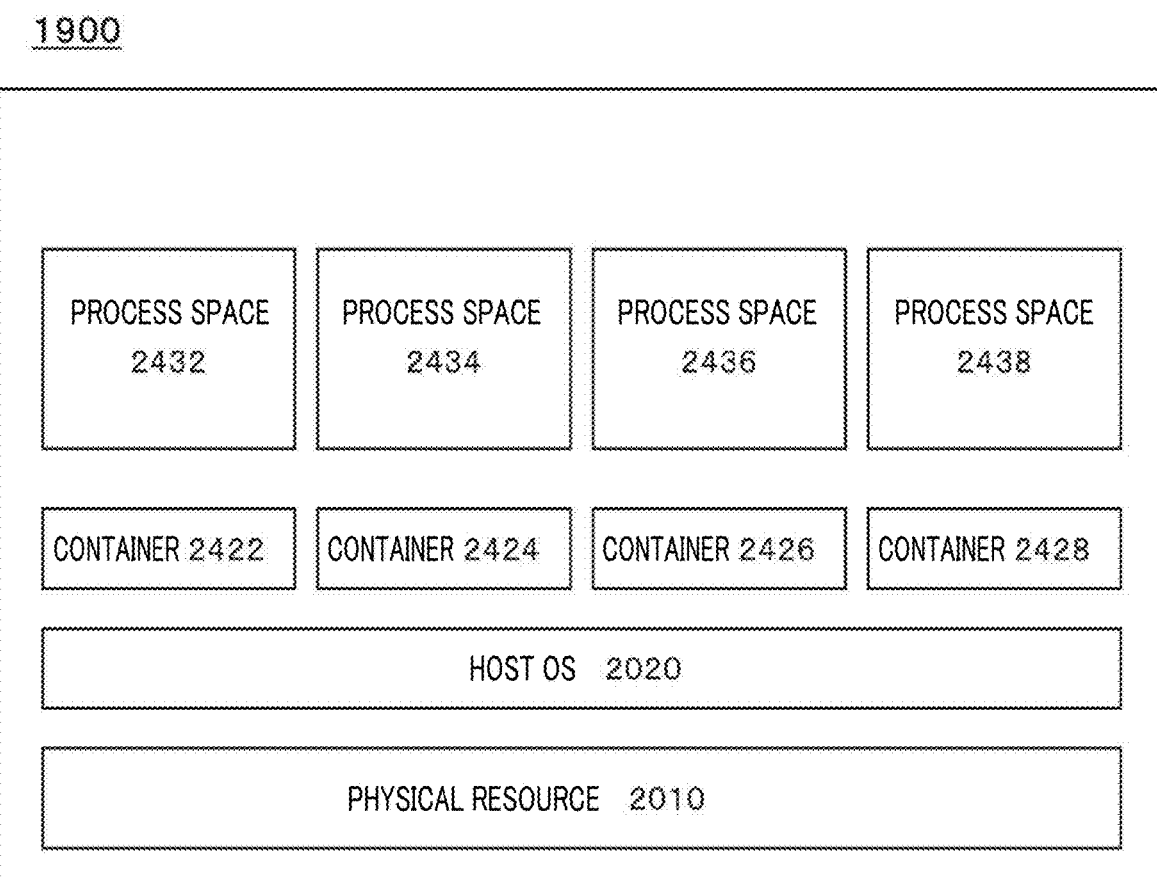
FIG. 24 schematically illustrates another example of the system configuration of the physical machine 1900.

FIG. 24 schematically illustrates another example of the system configuration of the physical machine 1900. According to the present embodiment, the container virtualization technology creates a container 2422, a container 2424, a container 2426, and a container 2428 on a single host OS 2020. Different applications are executed in each of the plurality of containers. As a result, a system similar to the mail system 1700 described in connection with FIGS. 19-23 can be realized.

For example, in a process space 2432 of the container 2422, a program for causing the physical resource 2010 (for example, a processor such as a CPU) of the physical machine 1900 to function as each unit of the client terminal 1702 is executed. Similarly, in the process space 2434 of the container 2424, a program for causing the physical resource 2010 of the physical machine 1900 to function as the virtual server management unit 410 is executed. In the process space 2436 of the container 2426, a program for causing the physical resource 2010 of the physical machine 1900 to function as each unit of the virtual server 1704 is executed. In the process space 2438 of the container 2428, a program for causing the physical resource 2010 of the physical machine 1900 to function as the virtual server 414 is executed.

As described above, (i) after a command for executing the electronic file is accepted, a container for executing the electronic file may be prepared, (ii) before a command for executing the electronic file is accepted, the electronic file may be recorded using the prepared container. A container may be prepared each time an electronic file is executed. The container may be discarded immediately after the execution of the electronic file is completed, or may be discarded after a predetermined period of time has elapsed after the execution of the electronic file is completed. The container may be discarded after a randomly determined period of time has elapsed since execution of the electronic file has ended.

Figure 25:
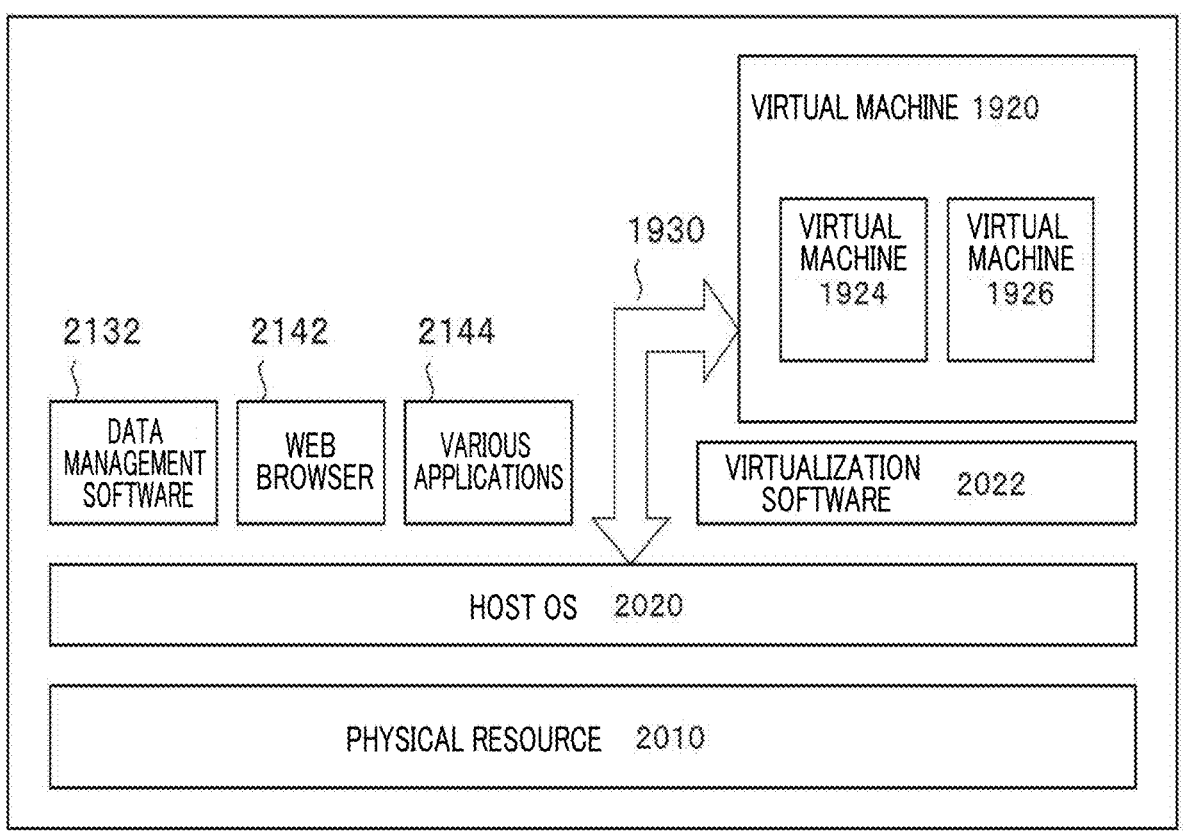
FIG. 25 schematically illustrates still another example of the system configuration of the physical machine 1900.
Figure 26:
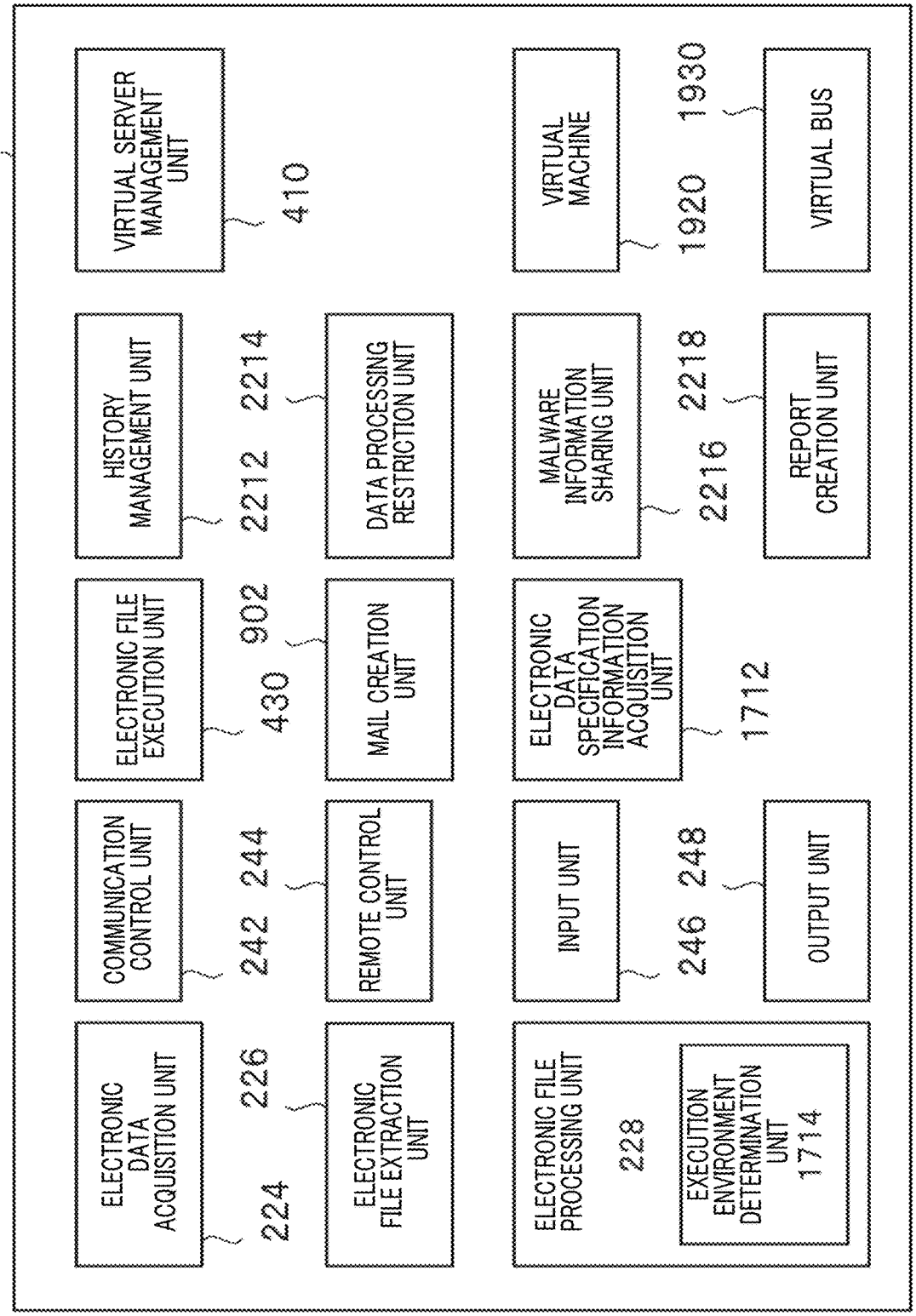
FIG. 26 schematically illustrates another example of a system realized by execution of data management software 2132.

Still another example of the physical machine 1900 will be described with reference to FIGS. 25 and 26. FIG. 25 schematically illustrates still another example of the system configuration of the physical machine 1900. FIG. 26 schematically shows an example of a system realized when the data management software 2132 is executed in the physical machine 1900 described in connection with FIG. 25. In the present embodiment, the data management software 2132 may be a program for causing a computer to function as each unit of the client terminal 1702 and the virtual server management unit 410.

According to the present embodiment, the virtual machine 1920 operates on the physical machine 1900 that operates as the client terminal 1702, which is different from the embodiments described with reference to FIGS. 19 to 24. The physical machine 1900 described in connection with FIG. 26 is different from the virtual machine 1910 described in connection with FIG. 22 in that the physical machine 1900 includes the virtual server management unit 410, the virtual machine 1920, and the virtual bus 1930. The virtual machine 1920 described in connection with FIGS. 25 and 26 is different from the virtual machine 1920 described in connection with FIGS. 19 to 21 in that the virtual machine 1920 does not have the virtual machine 1922.

As illustrated in FIG. 25, according to the present embodiment, the virtual machine 1920 and the virtual bus 1930 are built by operating the virtualization software 2022 on the host OS 2020 of the physical machine 1900. In this case, when the data management software 2132 is executed on the physical machine 1900, a module or section for causing the physical machine 1900 to function as each unit of the client terminal 1702 is built as illustrated in FIG. 26. Furthermore, a module or section for causing the physical machine 1900 to function as the virtual server management unit 410 is built.

As a result, a system similar to the mail system 1700 described in connection with FIGS. 19-23 can be realized. Note that the data management software 2132 may be executed before the virtualization software 2022 is executed, or the data management software 2132 may be executed after the virtualization software 2022 is executed.

In the embodiments described in connection with FIGS. 19 to 23, an example of the information processing device has been described using the mail system 1700. However, the information processing device is not limited to the mail system 1700. In another embodiment, the information processing device may not include the mail server. In still another embodiment, the information processing device may be a system for accessing a web site, or a system for sharing electronic files or electronic data.

As described above, although the present invention has been described using embodiments, the technical scope of the present invention is not limited to the range as described in the above-described embodiments. It is apparent to those skilled in the art that various changes or modifications can be added to the above-described embodiment. It is also apparent from the scope of the claims that the embodiments added with such alterations or improvements can be included in the technical scope of the present invention.

Furthermore, as described above, the matters described in the specific embodiment can be applied to the other embodiments as long as no technical contradiction arises. In an embodiment, the client terminal 114 described in connection with FIGS. 1 to 3 and 7 may have some of the functions or features of the client terminal 912 described in connection with FIG. 9, or the client terminal 1702 described in connection with FIG. 17. Similarly, the client terminal 912 may have some of the functions or features of client terminal 114 or client terminal 1702, and the client terminal 1702 may have some of the functions or features of client terminal 114 or client terminal 912.

In another embodiment, the execution server 120 described in connection with FIG. 4 may have some of the functions or features of the execution server 120 described in connection with FIG. 17. Similarly, the execution server 120 described in connection with FIG. 17 may have some of the functions or features of the execution server 120 described in connection with FIG. 4.

It should be noted that the order of execution of each process such as operations, procedures, steps, and stages in the devices, systems, programs, and methods shown in the claims, the specification, and the drawings may be realized in any order, unless particularly and explicitly stated as "before", "prior to" or the like, and unless the output of the previous process is used in the later process. With regard to the operation flow in the claims, the specification, and the drawings, even if it is described using "first," "next," or the like, for convenience, it does not mean that it is essential to carry out in this order.

The following matters are described in the present specification. It will be apparent to those skilled in the art that various changes or modifications can be added to the following matters.

[Item 1]
An information processing device
including:
an electronic file extraction unit that extracts an electronic file from electronic data;
an electronic file transmission unit that transmits the electronic file extracted by the electronic file extraction unit or a file related to the electronic file to an execution environment in which the electronic file is to be executed; and
a remote control unit that establishes a remotely controllable communication path with the execution environment, and transmits an execution instruction for executing the electronic file on the execution environment to the execution environment via the remotely controllable communication path.

[Item 2]
The information processing device according to Item 1, further including a file conversion unit that changes a format, an extension or a name of the electronic file extracted by the electronic file extraction unit, or encrypts the electronic file extracted by the electronic file extraction unit to generate a file related to the electronic file.

[Item 3]
An information processing device
including:
an electronic file extraction unit that extracts an electronic file from electronic data;
an execution environment determination unit that determines an execution environment in which the electronic file is to be executed by remote control; and a remote control program generation unit that generates a remote control program for remotely controlling the execution environment determined by the execution environment determination unit, in which the remote control program is a program for causing a computer to perform a procedure for establishing a remotely controllable communication path in between the computer and the execution environment determined by the execution environment determination unit.

[Item 4]

The information processing device according to Item 3, in which the remote control program is a program for causing the computer to further perform a procedure for transmitting an execution instruction for executing the electronic file on the execution environment, to the execution environment via the remotely controllable communication path.

[Item 5]

The information processing device according to Item 3 or 4, in which the remote control program is a program for causing the computer to further perform a procedure for transmitting the electronic file or a file related to the electronic file from the computer to the execution environment via a communication line.

[Item 6]

The information processing device according to Item 3 or 4, further including an electronic file transmission unit that transmits the electronic file or a file related to the electronic file to the execution environment via a communication line.

[Item 7]

The information processing device according to any one of Items 3 to 6, further including a file conversion unit that changes a format, an extension or a name of the electronic file extracted by the electronic file extraction unit, or encrypts the electronic file extracted by the electronic file extraction unit to generate a file related to the electronic file.

[Item 8]

The information processing device according to any one of Items 1 to 7, further including the execution environment.

[Item 9]

The information processing device according to Item 8, in which the execution environment is built on a virtual server, and the virtual server includes:

an instruction reception unit that accepts an instruction from a user via a communication line;

an electronic file execution unit that executes the electronic file or a file related to the electronic file transmitted to the execution environment based on the instruction from the user; and a screen information transmission unit that transmits screen information to be displayed to the user via the communication line.

[Item 10]

The information processing device according to Item 9, in which the virtual server further includes an abnormality detection unit that detects an abnormality in the execution environment.

[Item 11]

The information processing device according to Item 10, in which the abnormality detection unit detects an abnormality of the execution environment when the execution environment executes operation other than operation according to the instruction from the user.

[Item 12]

The information processing device according to any one of Items 9 to 11, in which the virtual server further includes a communication control unit that controls external communication.

[Item 13]

The information processing device including a virtual server that executes an electronic file by remote control from a client terminal, in which the virtual server includes:

an instruction reception unit that accepts an instruction from a user via the client terminal and a communication line;

an electronic file execution unit that executes the electronic file based on the instruction from the user;

a screen information transmission unit that transmits screen information to be displayed to the user to the client terminal via the communication line; and an abnormality detection unit that detects an abnormality of the virtual server, and the abnormality detection unit detects an abnormality of the virtual server when the virtual server performs operation other than operation according to the instruction from the user.

[Item 14]

The information processing device according to Item 13, in which the virtual server further includes a communication control unit that controls external communication.

[Item 15]

A program for causing a computer to function as the information processing device according to any one of Items 1 to 14.

[Item 16]

An information processing method including:

an electronic file extraction step of extracting an electronic file from electronic data;

an electronic file transmission step of transmitting the electronic file extracted in the electronic file extraction step or a file related to the electronic file to an execution environment in which the electronic file is to be executed; and a remote control step of establishing a remotely controllable communication path with the execution environment, and transmits an execution instruction for executing the electronic file on the execution environment to the execution environment via the remotely controllable communication path.

[Item 17]

An information processing method including:

an electronic file extraction step of extracting an electronic file from electronic data; and an execution environment determination step of determining an execution environment in which the electronic file is to be executed by remote control; and a remote control program generation step of generating a remote control program for remotely controlling the execution environment determined in the execution environment determination step, in which the remote control program is a program for causing a computer to perform a procedure for establishing a remotely controllable communication path in between the computer and the execution environment determined in the execution environment determination step.

[Item 18]

A data structure stored by a first computer having a storage device, the data structure including:

data of an electronic file;

transmission destination identification data for identifying a transmission destination of the electronic file;

execution environment identification data for identifying a second computer on which the electronic file is to be executed; and a program for causing the first computer to perform a procedure of transmitting the data of the electronic file to the transmission destination identified by the transmission destination identification data, and a procedure of establishing a remotely controllable communication path in between the first computer and the second computer identified by the execution environment identification data.

[Item 2-1]

An information processing device including:

an electronic file operation unit that acquires an instruction related to operation of an electronic file;

a remote control unit that establishes a remotely controllable communication path with an execution environment in which the operation of the electronic file is to be executed, and transmits an execution instruction for executing the electronic file on the execution environment to the execution environment via the remotely controllable communication path; and an electronic file transmission unit that transmits the electronic file to the execution environment according to the instruction.

[Item 2-2]

The information processing device according to Item 2-1, further including an execution environment determination unit that determines an execution environment in which the electronic file is to be executed by the remote control based on a format, an extension, or a name of the electronic file.

[Item 2-3]

The information processing device according to Item 2-2, further including an electronic file storage unit that stores the electronic file; and an electronic file storage control unit that controls whether or not the electronic file after being remotely controlled is stored in the electronic file storage unit.

[Item 2-4]

An information processing device including:

an electronic data specification information acquisition unit that acquires electronic data specification information for identifying electronic data according to an instruction of a user; and an execution environment determination unit that determines an execution environment in which the electronic data is to be executed by remote control; and a remote control program generation unit that generates a remote control program for remotely controlling the execution environment determined by the execution environment determination unit, in which the remote control program is a program for causing a computer to perform a procedure for establishing a remotely controllable first communication path in between the computer and the execution environment determined by the execution environment determination unit, and the execution environment determined by the execution environment determination unit has a second communication path with a different computer from the computer.

[Item 2-5]

The information processing device according to Item 2-4, in which the remote control program is a program for causing the computer to further perform a procedure of establishing the second communication path in between the execution environment and the other computer.

[Item 2-6]

The information processing device according to Item 2-5, in which, when the electronic data specification information acquisition unit acquires the electronic data specification information by using a predetermined process, the execution environment determination unit generates the remote control program for causing the computer to perform the procedure of establishing the second communication path in between the execution environment and the other computer.

[Item 2-7]

The information processing device according to any one of Items 2-4 to 2-6, in which the remote control program is a program for causing the computer to further perform a procedure for acquiring the electronic data identified by the electronic data specification information via the second communication path, and transmitting an instruction for processing the acquired electronic data in the execution environment to the execution environment via the first communication path.

[Item 2-8]

The information processing device including a virtual server that executes electronic data by remote control from a client terminal, in which the virtual server includes:

a first communication unit that performs communication with the client terminal via a first communication path according to an instruction of a user in the client terminal;

a second communication unit that acquires electronic data according to the instruction of the user from a terminal different from the client terminal via a second communication path;

an electronic file execution unit that executes the acquired electronic data; and a screen information transmission unit that transmits screen information to be displayed to the user, to the client terminal via the first communication path.

[Item 2-9]

A program for causing a computer to function as the information processing device according to any one of Items 2-1 to 2-8.

REFERENCE SIGNS LIST

10 Network
20 Terminal
22 Client terminal
24 Client terminal
100 File transfer system
110 Mail system
112 Mail server
114 Client terminal
120 Execution server 222 Communication control unit
224 Electronic data acquisition unit
226 Electronic file extraction unit
228 Electronic file processing unit
242 Communication control unit
244 Remote control unit
246 Input unit
248 Output unit
312 Execution environment determination unit
314 Electronic file transmission unit
316 Notification data generation unit
318 Notification data transmission unit
330 Notification data
332 Header information
334 Mail text
336 URI
340 Attached file
410 Virtual server management unit
412 Virtual server
414 Virtual server
416 Virtual server
422 Communication control unit
424 Authentication unit
426 Electronic file storage unit
428 Instruction reception unit
430 Electronic file execution unit
432 Screen information transmission unit
434 Abnormality detection unit
728 Electronic file processing unit
730 Notification data
736 Remote control program
902 Mail creation unit
910 Mail system
912 Mail server
914 Client terminal
1200 File transfer system
1212 File sharing server
1400 File processing system
1401 Client terminal
1402 Electronic file storage unit
1404 Electronic file operation unit
1406 Electronic file storage control unit
1408 Execution environment determination unit
1700 Mail system
1702 Client terminal
1704 Virtual server
1706 Communication control unit
1708 First communication unit
1710 Second communication unit
1712 Electronic data specification information acquisition unit
1714 Execution environment determination unit
1720 Communication path
1730 Communication path
1750 External device
1900 Physical machine
1910 Virtual machine
1920 Virtual machine
1922 Virtual machine
1924 Virtual machine
1926 Virtual machine
1930 Virtual bus
2010 Physical resource
2020 Host OS
2022 Virtualization software
2110 Virtual resource
2120 Guest OS
2132 Data management software
2134 Execution alternate processing software
2142 Web browser
2144 Application software
2212 History management unit
2214 Data processing restriction unit
2216 Malware information sharing unit
2218 Report creation unit
2312 Communication control unit
2314 Malware detection unit
2316 Electronic data storing unit
2422 Container
2424 Container
2426 Container
2428 Container
2432 Process space
2434 Process space
2436 Process space
2438 Process space

What is claimed is:

1. An information processing device, comprising a processor, a memory to store instructions, wherein the information processing device is a first information processing device, and upon execution of the instructions by the processor, the first information processing device is configured to:
acquire a command related to operation of electronic data;
establish a remotely controllable communication path with an execution environment in which the operation of the electronic data is to be executed, and transmit an execution instruction for executing the operation of the electronic data on the execution environment to the execution environment via the remotely controllable communication path, when the first information processing device acquires the command, wherein the execution instruction includes a user identification information and a restriction information, and wherein the communication path utilizes protocols comprising at least one of: XProtocol, or PCoIP;
extract, from the execution instruction, an operation permitted or prohibited for a user identified by the user identification information;
compare the extracted operation indicated by the execution instruction with the operation, received from mail server, to determine whether to execute the operation indicated by the execution instruction for the user;
extract, from the execution instruction, an operation permitted or prohibited for an electronic file identified by the user identification information and the corresponding restriction information, received from the mail server, for the electronic file;
compare the restriction information for the electronic file with the extracted operation to determine whether to execute the operation on the electronic file indicated by the execution instruction;
transmit the electronic data or the electronic data converted based on a predetermined algorithm to the execution environment when the first information processing device acquires the command;
store the electronic data or the electronic data converted based on the predetermined algorithm for a predetermined period of time;
scan the electronic data stored or the electronic data converted based on the predetermined algorithm to detect malware;

restrict an operation of transmitting the electronic data to a second information processing device until the predetermined period of time expires, prepare a snapshot of the execution environment, and return the execution environment to the snapshot of the execution environment, wherein the first information processing device is further configured to detect the malware a plurality of times during the predetermined period; and wherein the first information processing device is further configured to delete the execution environment.

2. The information processing device according to claim 1, wherein the first information processing device is further configured to transmit the electronic data or the electronic data converted based on the predetermined algorithm to the execution environment and for storing when the first information processing device acquires the command.

3. The information processing device according to claim 1, wherein, after the execution environment executes the operation of the electronic data, the execution environment is configured to transmit the electronic data after execution to the first information processing device.

4. The information processing device according to claim 1, wherein the first information processing device is further configured to store identification information of the second information processing device when the electronic data is transmitted to the second information processing device; and when the first information processing device has detected malware, refer to the identification information of the second information processing device stored, and notify the second information processing device that the electronic data is infected with the malware.

5. An information processing device, comprising a processor, a memory to store instructions, wherein the information processing device is a first information processing device, and upon execution of the instructions by the processor, the first information processing device is configured to:

acquire a command for accessing electronic data;

establish a remotely controllable communication path with an execution environment in which processing for accessing the electronic data is to be executed, and transmit an execution instruction for executing the processing for accessing the electronic data on the execution environment to the execution environment via the remotely controllable communication path, when the first information processing device acquires the command, wherein the execution instruction includes a user identification information and a restriction information, and wherein the communication path utilizes protocols comprising at least one of: XProtocol, or PCoIP;

extract, from the execution instruction, an operation permitted or prohibited for a user identified by the user identification information;

compare the extracted operation indicated by the execution instruction with the operation, received from mail server, to determine whether to execute the operation indicated by the execution instruction for the user;

extract, from the execution instruction, an operation permitted or prohibited for an electronic file identified by the user identification information and the corresponding restriction information, received from the mail server, for the electronic file;

compare the restriction information for the electronic file with the extracted operation to determine whether to execute the operation on the electronic file indicated by the execution instruction;

store an address of the electronic data, or the electronic data or the electronic data converted based on a predetermined algorithm for a predetermined period of time; and access the address stored to detect malware, or scan the electronic data stored or the electronic data converted based on the predetermined algorithm to detect malware;

restrict an operation of transmitting the electronic data to a second information processing device until the predetermined period of time expires, prepare a snapshot of the execution environment, and return the execution environment to the snapshot of the execution environment, wherein the first information processing device is further configured to detect the malware a plurality of times during the predetermined period of time; and wherein the first information processing device is further configured to delete the execution environment.

6. The information processing device according to claim 5, wherein the first information processing device is further configured to:

acquire information indicating that the electronic data has been accessed from the second information processing device;

store identification information of the second information processing device that has accessed the electronic data; and when the malware detection unit has detected malware, refer to identification information of the second information processing device stored, and notify the second information processing device that the electronic data is infected with the malware.

7. The information processing device according to claim 1, wherein the first information processing device is further configured to create a report on detection status of malware.

8. The information processing device according to claim 1, wherein the first information processing device is further configured to delete the execution environment.

9. A non-transitory computer readable medium storing a program, and upon execution of the program by at least one processor communicatively coupled to a first information processing, device to perform operations, comprising:

acquiring a command related to operation of electronic data;

establishing a remotely controllable communication path with an execution environment in which the operation of the electronic data is executed, and transmitting an execution instruction for executing the operation of the electronic data on the execution environment to the execution environment via the remotely controllable communication path, when the first information processing device acquires the command, wherein the execution instruction includes a user identification information and a restriction information, and wherein the communication path utilizes protocols comprising at least one of: XProtocol, or PCoIP;

extracting, from the execution instruction, an operation permitted or prohibited for a user identified by the user identification information;

comparing the extracted operation indicated by the execution instruction with the operation, received from mail server, to determine whether to execute the operation indicated by the execution instruction for the user;

extracting, from the execution instruction, an operation permitted or prohibited for an electronic file identified by the user identification information and the corresponding restriction information, received from the mail server, for the electronic file;

comparing the restriction information for the electronic file with the extracted operation to determine whether to execute the operation on the electronic file indicated by the execution instruction:

transmitting the electronic data or the electronic data converted based on a predetermined algorithm to the execution environment when the first information processing device acquires the command;

storing the electronic data or the electronic data converted based on the predetermined algorithm for a predetermined period of time;

scanning the electronic data stored or the electronic data converted based on the predetermined algorithm to detect malware;

restricting an operation of transmitting the electronic data to a second information processing device until the predetermined period of time expires, preparing a snapshot of the execution environment, and returning the execution environment to the snapshot of the execution environment, wherein the first information processing; device is further configured to detect the malware a plurality of times during the predetermined period; and wherein the first information processing device is further configured to delete the execution environment.

* * * * *